United States Patent
Arai et al.

(10) Patent No.: US 6,307,554 B1
(45) Date of Patent: Oct. 23, 2001

(54) APPARATUS AND METHOD FOR GENERATING PROGRESSIVE POLYGON DATA, AND APPARATUS AND METHOD FOR GENERATING THREE-DIMENSIONAL REAL-TIME GRAPHICS USING THE SAME

(75) Inventors: Masatoshi Arai; Ryosuke Miyata; Koichi Murakami, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/071,830

(22) Filed: May 4, 1998

(30) Foreign Application Priority Data

Dec. 19, 1997 (JP) .................................... 9-351310

(51) Int. Cl.[7] ................................... G06T 17/20
(52) U.S. Cl. ........................ 345/423; 345/428; 345/441
(58) Field of Search ................................ 345/423, 428, 345/441, 442

(56) References Cited

U.S. PATENT DOCUMENTS

| | | | |
|---|---|---|---|
| 5,123,084 | * | 6/1992 | Prevost et al. .................. 395/120 |
| 5,301,267 | * | 4/1994 | Hassett et al. .................. 395/150 |
| 5,349,533 | * | 9/1994 | Libby et al. ..................... 364/461 |
| 5,712,964 | * | 1/1998 | Kamada et al. ................. 395/118 |
| 5,771,341 | * | 6/1998 | Huddy ............................ 395/119 |
| 5,929,860 | * | 7/1999 | Hoppe ............................ 345/419 |
| 5,936,869 | * | 8/1999 | Sakaguchi et al. .............. 364/578 |
| 5,943,056 | * | 8/1999 | Sato et al . ...................... 345/419 |
| 5,947,819 | * | 9/1999 | Ohshima ........................ 463/2 |
| 5,999,185 | * | 12/1999 | Kato et al. ...................... 345/420 |

FOREIGN PATENT DOCUMENTS 7-085307   3/1995   (JP) .

* cited by examiner

*Primary Examiner*—Mark Zimmerman
*Assistant Examiner*—Mano Padmanabhan
(74) *Attorney, Agent, or Firm*—Staas & Halsey LLP

(57) ABSTRACT

The present invention provides a 3D real-time graphics generator for generating progressive polygon data for rendering 3D graphics that can reduce the amount of data processing by a computer and a storage area for polygon data, facilitates editing of an object by using the progressive polygon data so as to reduce the amount of work of an animator. The progressive polygon data includes information about vertices of a basic polyhedron approximate to a shape of a 3D object and information about detailed vertices of a polyhedron in a level of approximation to the object that is higher than the basic polyhedron, which are determined progressively based on the level of approximation. In the generation of 3D real-time graphics, detailed vertices are sequentially merged into the vertices of the basic polyhedron so as to produce 3D polygon data.

48 Claims, 56 Drawing Sheets

$$\vec{P}_1 = \overrightarrow{V_{12}-V_{11}}$$

$$\vec{P}_2 = \overrightarrow{V_{13}-V_{11}}$$

$$\vec{P}_3 = \vec{P}_1 \times \vec{P}_2 = \overrightarrow{V_{12}-V_{11}} \times \overrightarrow{V_{13}-V_{11}}$$

$$\overrightarrow{V_{111}} = l_{111}\vec{P}_1 + m_{111}\vec{P}_2 + n_{111}\vec{P}_3$$

*FIG.31A*     *FIG.31B*     *FIG.31C*
*FIG.31D*     *FIG.31E*

APPARATUS AND METHOD FOR GENERATING PROGRESSIVE POLYGON DATA, AND APPARATUS AND METHOD FOR GENERATING THREE-DIMENSIONAL REAL-TIME GRAPHICS USING THE SAME

BACKGROUND OF THE INVENTION

1. Field of the Invention

The present invention relates to an apparatus and a method for generating progressive polygon data, and an apparatus and a method for generating three-dimensional real-time graphics using the progressive polygon data.

2. Description of the Prior Art

In recent years, in the field of computer graphics (hereinafter, referred to as "CG"), a variety of circuit boards dedicated to three-dimensional (hereinafter, referred to as "3D") representation (hereinafter, simply referred to as "boards") and machines for rendering 3D graphics are commercially available. Among these, inexpensive boards are available to be built into a personal computer (hereinafter, referred to as "PC"), as Windows 95® and Windows NT® become widespread. Moreover, inexpensive game machines making use of such boards are also available.

Under these circumstances, most boards and game machines represent data for 3D graphics as polygons. Boards that handle polygons range from high-performance boards to low-performance boards. For example, in a high-performance board, a fine 3D object (hereinafter, referred to as "object") can be rendered with 10,000 polygons, whereas in a low-performance board, it is necessary to render an object with about 500 polygons.

Conventionally, when a creator of animation (hereinafter, referred to as "animator") produced real-time animation with an animation tool such as SoftImage® (product of Microsoft Co.), at least 30,000 polygons were generally required.

However, in order to render graphics in real time on a currently available PC, 2,000 is the maximum number of polygons for use in rendering. Moreover, when a plurality of objects are rendered simultaneously, it is necessary to restrict the total number of polygons for rendering all objets to about 2,000 polygons.

Japanese Laid-Open Patent Publication (Tokkai-Hei) No.7-85307 discloses a technique for the reduction of the polygon data used for rendering an individual object, when a plurality of objects are rendered. In this technique, a plurality of sets of polygon data that have different resolutions are prepared previously, and the resolutions are changed depending on what is rendered, e.g., what kind of behavior is rendered or the like.

This method makes it possible to reduce the number of polygons according to the behavior of an object or the like when rendering the object, so that this method is effective to display a plurality of objects on the screen.

When an animation is stored in the form of polygon data, a large storage area is generally required for storing one animation. The above-described technique requires a large amount of polygon data corresponding to a plurality of resolutions to be stored previously, so that a large storage area is necessary for storing the polygon data.

Furthermore, in the above-described technique, since the same polygon data cannot be used for machines with different performance, it is necessary to prepare as many sets of animation as performance levels of the machines. Therefore, not only a large storage area is necessary, but also a large amount of work is required from the animator.

SUMMARY OF THE INVENTION

Therefore, with the foregoing in mind, it is an object of the present invention to provide an apparatus and a method for generating progressive polygon data that makes it possible to reduce the storage area for polygon data, and an apparatus and a method for generating 3D real-time graphics that makes it possible to reduce the work of the animator by using this progressive polygon data. Furthermore, it is another object of the present invention to provide a recording medium storing a program for realizing these methods and a recording medium storing the progressive polygon data.

In order to solve the above-described problems, a progressive polygon data generator includes a basic vertex determinator for determining vertices of a basic polyhedron approximate to a shape of a 3D object, a detailed vertex determinator for determining vertices of a polyhedron in a level of approximation to the object that is higher than the basic polyhedron progressively, based on the level of approximation, and a detailed vertex coordinate calculator for progressively calculating coordinates of vertices of a polyhedron determined by the detailed vertex determinator in a coordinate system determined based on a plurality of predetermined vertices of a polyhedron in a level of approximation that is lower than the polyhedron.

In one embodiment of the present invention, the basic vertex determinator determines vertices of the basic polyhedron by selection of an operator.

According to another aspect of the present invention, a progressive polygon data generator includes a basic vertex determinator for determining vertices of polygons approximate to cross-sections virtually segmenting a 3D object as vertices of a basic polyhedron approximate to a shape of the 3D object, a detailed vertex determinator for determining vertices of a polyhedron in a level of approximation to the object that is higher than the basic polyhedron progressively based on the level of approximation, and a detailed vertex coordinate calculator for calculating coordinates of vertices of a polyhedron progressively determined by the detailed vertex determinator in a coordinate system determined based on a plurality of predetermined vertices of a polyhedron in a level of approximation that is lower than the polyhedron.

Preferably, when points at which line segments represented by original polygon data obtained by geometric modeling of the 3D object intersect a face virtually bisecting the object are selected as control points so as to form a second polygonal shape by connecting the control points, the polygon approximate to each cross-section is a quadrilateral defined by four vertices that divide a total length of sides of the second polygonal shape into four equal lengths.

Preferably, the detailed vertex determinator progressively determines vertices of a polygon the number of which is increased so that the level of approximation to the cross-section is higher than the polygon approximate to the cross-section as detailed vertices, based on the increased number of vertices. This is because information about the position of the detailed vertex can be stored in a simplified form.

Preferably, the detailed vertex determinator includes an approximation level calculator for calculating a difference between a length of each side of the quadrilateral and a total length of sides of the second polygonal shape between both ends of each side of the quadrilateral, a comparator for comparing the difference calculated by the approximation level calculator with a predetermined value, and a progressive vertex determinator for determining a point that divides into two equal lengths the total length of the sides of the second polygonal shape between both ends of the side of the quadrilateral as a vertex of a polygon in a higher level of approximation when the comparator determines that the difference is the predetermined value or more, and not determining a vertex of a polygon in a higher level of approximation when the difference is determined to be smaller than the predetermined value. When a vertex of a polygon in a higher level of approximation is determined by the progressive vertex determinator, the approximation level calculator calculates the difference with respect to a newly produced side of the polygon whose vertex is determined, and the progressive vertex determinator determines a vertex of a polygon in a higher level of approximation recursively, until the progressive vertex determinator no longer determines a vertex of a polygon in a higher level of approximation. When the detailed vertex is determined by this process, it is possible to produce suitable 3D polygon data in accordance with the number of 3D polygons that are desired to be used for rendering.

Preferably, the detailed vertex determinator includes an approximation level calculator for calculating a difference between an area of each face of the basic polyhedron and an area on a surface of the 3D object defined by line segments connecting vertices of each face of the basic polyhedron, a comparator for comparing the difference calculated by the approximation level calculator with a predetermined value, and a progressive vertex determinator for determining a new vertex closer to the surface of the 3D object than the face when the comparator determines that the difference is the predetermined value or more, and not determining a new vertex when the difference is determined to be smaller than the predetermined value. When a new vertex is determined by the progressive vertex determinator, the approximation level calculator calculates a difference in the area with respect to a polyhedron defined by the face and the new vertex, and the progressive vertex determinator determines a vertex of a polygon in a higher level of approximation recursively, until the progressive vertex determinator no longer determines a new vertex. When the detailed vertex is determined by this process as well, it is possible to produce suitable 3D polygon data in accordance with the number of 3D polygons that are desired to be used for rendering.

Preferably, the progressive vertex determinator determines as the new vertex a point at which a normal line from a centroid of a corresponding face of a polyhedron intersects a face represented by original polygon data obtained by geometric modeling of the 3D object. This makes it possible to obtain suitable vertices for producing 3D polygon data.

According to another aspect of the present invention, a method for generating progressive polygon data includes a basic vertex determining step of determining vertices of a basic polyhedron approximate to a shape of a 3D object, a detailed vertex determining step of determining vertices of a polyhedron in a level of approximation to the object that is higher than the basic polyhedron progressively based on the level of approximation, and a detailed vertex coordinate calculating step of calculating coordinates of vertices of a progressively determined polyhedron in a coordinate system determined based on a plurality of predetermined vertices of a polyhedron in a level of approximation that is lower than the polyhedron. The detailed vertex determining step and the detailed vertex coordinate calculating step are performed until the level of approximation reaches a predetermined level of approximation.

Preferably, the level of approximation is determined by comparing a difference between an area of a face of a polyhedron defined by a vertex determined by the detailed vertex determining step and a plurality of predetermined vertices used for determining a coordinate system in the detailed vertex calculating step and an area of a potion corresponding to the face of the polyhedron represented by original polygon data obtained by geometric modeling of the object with a predetermined value. When the detailed vertex is determined by this process, it is possible to produce suitable 3D polygon data in accordance with the number of 3D polygons that can be used for rendering.

According to still another aspect of the present invention, a computer-readable recording medium storing a program is provided. The program includes a basic vertex determining step of determining vertices of a basic polyhedron approximate to a shape of a 3D object, a detailed vertex determining step of determining vertices of a polyhedron in a level of approximation to the object that is higher than the basic polyhedron progressively based on the level of approximation, and a detailed vertex coordinate calculating step of calculating coordinates of vertices of a progressively determined polyhedron in a coordinate system based on a plurality of predetermined vertices of a polyhedron in a level of approximation that is lower than the polyhedron. The detailed vertex determining step and the detailed vertex coordinate calculating step are performed until the level of approximation reaches a predetermined level of approximation.

According to yet another aspect of the present invention, a 3D real-time graphics generator includes a rendering polygon number determinator for determining the number of polygons for rendering 3D polygon data, and a 3D polygon data producer for producing 3D polygon data based on progressive polygon data generated by the progressive polygon data generator of the present invention in accordance with the number of polygons determined by the rendering polygon number determinator.

Preferably, the 3D polygon data producer produces 3D polygon data by determining vertices constituting 3D polygon data for rendering an object in accordance with the number of polygons determined by the rendering polygon number determinator. The utilization of the progressive polygon data of the present invention makes it possible to produce 3D polygon data easily.

Preferably, the 3D real-time graphics generator of the present invention further includes a basic vertex changer for changing positions of vertices of the basic polyhedron. When positions of vertices of the basic polyhedron are changed by the basic vertex changer, the 3D polygon data producer calculates absolute coordinates of detailed vertices whose positions are represented by coordinates in a coordinate system determined based on the vertices, based on changed positions of the vertices. The sequential computation for detailed vertices after the change of the position of the vertices of the basic polyhedron makes it possible to move the object or change the shape of the object easily.

In one embodiment of the present invention, the 3D real-time graphics generator further includes an animation data storage for storing a plurality of progressive polygon data added with information about rendering timing, and an animation rendering controller for rendering 3D polygon data produced by the 3D polygon data producer from the progressive polygon data stored in the animation data storage in accordance with the information about rendering timing. As described above, a plurality of polygon data representing movement of the object or change in the shape are sequentially rendered at a predetermined timing so as to produce animation. The use of the present invention facilitates movement of the object and change in the shape or the like, so that the amount of work of the animator can be reduced.

Preferably, the rendering polygon number determinator includes a moving speed calculator for calculating a moving speed of an object when 3D polygon data is rendered sequentially, based on the plurality of progressive polygon data and the information about rendering timing stored in the animation data storage. The rendering polygon number determinator determines the number of polygons based on the moving speed calculated by the moving speed calculator. When the moving speed is high, animation is naturally rendered even with a reduced number of polygons. Therefore, the reduction in the number of polygons for rendering an object makes it possible to render more objects.

Preferably, the rendering polygon number determinator comprises a Z value obtainer for obtaining a Z value representing a distance from a viewpoint to a position of a rendered object from the progressive polygon data. The rendering polygon number determinator determines the number of polygons based on the distance obtained by the Z value obtainer. When the distance between the viewpoint and the position of the object is long, the object can be rendered smoothly even with a reduced number of polygons. Therefore, the reduction in the number of polygons for rendering an object makes it possible to render more objects.

Preferably, the rendering polygon number determinator determines the number of polygons based on information about system resources on which the object is rendered. For example, a suitable number of polygons depends on system resources such as processing performance of CPU, a capacity of a memory or the like.

According to another aspect of the present invention, a method for generating 3D real-time graphics includes a rendering polygon number determining step of determining the number of polygons for rendering 3D polygon data, and a 3D polygon data producing step of producing 3D polygon data based on progressive polygon data generated by the progressive polygon data generator of the present invention, based on the number of polygons determined by the rendering polygon number determining step.

According to still another aspect of the present invention, a computer-readable recording medium storing a program is provided. The program executing a process includes a rendering polygon number determining step of determining the number of polygons for rendering 3D polygon data, and a 3D polygon data producing step of producing 3D polygon data based on progressive polygon data generated by the progressive polygon data generator of the present invention, based on the number of polygons determined in the rendering polygon number determining step. In the 3D polygon data producing step, the 3D polygon data is produced by determining vertices constituting the 3D polygon data for rendering an object, based on the number of polygons determined in the rendering polygon number determining step.

According to yet another aspect of the present invention, a computer-readable recording medium storing progressive polygon data is provided. 3D polygon data representing an 3D object is produced based on the progressive polygon in accordance with a determined number of polygons. The progressive polygon data includes information about vertices of a basic polyhedron approximate to a shape of the 3D object and information about a plurality of detailed vertices obtained by sequentially computing vertices from the vertices of the basic polyhedron in accordance with the determined number of polygons so that a polyhedron in a higher level of approximation to the 3D object is generated. The information of the detailed vertices is represented in the form of coordinates in a coordinate system determined based on a plurality of predetermined vertices of a polyhedron not including the detailed vertices.

These and other advantages of the present invention will become apparent to those skilled in the art upon reading and understanding the following detailed description with reference to the accompanying figures.

BRIEF DESCRIPTION OF THE DRAWINGS

FIGS. 31A to 30E are views showing contracted objects.

DESCRIPTION OF THE PREFERRED EMBODIMENTS

Hereinafter, the present invention will be described by way of embodiments with reference to the accompanying drawings.

Figure 1:
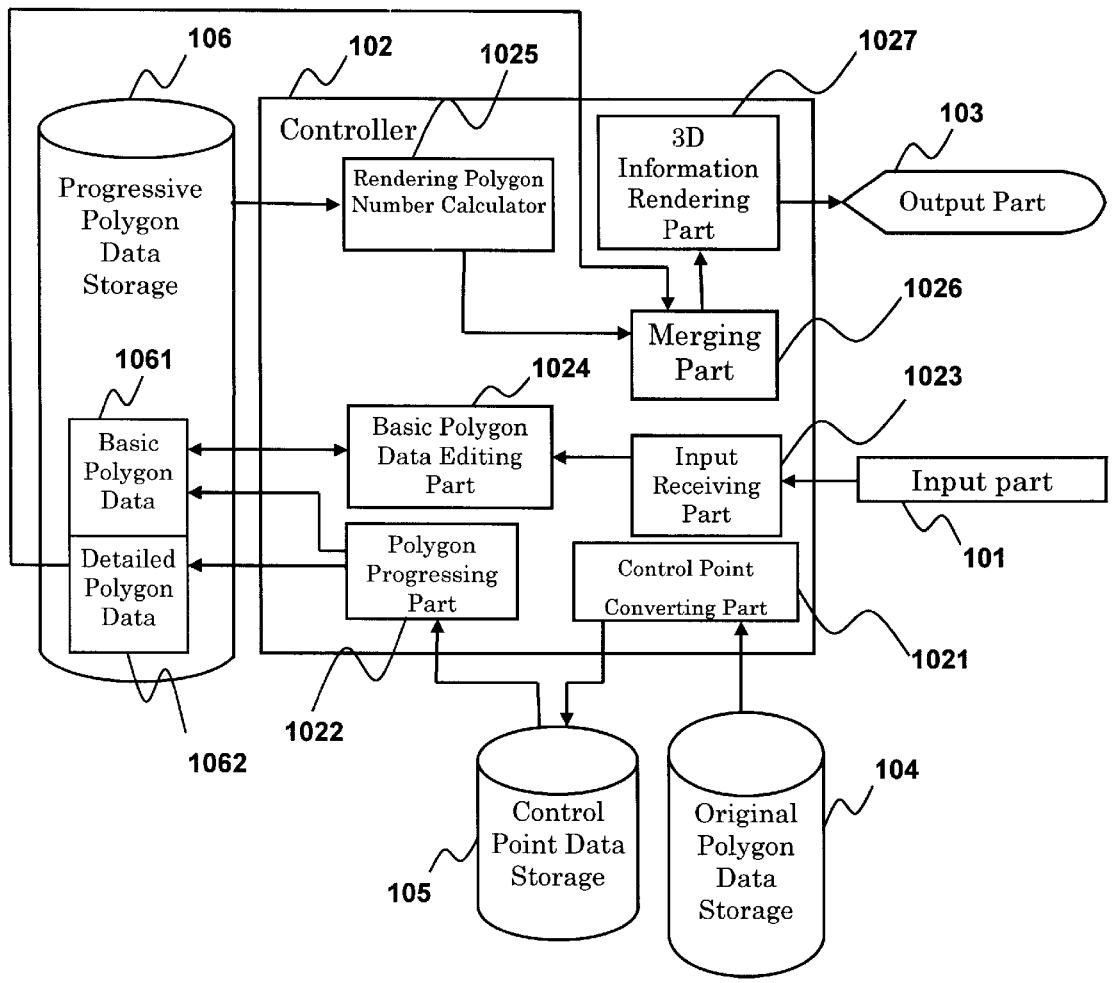
FIG. 1 is a block diagram showing the structure of a 3D real-time graphics generator according to one embodiment of the present invention.

FIG. 1 is a functional block diagram showing a structural example of a progressive polygon data generator and a 3D real-time graphics generator of the present invention. In this embodiment, one apparatus can realize both the process for generating progressive polygon data and the process for generating 3D real-time graphics (hereinafter, the apparatus in this embodiment is simply referred to as "3D real-time graphics generator"). However, as described later, the process for generating progressive polygon data and the process for generating 3D real-time graphics can be performed in separate apparatuses.

As shown in FIG. 1, the 3D real-time graphics generator includes an input part 101, a controller 102, an output part 103, an original polygon data storage 104, a control point data storage 105, and a progressive polygon data storage 106.

The user inputs and edits the polygon data with the input part 101. Specific examples of the input part 101 are a keyboard or a mouse.

The controller 102 controls the entire 3D real-time graphics generator of this embodiment. From the aspect of hardware, the controller 102 corresponds to a CPU and I/O interfaces between the CPU and the input/output devices. The controller 102 realizes the process for generating progressive polygon data and the process for generating 3D real-time graphics according to the present invention with a program. The controller 102 includes a control point converting part 1021, a polygon progressing part 1022, an input receiving part 1023, a basic polygon data editing part 1024, a rendering polygon number calculating part 1025, a merging part 1026, and a 3D information rendering part 1027 as functional parts.

The original polygon data storage 104 stores polygon data generated by 3D geometric modeling.

In the 3D real-time graphics generator of this embodiment, the 3D polygon data generating process is mainly performed by the control point converting part 1021 and the polygon progressing part 1022, and the 3D real-time graphics generating process is performed by the other parts. Therefore, the part for generating the progressive polygon data to be stored in the progressive polygon data storage 106 from the original polygon data stored in the original polygon storage 104 can be separated from the other parts and performed in another apparatus. Thus, the progressive polygon data generating process and the 3D real-time graphics generating process can be performed in separate apparatuses. The process procedure of each part of the controller 102 will be detailed later.

3D real-time graphics like are displayed on output part 103, which can be for example an output device of a display apparatus.

The original polygon data storage 104 stores original polygon data. Hereinafter, the data structure of the original polygon data will be described.

Figure 2:
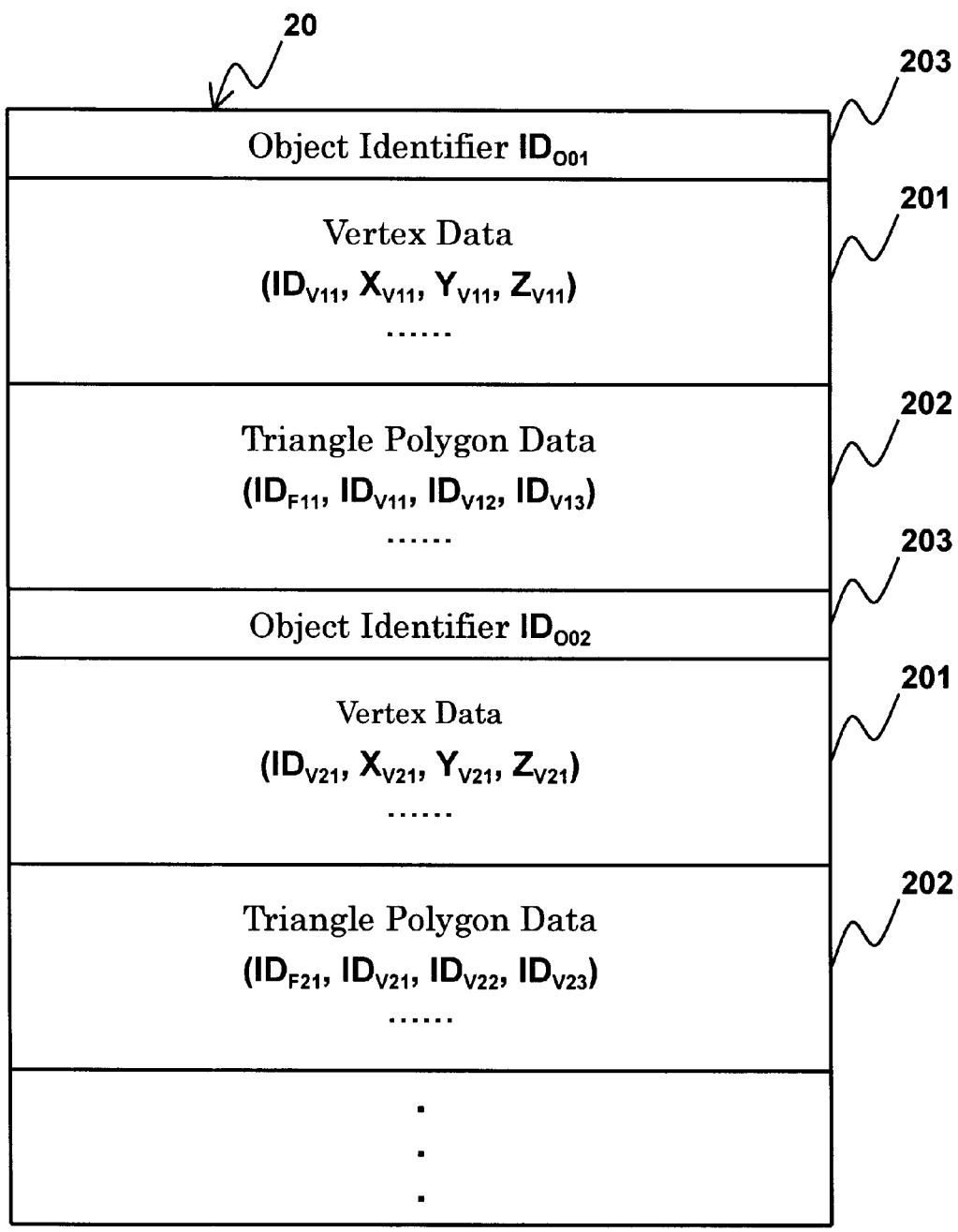
FIG. 2 is a diagram showing an example of a data structure of original polygon data.

FIG. 2 is a diagram showing an example of a data structure of the original polygon data of this embodiment. As shown in FIG. 2, original polygon data 20 include vertex data 201 and triangle polygon data 202. The vertex data 201 includes coordinates $(X_v, Y_v, Z_v)$ of the vertex of a triangle modeled from a real object together with the identifier $ID_v$ of the vertex. The triangle polygon data 202 includes a set of identifiers $ID_v$ of three vertices forming a triangle face together with the identifier $ID_F$ of the triangle face. An identifier $ID_O$ 203 is assigned to each object and stored. In this embodiment, a triangle is used as the polygon, but a rectangle or other polygonal shapes can be used as well.

The control point data storage 105 stores control point data converted from the original polygon data 20. The data structure of the control point data will be detailed later.

The progressive polygon data storage 106 stores progressive polygon data generated by the polygon progressing part 1022 based on the control points. The progressive polygon data includes the most coarse polygon data in the uppermost level (hereinafter, referred to as "basic polygon data") 1061 and polygon data in lower levels than the basic polygon data (hereinafter, referred to as "detailed polygon data") 1062. The detailed polygon data 1062 represents detailed vertices obtained on the basis of the basic polygon data. Based on the detailed polygon data 1062, more data for polygons having smaller faces is generated. The polygon progressing process and the data structure of the progressive polygon data including the basic polygon data 1061 and the detailed polygon data 1062 generated by the polygon progressing process will be detailed later.

Next, the process procedure of each part of the controller 102 will be described.

The control point converting part 1021 converts the original polygon data 20 into control point data. The control point converting process will be detailed later.

The polygon progressing part 1022 generates progressive polygon data from the control point data.

The input receiving part 1023 receives input instructions for editing the basic polygon data 1061 from the input part 101. The editing process for the basic polygon data 1061 will be detailed in the following.

The basic polygon data editing part 1024 edits the basic polygon data 1061 in response to the input received by the input receiving part 1023. Specifically, currently available polygon editing software or the like can be used as the basic polygon data editing part 1024. Edited basic polygon data can be stored separately from the basic polygon data that are not edited.

The rendering polygon number calculating part 1025 calculates the number of polygons for use in rendering an object on the output part 103. Here, the number of polygons for rendering corresponds to the number of levels of the detailed polygon data 1062 from the basic polygon data 1061 in the progressive polygon data. The method for calculating the rendering polygon number will be detailed later.

The merging part 1026 performs a process of computing the detailed polygon data 1062 from the basic polygon data 1061, based on the rendering polygon number obtained by the rendering polygon number calculating part 1025 (hereinafter, referred to as "merging") and produces 3D polygon data for the object to be rendered on the output part 103.

The 3D information rendering part 1027 receives the 3D polygon data processed by the merging part 1026 and renders the object on the output part 103. The 3D information rendering part 1027 stores a tool (not shown) for rendering the object on the output part 103 with the 3D polygon data generated in the 3D real-time graphics generating process in this embodiment. Currently available software can be used for this tool. In the following embodiments, SoftImage® by Microsoft Co. was used. However, other software can be used, as long as it can render a 3D object by obtaining data of vertices of polygons and data of surfaces formed by a plurality of vertices representing the 3D polygon data.

The 3D real-time graphics generator having the above-described structure of the present invention will be described by way of embodiments and the process procedure of the controller 102 in each embodiment will be detailed.

(Embodiment 1)

First, Embodiment 1 of the present invention will be described with reference to the accompanying drawings. In this embodiment, a first method for generating progressive polygon data from the original polygon data 20 will be described in detail.

First, the concept of generating progressive polygon data from the original polygon data 20 according to a method of this embodiment will be described.

Figure 3:
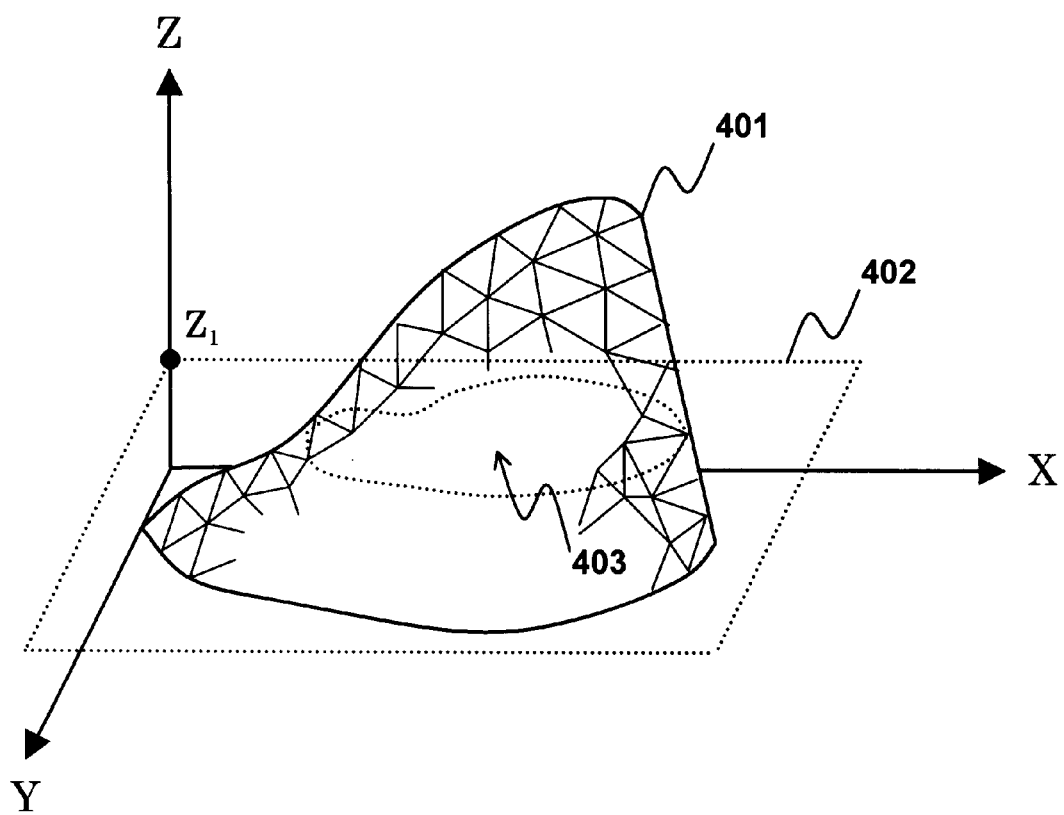
FIG. 3 is a view showing an example of a object for illustrating a method for generating progressive data for an object of a first embodiment.

FIG. 3 is a view showing an example of an object illustrating a method of this embodiment for generating progressive polygon data from the original polygon data 20. FIG. 3 shows an object 401 whose original polygon data has been obtained previously by geometric modeling on coordinate axes. In FIG. 3, not all triangles representing the original polygon data are shown. According to the method of this embodiment, first an object 401 is bisected virtually while sequentially changing the z coordinate of a (x, y) plane 402 vertical to the z axis, and the coordinates on the boundary of a cross-section 403 are obtained. In this manner, the original polygon data 20 is converted to control points. In this embodiment, the object is bisected in the (x, y) plane, but the object also can be bisected in the (y, z) plane or the (z, x) plane.

Hereinafter, the processes up to a process of calculating the basic polygon data 1061 and the detailed polygon data 1062 will be outlined by taking as an example the cross-section 403 obtained by virtually bisecting the object 401 in the (x, y) plane 402 at a z coordinate of $Z_1$.

Figure 4:
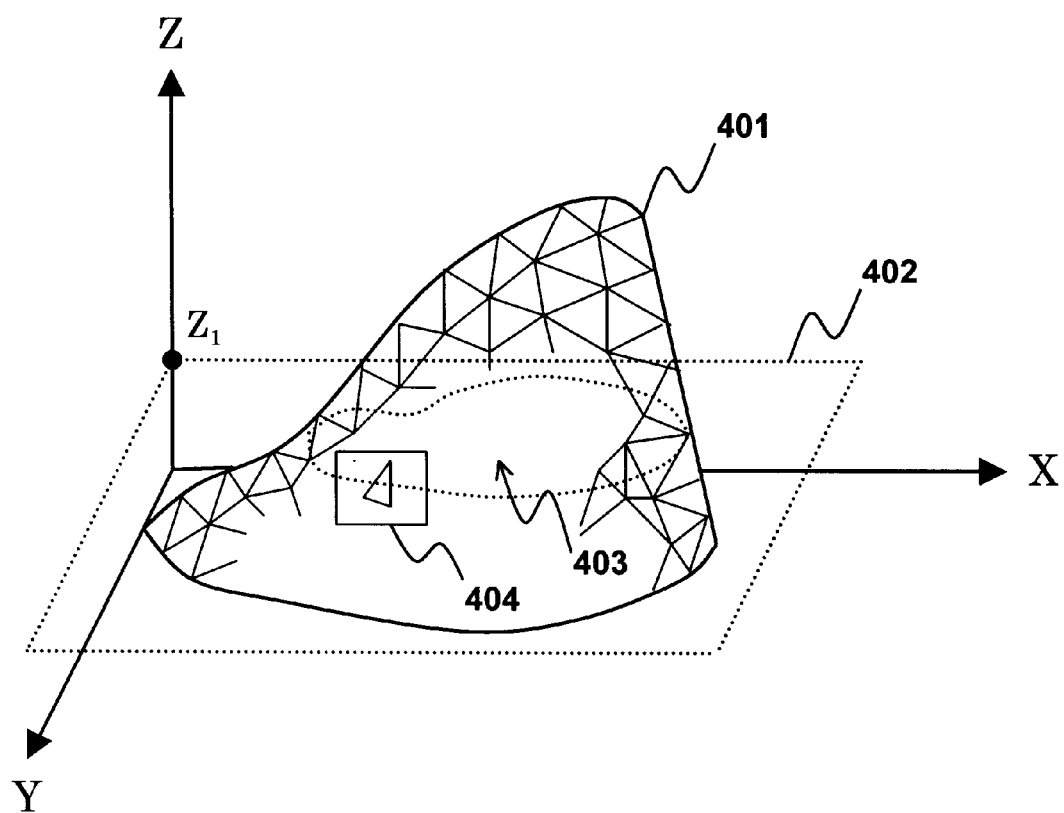
FIG. 4 is a view for illustrating a process when converting original polygon data present in the vicinity of a cross-section 403 to control point data.
Figure 5:
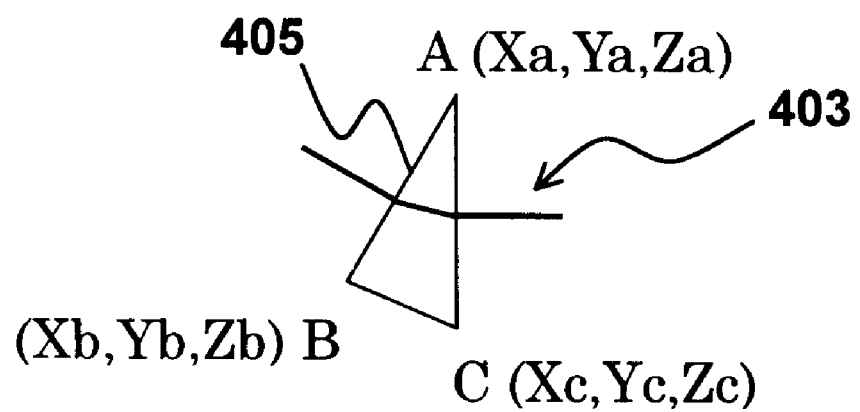
FIG. 5 is an enlarged view of a region 404.

FIG. 4 is a view for illustrating a process when converting the original polygon data 20 in the vicinity of the cross-section 403 to control point data. As shown in a region 404 of FIG. 4, many faces represented by the original polygon data intersect the cross-section 403 in the vicinity of the cross-section 403. FIG. 5 shows an enlarged view of the region 404 shown in FIG. 4.

Now, it is assumed that the coordinates of the vertices A, B and C of a triangle 405 represented by the original polygon data 20 that intersects the cross-section 403 are $(X_a, Y_a, Z_a)$, $(X_b, Y_b, Z_b)$, and $(X_c, Y_c, Z_c)$, respectively. The coordinates of the points on line segments AB and AC with the z coordinate of $Z_1$ can be obtained. The point on the line segment AB with the z coordinate of $Z_1$ is represented by P, and the point on the line segment AC with the z coordinate of $Z_1$ is represented by Q. The coordinates $(X_p, Y_p, Z_p)$ of P and the coordinates $(X_q, Y_q, Z_q)$ of Q can be obtained with the following equations.

$$X_p = X_a \times (Z_1 - Z_b)/(Z_a - Z_b)$$

$$Y_p = Y_a \times (Z_1 - Z_b)/(Z_a - Z_b)$$

$$Z_p = Z_1$$

$$X_q = X_a \times (Z_1 - Z_c)/(Z_a - Z_c)$$

$Y_q = Y_a \times (Z_1 - Z_c)/(Z_a - Z_c)$ $Z_q = Z_1$

The thus obtained points are allotted as "control points".

Figure 6:
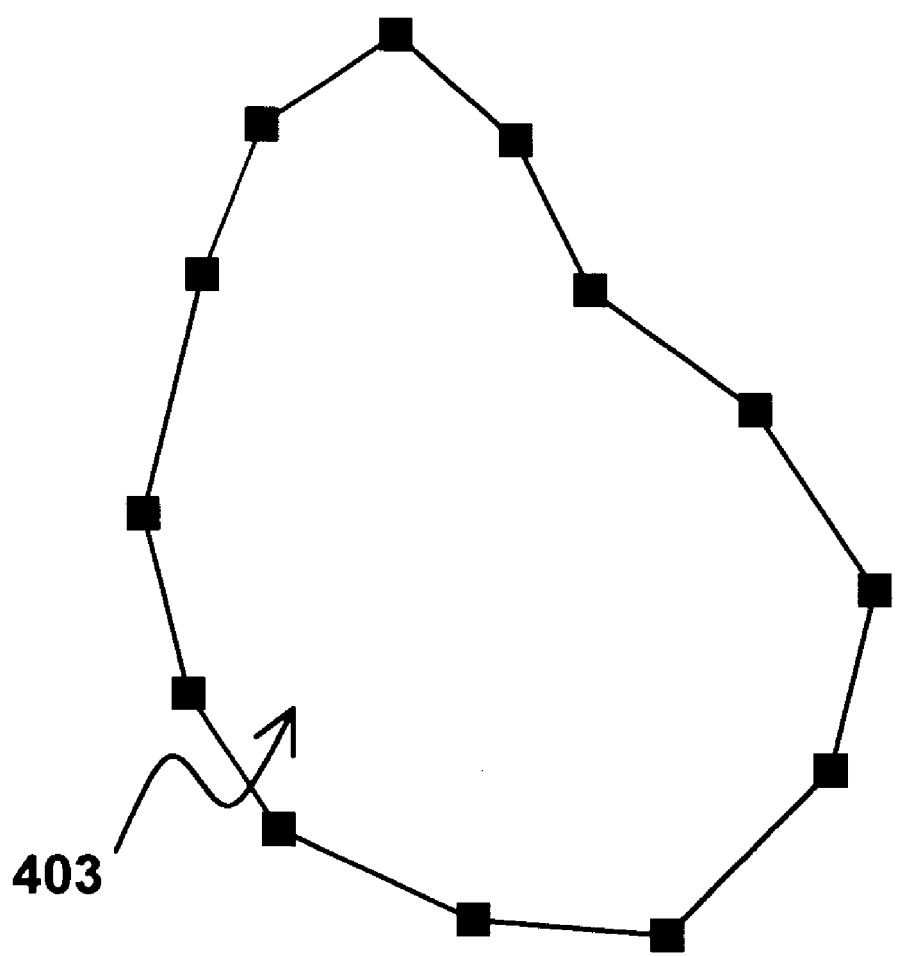
FIG. 6 is a diagram showing example of results of calculating all control points on the cross-section 403.

All the triangles represented by the original polygon data that intersect the cross-section 403 are subjected to the above-described process, so that the coordinates of control points in the cross-section 403 can be obtained. FIG. 6 is a diagram showing an example of results of the calculation for all the control points in the cross-section 403. In FIG. 6, black squares denote the control points.

Figure 7:
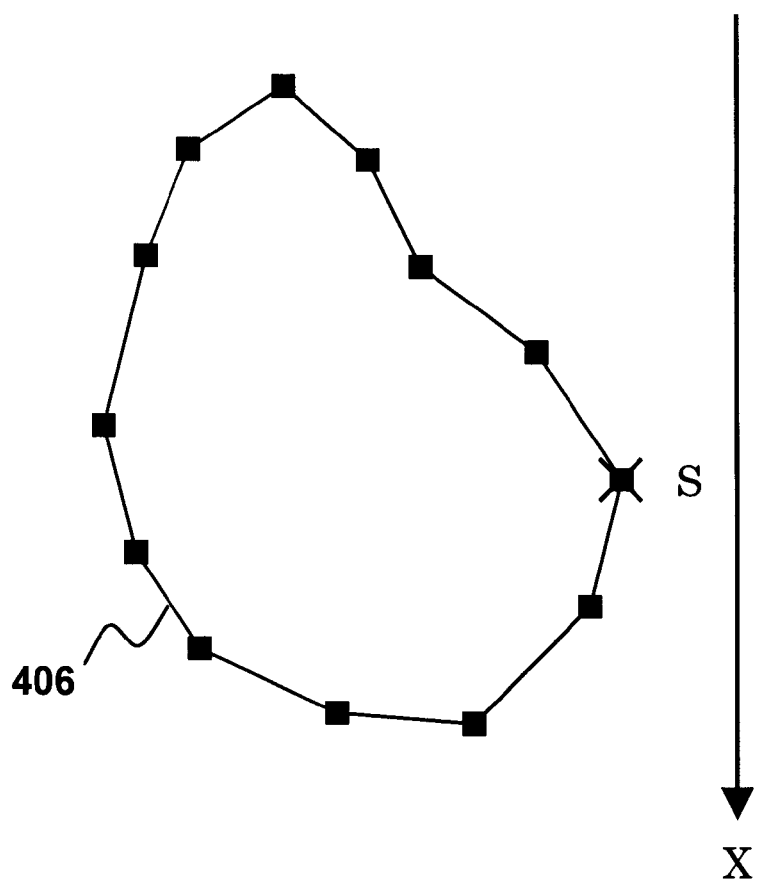
FIG. 7 is a diagram illustrating a boundary and a starting point.

The thus obtained coordinates of the control points are used to perform a polygon progressing process. FIG. 7 is a diagram for illustrating a boundary and a starting point in the polygon progressing process. As shown in FIG. 7, a line segment is formed between each pair of adjacent control points so as to form a boundary 406, and then a starting point S is selected from the control points on the boundary 406. Any control point among the control points on the boundary 406 can be selected as the starting point S. In this embodiment, the point closest to the x axis is selected as the starting point S. In FIG. 7, a cross denotes the starting point S.

Figure 8:
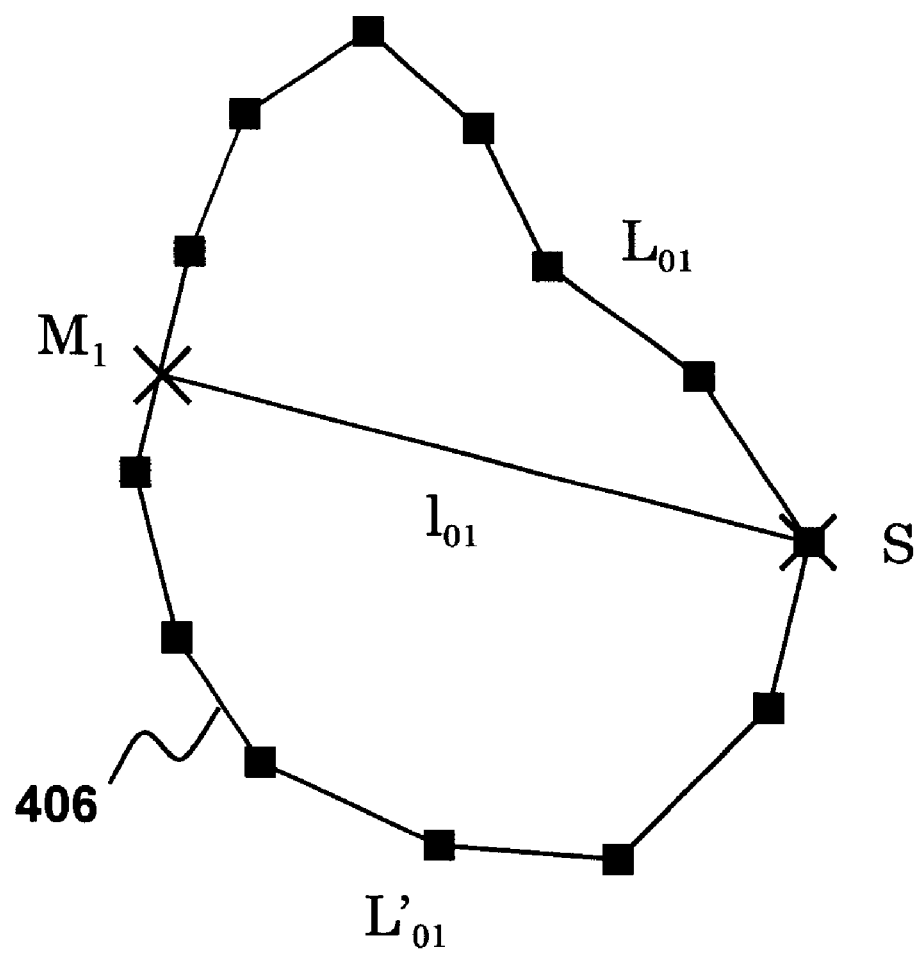
FIG. 8 is a diagram illustrating a median point.

The coordinates of the control points obtained in the above-described process define the length of the boundary 406. Therefore, the coordinates of a median point that lies in the middle of the full length of the boundary 406 starting from the starting point S can be obtained. FIG. 8 is a diagram showing an example of results of the calculation for the median point. In FIG. 8, $M_1$ denotes the median point. According to the definition of the median point, the length from the starting point S to the median point $M_1$ on the boundary 406 along the upper path in FIG. 8, which is denoted by $L_{01}$, is equal to that along the lower path, which is denoted $L'_{01}$.

Next, a length $l_{01}$ of a line segment between the starting point S and the median point $M_1$ is compared with the length $L_{01}$. When the absolute value ($|L_{01} - l_{01}|$) of the difference between the lengths $l_{01}$ and $L_{01}$ is below a predetermined value $\epsilon$, the polygon progressing process is not performed any more.

Figure 9:
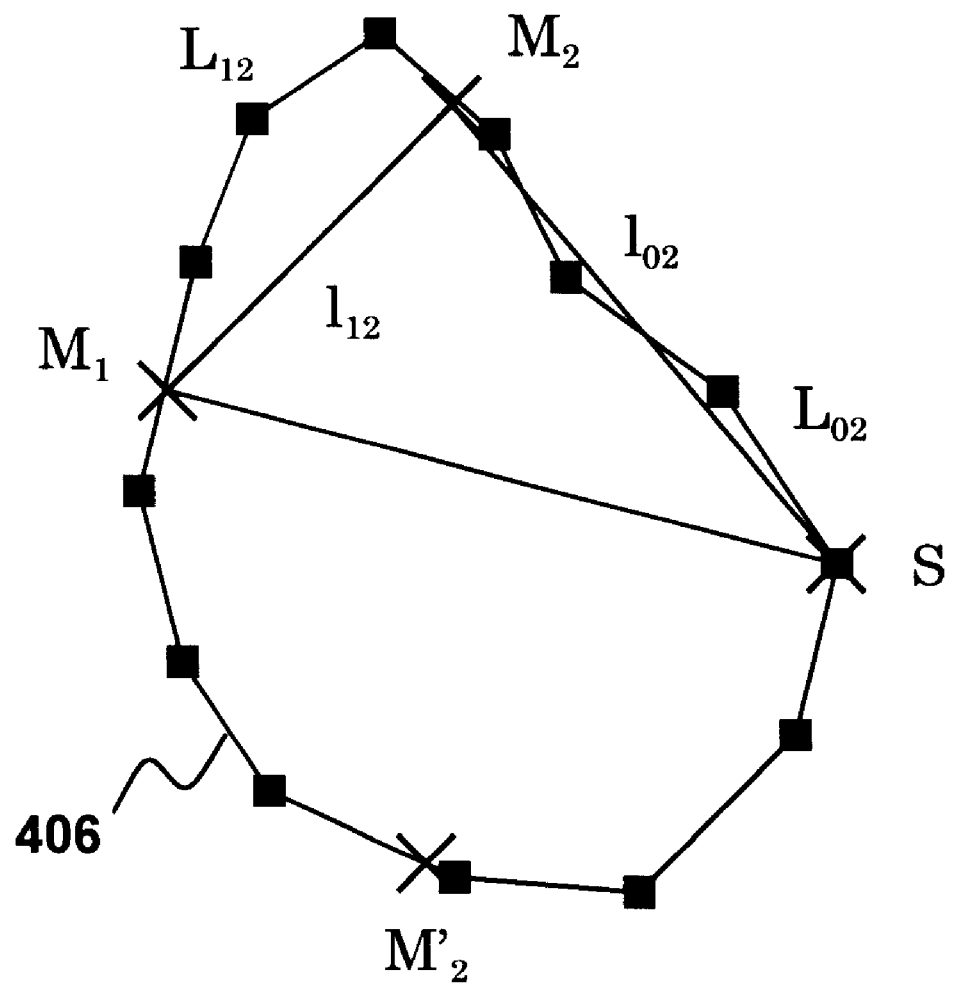
FIG. 9 is a diagram illustrating a median point $M_2$ between a starting point S and a median point $M_1$.

On the other hand, when the absolute value ($|L_{01} - l_{01}|$) of the difference between the lengths $l_{01}$ and $L_{01}$ is equal to a predetermined value $\epsilon$ or more, a median point between the starting point S and the median point $M_1$ is further obtained. FIG. 9 is a diagram showing the median point between the starting point S and the median point $M_1$. In FIG. 9, $M_2$ denotes the median point between the starting point S and the median point $M_1$. According to the definition of the median point, the length from the starting point S to the median point $M_2$ on the boundary 406, which is denoted by $L_{02}$, is equal to the length from the starting point $M_1$ to the median point $M_2$, which is denoted $L_{12}$.

Another point $M'_2$ on the other side can be obtained as the median point between the starting point S and the median point $M_1$, but subsequent processes will be described by taking the median point $M_2$ as an example. The process described below also can be applied to the median point $M'_2$.

In FIG. 9, $L_{02}$ denotes a length from the starting point S to the median point $M_2$ on the boundary 406, as described above, and $l_{02}$ denotes a length of a line segment $SM_2$. Similarly, $L_{12}$ denotes a length from the median points $M_1$ and $M_2$ on the boundary 406, as described above, and $l_{12}$ denotes a length of a line segment $M_1M_2$.

Figure 10:
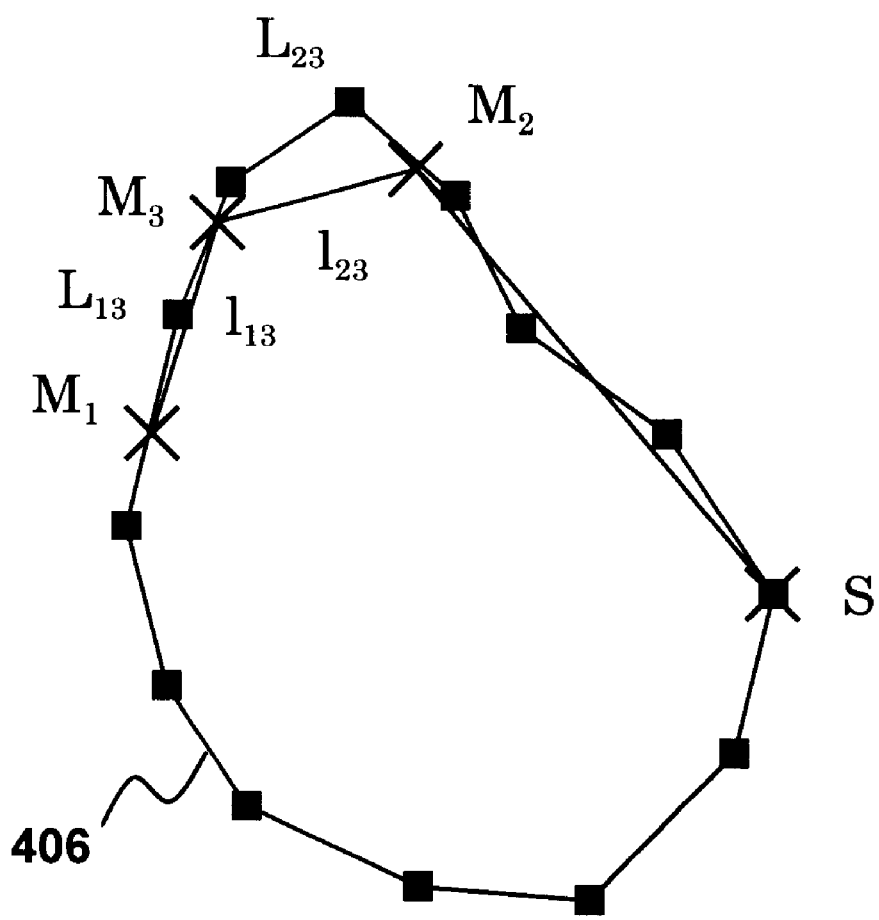
FIG. 10 is a diagram illustrating the case where another median point $M_3$ between the median point $M_1$ and the median point $M_2$ is obtained.

The lengths $L_{02}$ and $L_{12}$ are equal, but the lengths $l_{02}$ and $l_{12}$ are different. In the same manner as described above, a difference between $L_{02}$ and $l_{02}$ and a difference between $L_{12}$ and $l_{12}$ are obtained, and the absolute value ($|L_{02} - l_{02}|$) of the difference between $L_{02}$ and $l_{02}$ and the absolute value ($|L_{12} - l_{12}|$) of the difference between $L_{12}$ and $l_{12}$ are compared with a predetermined value $\epsilon$. When these are below the predetermined value $\epsilon$, no further median point is obtained. On the other hand, when the absolute value of the difference is equal to $\epsilon$ or more, a further median point between the starting point and the median point or between the median points is obtained. This iterative process makes it possible to obtain progressive vertex data that is allotted for a portion of a complex shape in detail (lower) levels and progressive vertex data that is allotted for a portion of a simple shape in coarse (upper) levels. These processes are performed on the side of the median point $M'_2$ as well. FIG. 10 is a diagram for illustrating the case where a further median point $M_3$ is obtained between the median points $M_1$ and $M_2$. In the example shown in FIG. 10, since the absolute value ($|L_{02} - l_{02}|$) of the difference between $L_{02}$ and $l_{02}$ is below the predetermined value $\epsilon$, there is no need to obtain a further median point between the starting point S and the median point $M_2$. However, since the absolute value ($|L_{12} - l_{12}|$) of the difference between $L_{12}$ and $l_{12}$ is equal to the predetermined value $\epsilon$ or more, a further median point $M_3$ is obtained between the median points $M_1$ and $M_2$.

Thereafter, the same process is performed recursively until the difference between the length L on the boundary 406 and the length l of a line segment between median points is below a predetermined value $\epsilon$ with respect to all median points so that progressive vertex data can be obtained. In the example shown in FIG. 10, since the absolute value ($|L_{13} - l_{13}|$) of the difference between $L_{13}$ and $l_{13}$ is below the predetermined value $\epsilon$, there is no need to obtain a further median point between the starting point $M_1$ and the median point $M_3$. However, since the absolute value ($|L_{23} - l_{23}|$) of the difference between $L_{23}$ and $l_{23}$ is equal to the predetermined value $\epsilon$ or more, a further median point $M_4$ is obtained between the median points $M_2$ and $M_3$.

The thus obtained starting point S and median points $M_1$, $M_2$, $M_3$, . . . constitute vertex data in the form of progressive polygon data. The starting point S and the median points $M_1$ and $M_2$ (and $M'_2$) obtained in the early stage constitute the basic polygon data 1061, and the median point $M_3$ and other detailed median points following $M_3$ constitute the detailed polygon data 1062 for a larger number of polygons, which are sequentially computed from the basic polygon data 1061.

Hereinafter, a process of calculating relative coordinates as information about the position of the vertex that constitutes the detailed polygon data 1062 will be described. The basic polygon data 1061 is used when the number of polygons for displaying on the screen is the smallest. Therefore, the basic polygon data 1061 can be stored in the form of absolute coordinates, that means coordinates with respect to the origin of coordinate axes. However, the detailed polygon data 1062 is sequentially computed dynamically to produce 3D polygon data, even if the basic polygon data is edited by the basic polygon data editing part 1024. Therefore, the detailed polygon data 1062 cannot be stored in the form of absolute coordinates.

Therefore, in this embodiment, for example, the median point $M_3$ is stored with relative coordinates to the median points $M_1$ and $M_2$.

Figure 11:
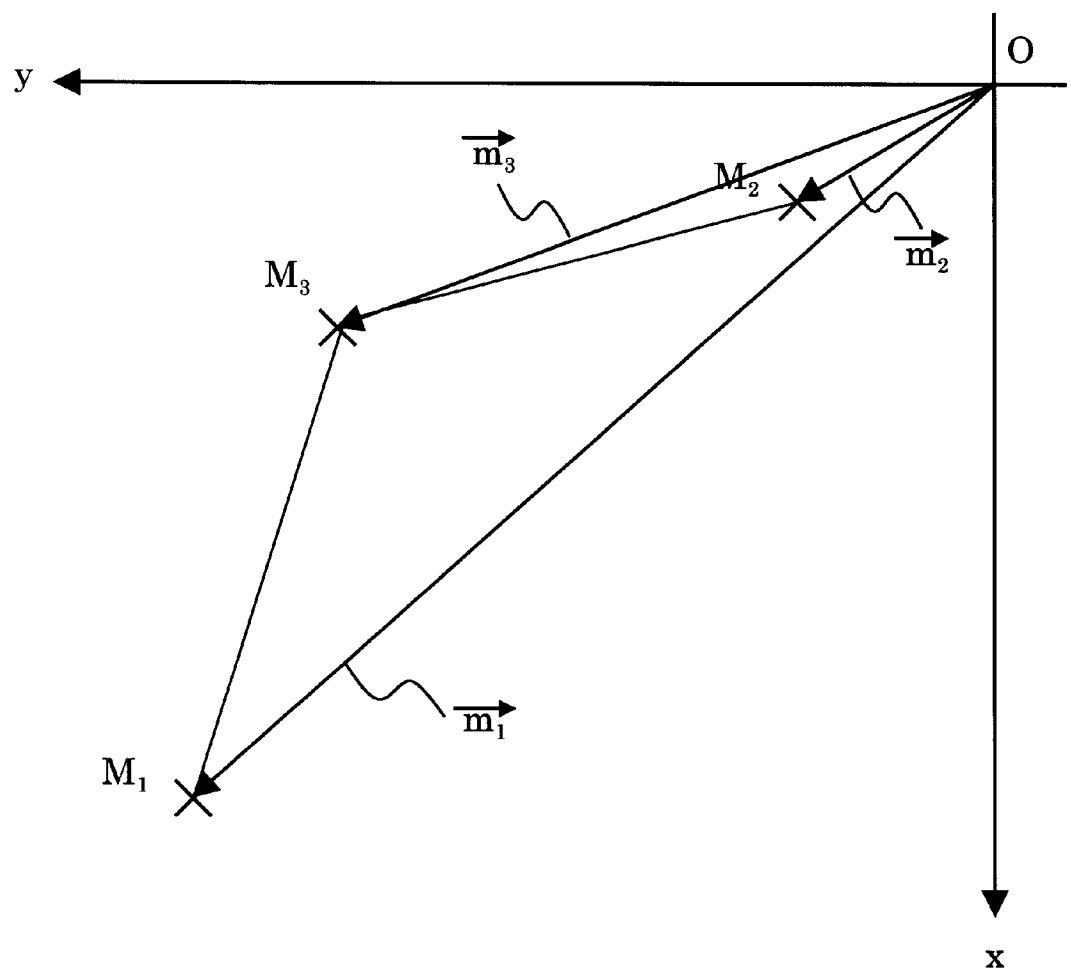
FIG. 11 is a diagram illustrating the relative coordinates of the median point $M_3$.

FIG. 11 is a diagram for illustrating relative coordinates of the median point $M_3$. Vectors from the origin O in the (x, y) plane including the median points $M_1$ and $M_2$ to the median points $M_1$ and $M_2$ are denoted by $m_1$ and $m_2$ respectively. A vector $m_3$ from the origin O to the median point $M_3$ is represented by $(am_1+bm_2)$ by suitably selecting real numbers a and b. Therefore, storing information about the vector $m_1$ and the vector $m_2$ and values for the real numbers a and b as data representing the median $M_3$ makes it possible to regenerate the median point $M_3$ in an appropriate relative position, even if the median points $M_1$ and $M_2$ are shifted due to a transformation process or the like.

Thus, progressive vertex data with respect to the cross-section 403 having a z coordinate of $Z_1$ can be obtained. This process is performed by changing the z coordinate, so that progressive vertex data for the entire object 401 can be obtained.

However, in order to obtain progressive polygon data from the progressive vertex data, triangles are formed in a level of interest by selecting suitable vertices. This is because to render an object on general 3D rendering software, in addition to the data concerning vertices forming a polygon, data concerning a face of the polygon is necessary in many cases.

Therefore, in order to obtain progressive polygon data from the progressive vertex data obtained according to the method of this embodiment, a process of grouping vertices forming triangles is performed with respect to the vertex data obtained in each level. More specifically, the coordinates of the basic vertex data in a cross-section are compared with those in another cross-section with one stage difference in the z coordinate, and vertices of a triangle constituting the basic polygon data are grouped. When obtaining detailed vertex data, the level of the hierarchy is also stored. The detailed vertices can be grouped in the level of interest by referring the stored level, so that a combination of vertices of a triangle forming the detailed polygon data can be obtained.

Figure 12:
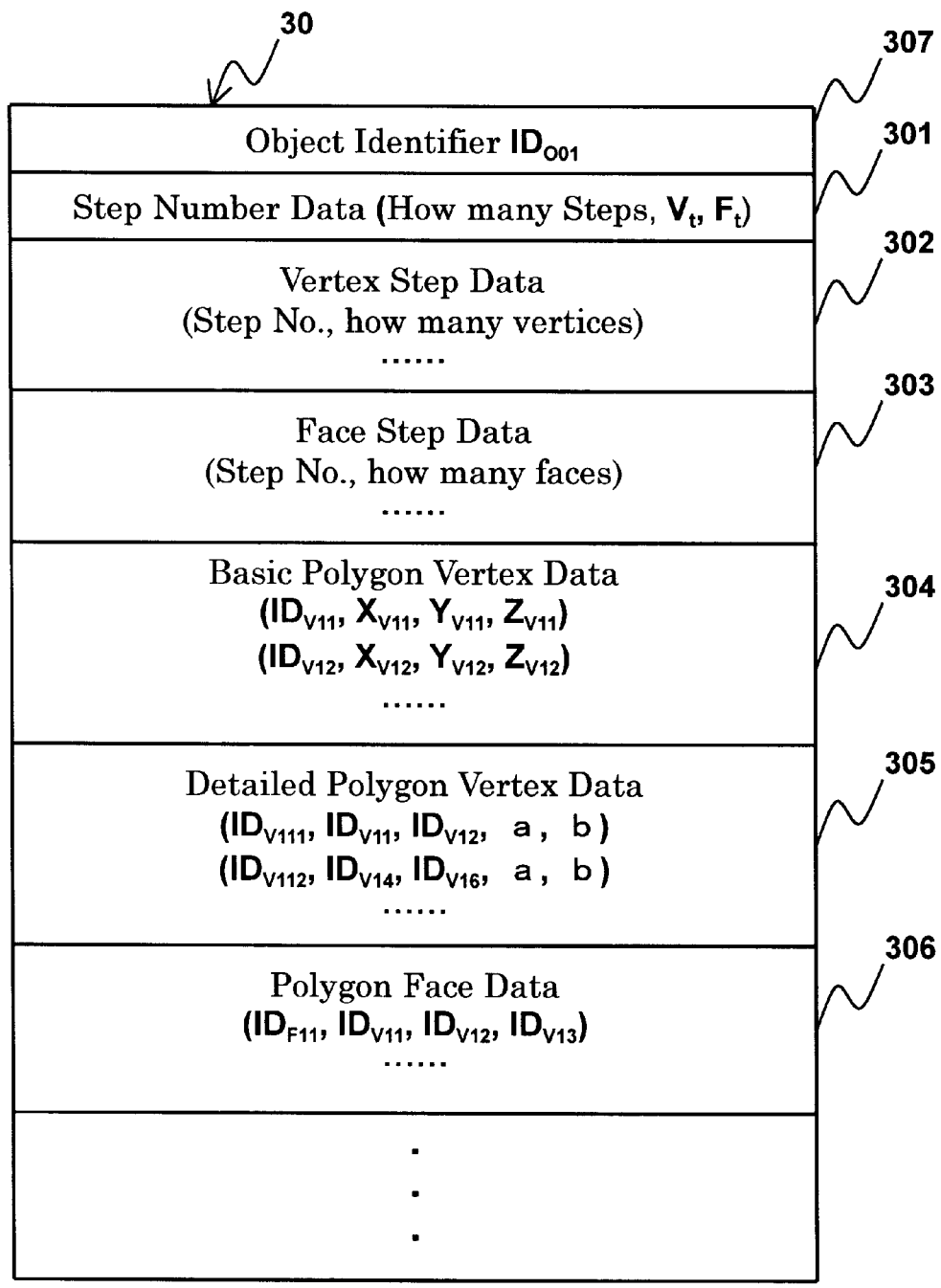
FIG. 12 is a diagram showing an example of a data structure of progressive polygon data in the first embodiment.

FIG. 12 is a diagram showing an example of a data structure of the thus obtained progressive polygon data. The data structure of the progressive polygon data shown in FIG. 12 will be more specifically described below.

Progressive polygon data 30 includes step number data 301, vertex step data 302, face step data 303, basic polygon vertex data 304, detailed polygon vertex data 305 and face data 306. An object identifier 307 is assigned to each object.

Herein, "step number" refers to the number of times that the computing of the detailed polygon data is iterated, starting from the basic polygon data. In order words, a larger number of steps means a larger number of polygons.

The step number data 301 includes the maximum number of steps with respect to an object and the number of vertices $V_t$ and the number of faces $F_t$ obtained by the maximum number of steps.

The number of vertices for every step number is stored as the vertex step data 302. In the progressive polygon data in this embodiment, step number 0 corresponds to the basic polygon data. In the vertex step data 302, the number of vertices corresponding to step number 0 is the number of vertices of the basic polygon data. As the step number increases, the number of vertices increases as well. Eventually, all data up to the number of vertices corresponding to the maximum step number, which is stored as the step number data 301, are stored as the vertex step data 302. The number of vertices corresponding to the maximum step number matches $V_t$, which is stored as the step number data 301. In the in-between step numbers, the vertex represented by the detailed polygon vertex data 305, which will be described later, is sequentially computed until the number of vertices reaches $V_t$.

When utilizing the progressive polygon data in this embodiment, a step number corresponding to a rendering polygon number is designated by the rendering polygon number calculating part 1025. In the merging part 1026, necessary progressive polygon data is acquired in accordance with the designated step number so as to produce the polygon data. Then, the polygon data is sent to the 3D information rendering part 1027.

Absolute coordinates of vertices constituting the basic polygon data are stored together with the identifiers for the vertices as the basic polygon vertex data 304. The number of the basic polygon vertex data 304 matches the number of vertices in step number 0 included in the vertex step data 302.

Relative coordinates of detailed vertices such as the median $M_3$ described earlier are stored in the detailed polygon vertex data 305. In this case, in order to represent the relative coordinates, the identifiers of reference vertices that are referred to when the relative coordinates are obtained are stored. Since the progressive polygon data in this embodiment has the same z coordinate as the reference vertices, it suffices to store two points as the reference vertices. Therefore, in this embodiment, the detailed polygon vertex data 305 includes suitable real numbers a and b that determine the coordinates of the detailed vertex based on the sum of the vectors from the origin to the two reference vertices on the (x, y) plane, as described above.

A combination of identifiers of vertices forming a triangle in a level at a predetermined depth by the basic polygon vertex data and the detailed polygon vertex data is stored as the polygon face data 306. The combination is assigned an identifier $ID_F$ for identifying a triangle face represented by the polygon face data.

Next, the process procedure of the controller 102 in generating progressive polygon data in the 3D real-time graphics generator in this embodiment will be described. This process is performed based on the above-described generation of the progressive polygon data.

Figure 13:
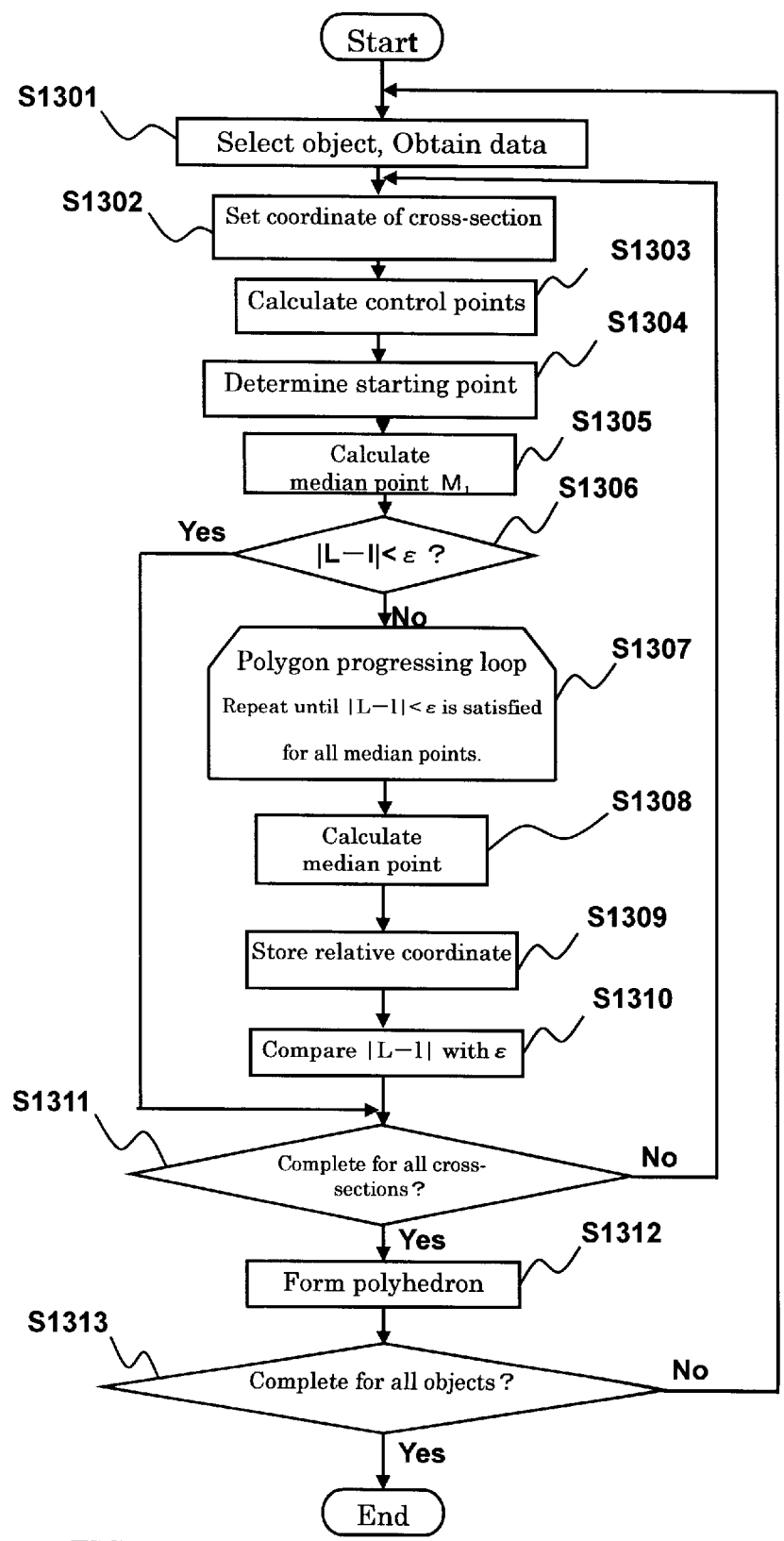
FIG. 13 is a flow chart showing the process procedure of a controller when generating progressive polygon data in the first embodiment.

FIG. 13 is a flow chart showing the process procedure of the controller 102 when a polygon progressing process is performed. The process shown in FIG. 13 is mainly performed by the control point converting part 1021 and the polygon progressing part 1022.

First, the control point converting part 1021 selects an object for the polygon progressing process and acquires the original polygon data of the object from the original polygon data storage 104 (S1301).

Next, the control point converting part 1021 sets the coordinates of a cross-section in the manner described above (S1302). The cross-section is not necessarily orthogonal to the z axis, but can be set arbitrarily.

Next, the control point converting part 1021 performs the control point calculating process (S1303). The method for calculating control points has been described, so that it is not further described here. The obtained control point data is stored in the control point data storage 105.

Next, the polygon progressing part 1022 performs a polygon progressing process. First, the polygon progressing part 1022 calculates the coordinates of the starting point (S1304) and calculates the coordinates of the first median point $M_1$ (S1305) with respect to the cross-section whose control points have been calculated.

In this process, the difference between a length L on the boundary and a length l of the line segment with respect to the starting point and the median point $M_1$ is calculated (S1306). When this difference is below a predetermined value $\epsilon$ (S1306: Yes), the calculation stops without entering a polygon progressing loop thereafter, and a next cross-section is processed.

When the difference is not below the predetermined value ε (S1306: No), the process proceeds to a polygon progressing loop (S1307). More specifically, the median point between the starting point and the median point or between the median points is calculated (S1308), the relative coordinates of the obtained median point are stored in the progressive polygon data storage 106 (S1309). The difference between the length L on the boundary and the length l of the line segment with respect to the obtained median point is compared with the predetermined value ε (S1310).

This recursive evaluation continues until the difference between the length l of the line segment and length L of the corresponding boundary becomes lower than the predetermined value ε for all the median points. In this manner, the relative coordinates, which are vertex data of the detailed polygon data, can be obtained.

The predetermined value ε depends on such factors as the shape of the object, the performance of the machine or the like, and it is possible to predetermine and set a value that is suitable for the system resources.

When the above-described recursive evaluation is completed with respect to one cross-section, the next cross-section is subjected to the recursive evaluation (S1311: No). When all cross-sections are subjected to the recursive evaluation, a combination of vertices forming a triangle as a polygon is obtained in the level of interest, so that polygons are formed in a level of interest (S1312). Thus, the polygon face data 306 is obtained. Furthermore, this process is repeated (S1313: No) until all necessary objects have been processed. Thus, the necessary progressive polygon data can be eventually obtained.

In the obtained progressive polygon data, as described above, the detailed polygon data is sequentially computed from the basic polygon data so as to generate progressive polygon data in accordance with the number of polygons for displaying graphics on the screen, so that 3D polygon data with a suitable number of polygons can be produced.

As described above, the use of the progressive polygon data generated by the method for generating progressive polygon data as described above makes it possible to take any forms in accordance with the number of polygons that can be used for displaying on the screen and to reduce a storage area for polygon data.

(Embodiment 2)

Next, a second embodiment of the present invention will be described with reference to the accompanying drawings.

In this embodiment, a second method for generating progressive polygon data according to the present invention, namely, a second method for generating the hierarchy of the original polygon data 20, will be described.

The method for generating the hierarchy in this embodiment will be described in detail.

Figure 14:
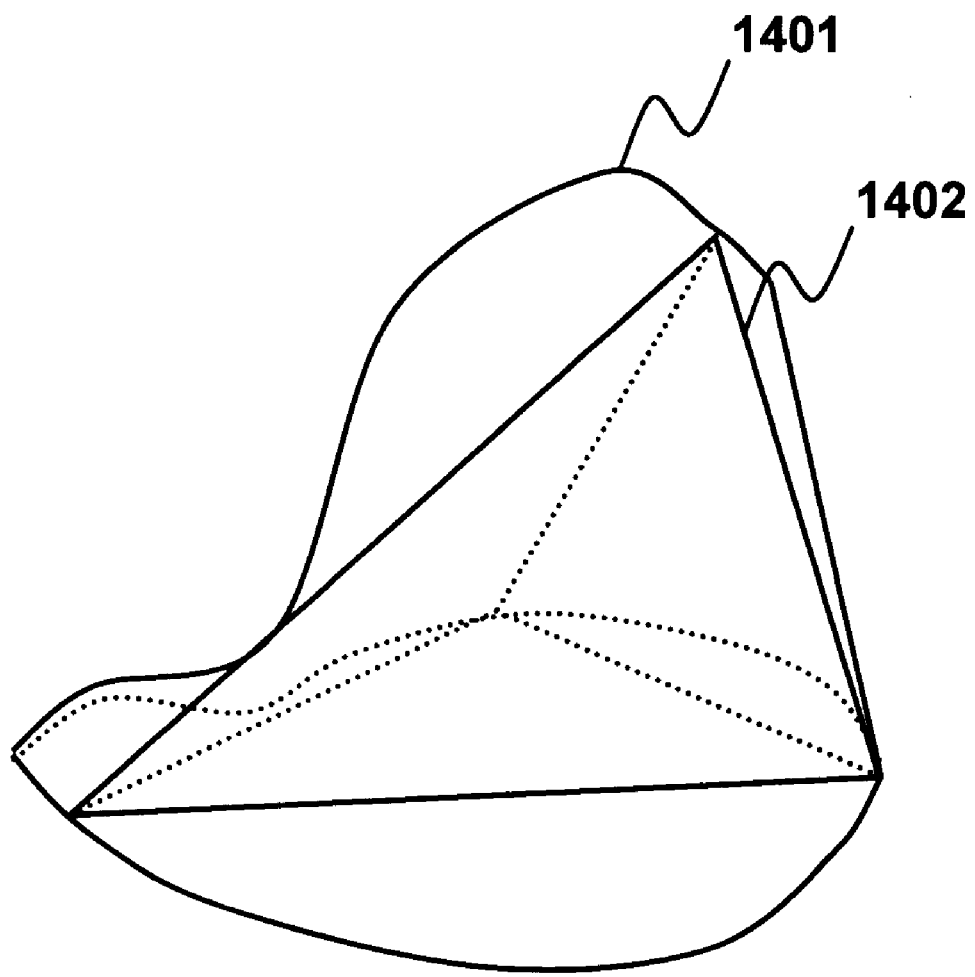
FIG. 14 is a view showing an example of a tetrahedron inscribed inside an object.

FIG. 14 shows an example of an object for explaining the concept in this embodiment.

In this embodiment, as shown in FIG. 14, a first tetrahedron 1402 that is inscribed inside an object 1401 is formed virtually. The coordinates of the vertex of the first tetrahedron 1402 represent vertex data of basic polygon data. The coordinates of the vertex of the first tetrahedron 1402 can be designated by the user with a 3D information editing tool, or can be computed automatically.

Figure 15:
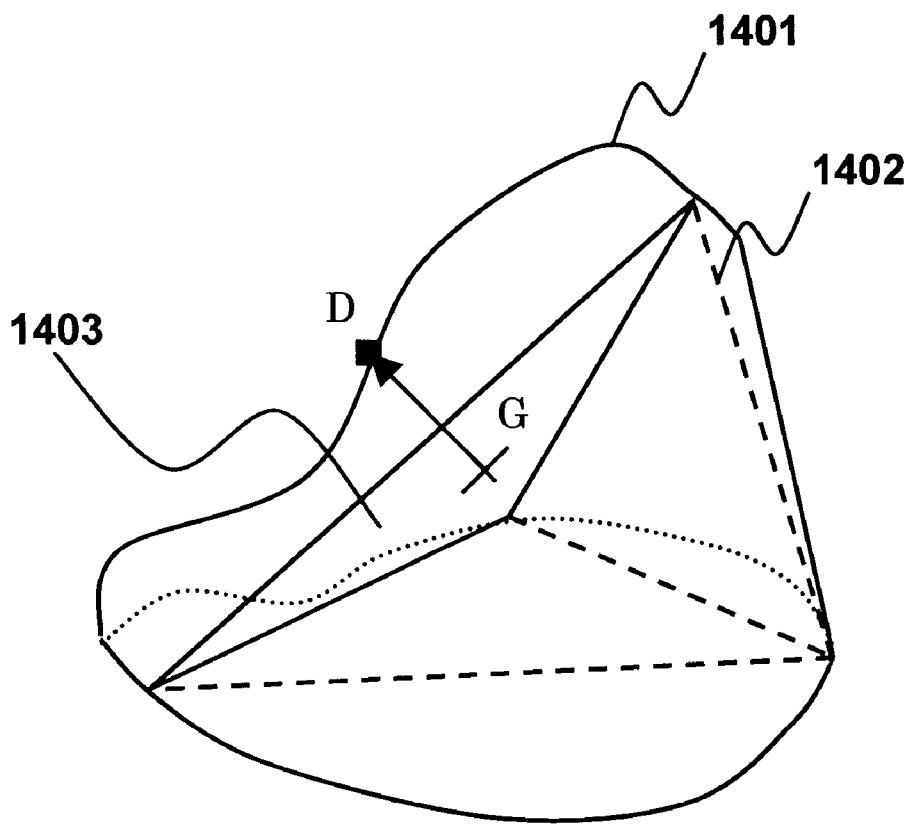
FIG. 15 is a view illustrating the process when forming a tetrahedron one face of which is inscribed inside the object.

Next, in this embodiment, progressive polygon data is generated by forming a new tetrahedron that shares one face with the first tetrahedron 1402. FIG. 15 shows an example of how to form a tetrahedron whose base is one face 1403 of the first tetrahedron.

Figure 16:
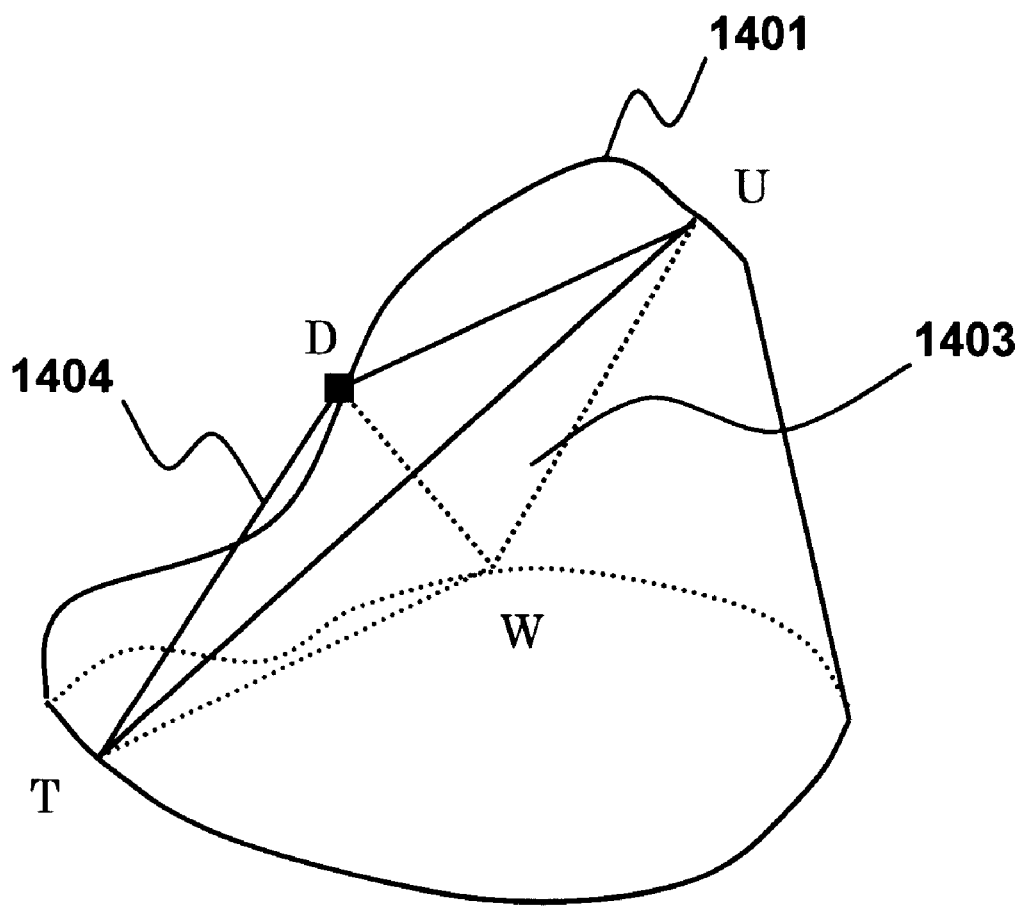
FIG. 16 is a view showing how another tetrahedron is produced.

As shown in FIG. 15, in this embodiment, coordinates of a centroid G of the face 1403 of the first tetrahedron are calculated. Thereafter, the point at which a perpendicular line extending from the centroid G intersects the surface of the object 1401 is denoted by D. Then, a new tetrahedron can be formed having the point D as one vertex. FIG. 16 shows the new tetrahedron 1404 formed in this manner.

In the first embodiment, the difference between the length L on the boundary and the length l of the line segment is compared with a predetermined value ε. In this embodiment, the object 1401 is segmented by a face formed by the shortest lines along the surface connecting the vertices of the tetrahedron. Then, a difference between a surface area of the segmented part of the object 1401 and an area of the corresponding face of the tetrahedron is compared with a predetermined value, so as to determine the level of hierarchy.

More specifically, for example in FIG. 16, the vertices of the face 1403 of the first tetrahedron are denoted by T, U and W. The shortest lines along the surface connecting the vertex D of the new tetrahedron and the vertices T and U are denoted by TD, DU and TU. A difference between a surface area of a portion on the object 1401 segmented by the face formed by the lines TD, DU and TU and an area of a triangle TDU is calculated. When the difference between the surface area of the portion and the area of the triangle is below a predetermined value, it is determined that it is not necessary to form a new tetrahedron including the triangle TDU any more. When the difference between the surface area and the area is not below the predetermined value, the centroid of the triangle TDU is calculated so as to form a new tetrahedron with the same process as described above.

The above-described process is repeated recursively until the difference becomes lower than the predetermined value with respect to all the faces. Thus, the progressive polygon data can be obtained. In the progressive polygon data in this embodiment, the coordinates of the vertex D of the new tetrahedron are stored in the form of relative coordinates in the coordinate system defined by using the vertices T, D and U forming a face of the first tetrahedron, more specifically, by using a vector from the vertex T to the vertex D and a vector from the vertex T to the vertex U and an outer product of the vectors.

Figure 17:
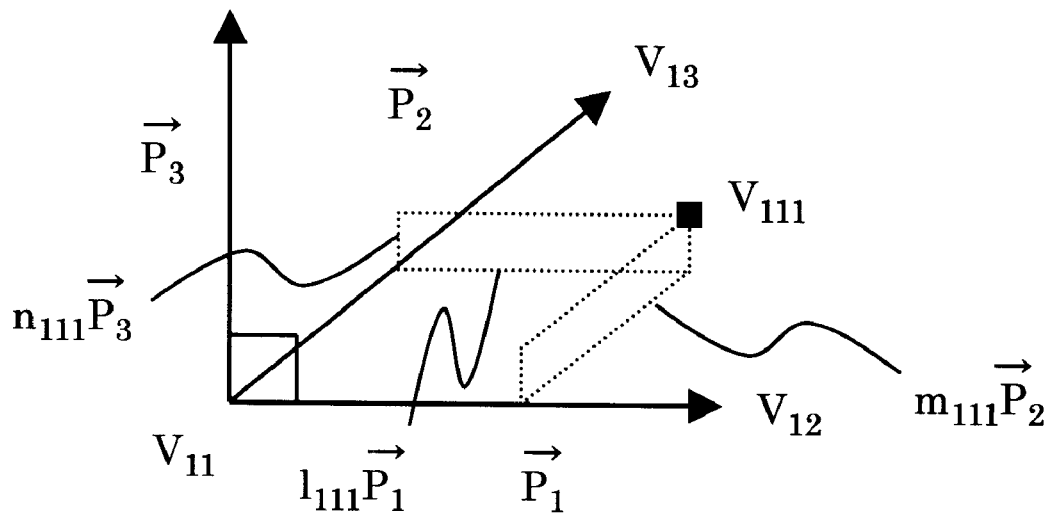
FIG. 17 is a diagram illustrating relative coordinates of new points.

FIG. 17 is a diagram for illustrating the relative coordinates of a new vertex in detail In FIG. 17, it is assumed that $V_{11}$ corresponds to the vertex T, $V_{12}$ corresponds to the vertex W, $V_{13}$ corresponds to the vertex U, and $V_{111}$ corresponds to the new vertex D. When a vector from $V_{11}$ to $V_{12}$ is denoted by $P_1$, and a vector from $V_{11}$ to $V_{13}$ is denoted by $P_2$, a vector $P_3$ can be obtained as an outer product of the vectors $P_1$ and $P_2$.

The relative coordinates of the new vertex $V_{111}$ in the coordinate system having the origin of $V_{11}$ can be represented with the vectors $P_1$, $P_2$, and $P_3$. More specifically, $V_{111}=l_{111}P_1+m_{111}P_2+n_{111}P_3$, where l, m and n are suitable real numbers.

Figure 18:
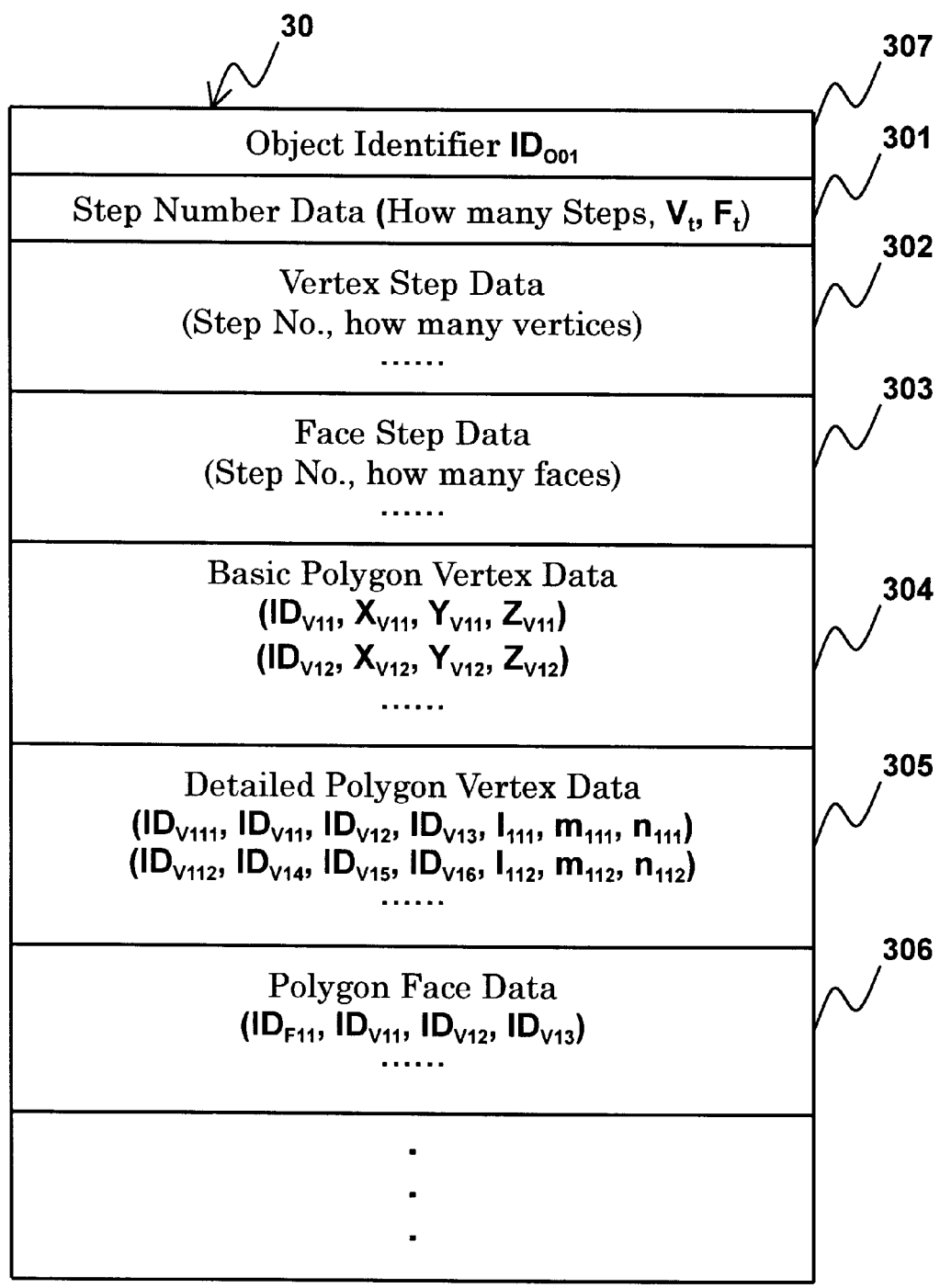
FIG. 18 is a diagram showing an example of a data structure of progressive polygon data in a second embodiment.

FIG. 18 is an example of a data structure of the progressive polygon data in this embodiment. The progressive polygon data in this embodiment is different from that in the first embodiment in the content of the detailed polygon vertex data 305. This is because it is necessary to store three identifiers for three reference vertices in this embodiment. In other words, attributes of the vectors from the first vertex of the three vertices to the other two vertices and the outer products of the vectors are stored as $l_{111}$, $m_{111}$ and $n_{111}$ obtained in the above equation. Thus, the relative coordinates in the three dimensional coordinates are stored.

Similarly to the first embodiment, the detailed polygon data is sequentially computed from the basic polygon data so as to generate progressive polygon data, so that 3D polygon data with a suitable number of polygons can be produced. In order words, as described above, since the coordinates of the new vertex are stored in the form of coordinates relative to one face of the original tetrahedron, a suitable 3D polygon data can be produced even when the basic polygon data 1061 is edited.

The process procedure of the controller 102 when generating progressive polygon data based on the above-described concept will be described below.

Figure 19:
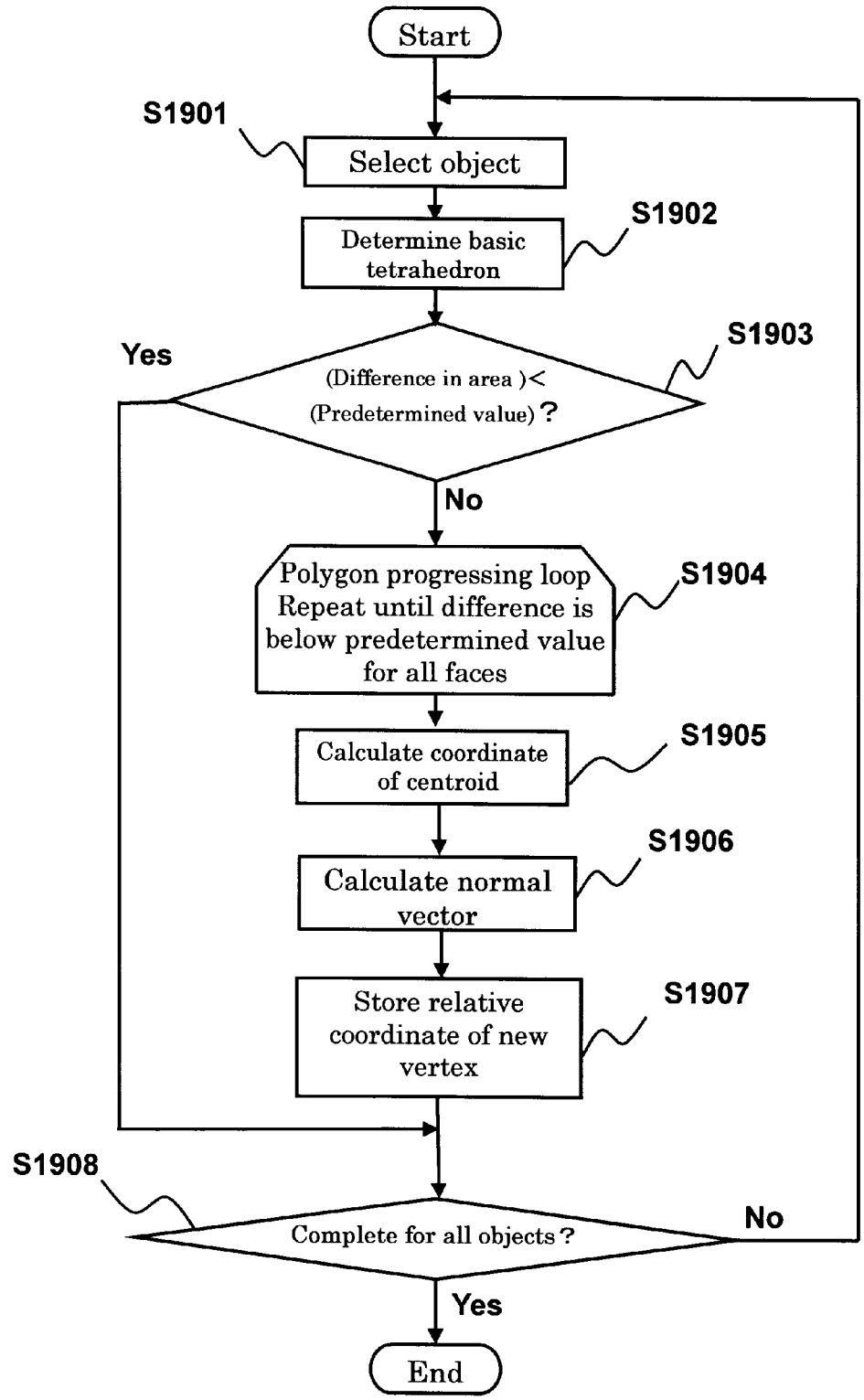
FIG. 19 is a flow chart showing the process procedure of a controller when generating progressive polygon data in the second embodiment.

FIG. 19 is a flow chart showing the process procedure of the controller 102 when generating progressive polygon data according to the method of this embodiment.

First, an object is selected (S1901), and the coordinates of the first tetrahedron as shown in FIG. 15 are determined with respect to the selected object (S1902). The coordinates can be determined automatically by the controller 102, or can be selected by the user.

Next, according to the above-described method, the difference between an area of each face of the tetrahedron and a surface area of a corresponding portion of the object is calculated and compared with a predetermined value (S1903). When the difference is below the predetermined value with respect to all the faces of the tetrahedron (S1903: Yes), there is no need to further perform the polygon progressing process. Then, the next object is selected.

When the difference is not below the predetermined value with respect to all the faces of the tetrahedron (S1903: No), the polygon progressing process is continued, as described above (S1904). More specifically, the coordinates of the centroid of the face with respect to which the difference is not below the predetermined value is calculated (S1905), and the normal vector is obtained (S1906). Then, the relative coordinates of a new vertex are stored as the detailed polygon data (S1907).

When all the objects to be rendered have been subjected to this recursive evaluation (S1908:Yes), the polygon progressing process is complete.

As described above, the use of the progressive polygon data generated by the method for generating progressive polygon data as described above makes it possible to take any forms in accordance with the number of polygons that can be used for displaying on the screen and to reduce a storage area for polygon data.

(Embodiment 3)

Next, a third embodiment of the present invention will be described with reference to the accompanying drawings.

In this embodiment, a method for managing the number of polygons for rendering in a 3D real-time graphics generator according to the present invention will be described.

As described in Embodiments 1 and 2, the use of the progressive polygon data generated by the methods of the present invention provides polygon data with a desired level of coarseness. An important issue is how to determine the number of polygons for rendering polygon data. If the number of polygons can be determined by system resources for rendering, the system resources for rendering are assigned as parameters, and the detailed polygon data is sequentially computed from the basic polygon data in accordance with the parameters. In this manner, polygon data with a desired level of coarseness can be obtained.

Figure 20:
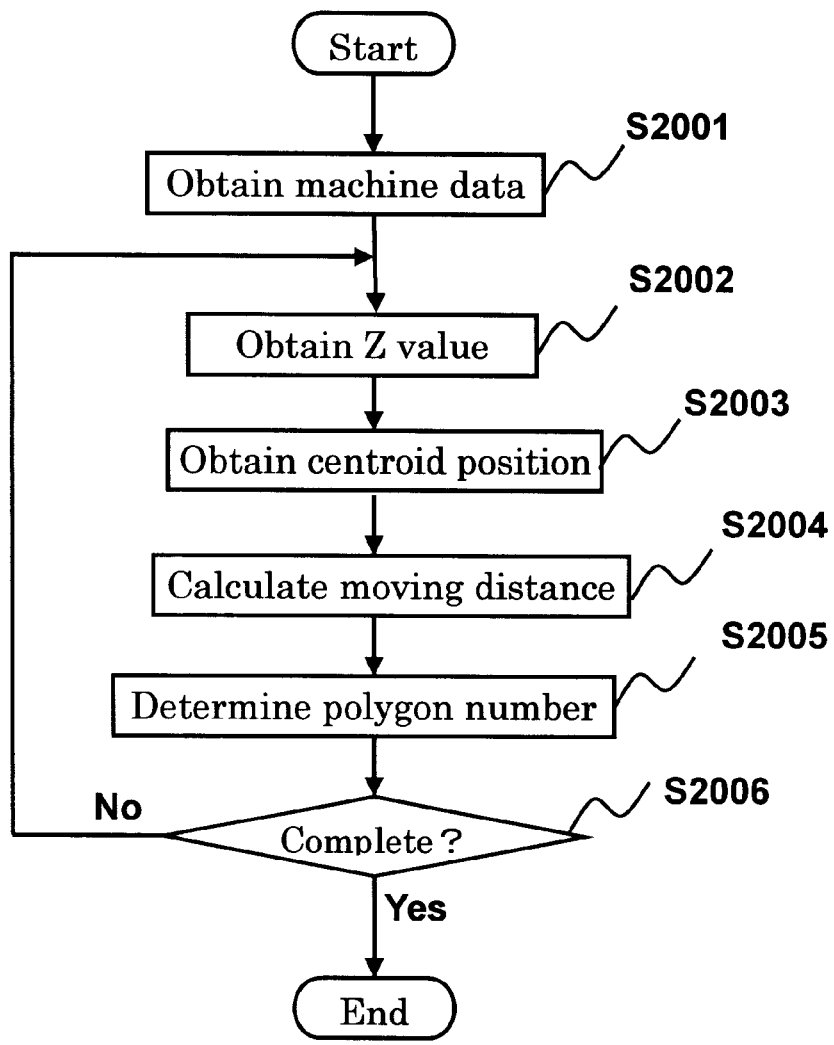
FIG. 20 is a flow chart showing the process procedure of a controller when controlling the number of polygon data for rendering.
Figure 21:
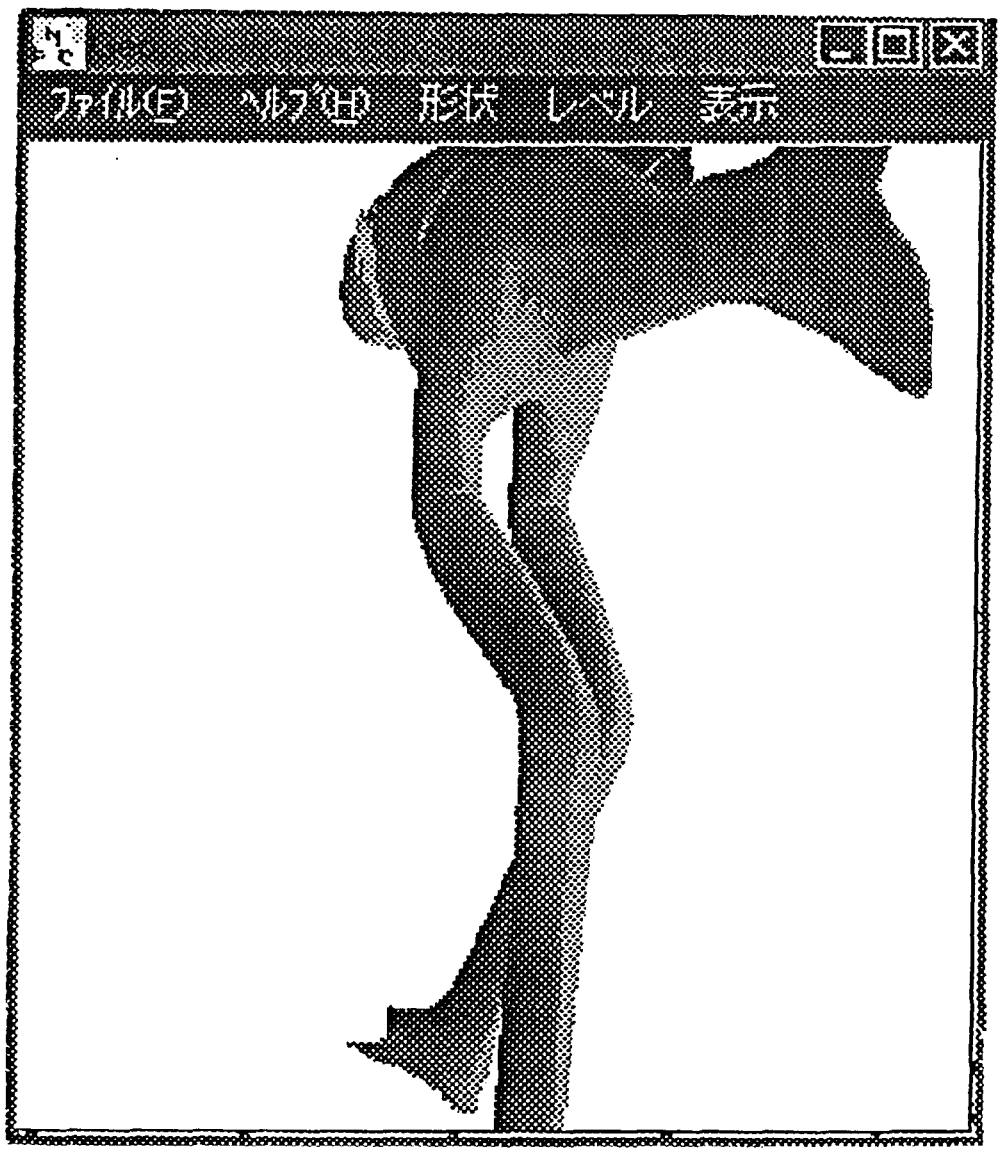
FIG. 21 is a view when an example of a object is rendered with 10,000 polygons.
Figure 22:
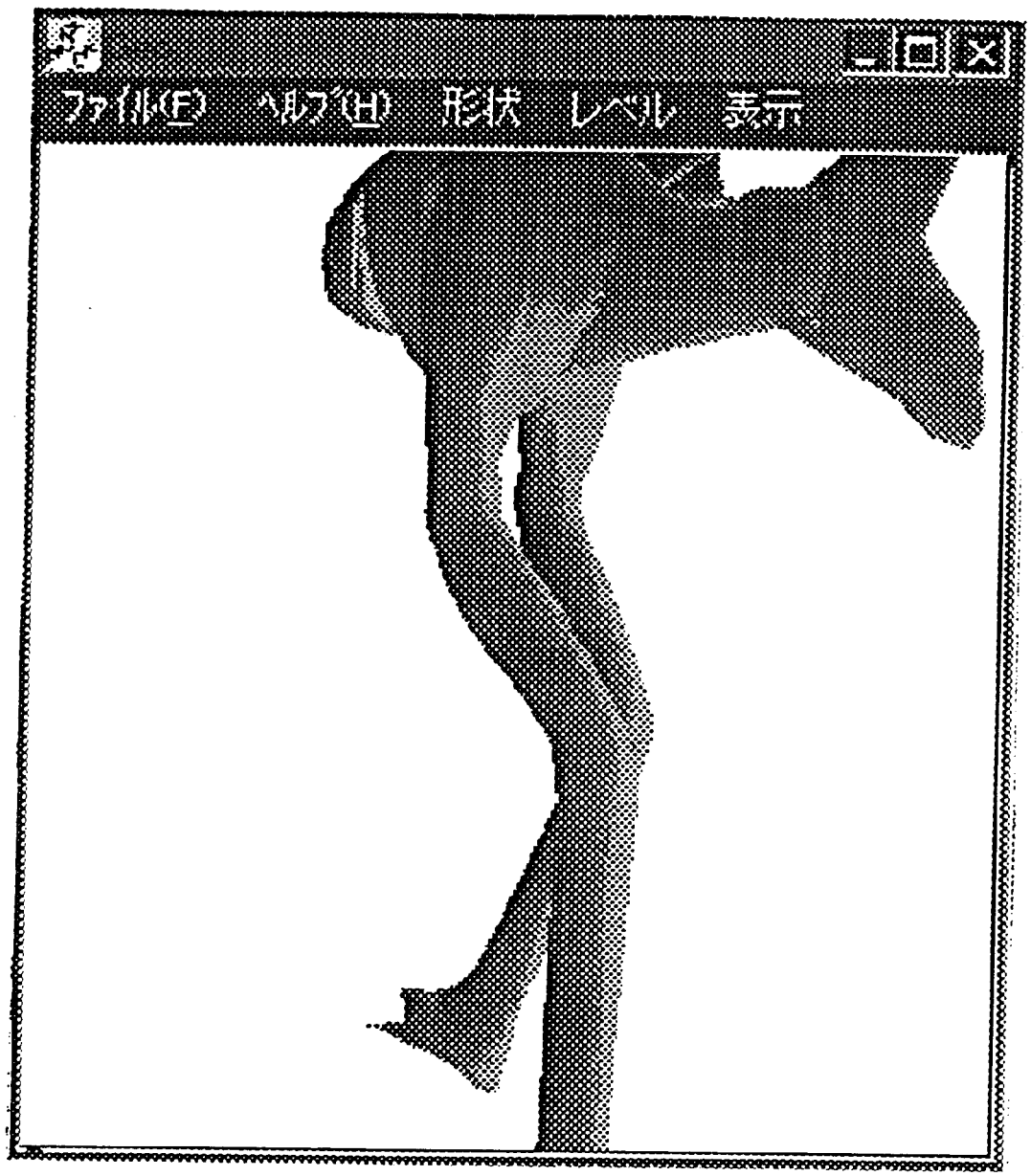
FIG. 22 is a view when the object in FIG. 21 is rendered with 2,000 polygons.
Figure 23:
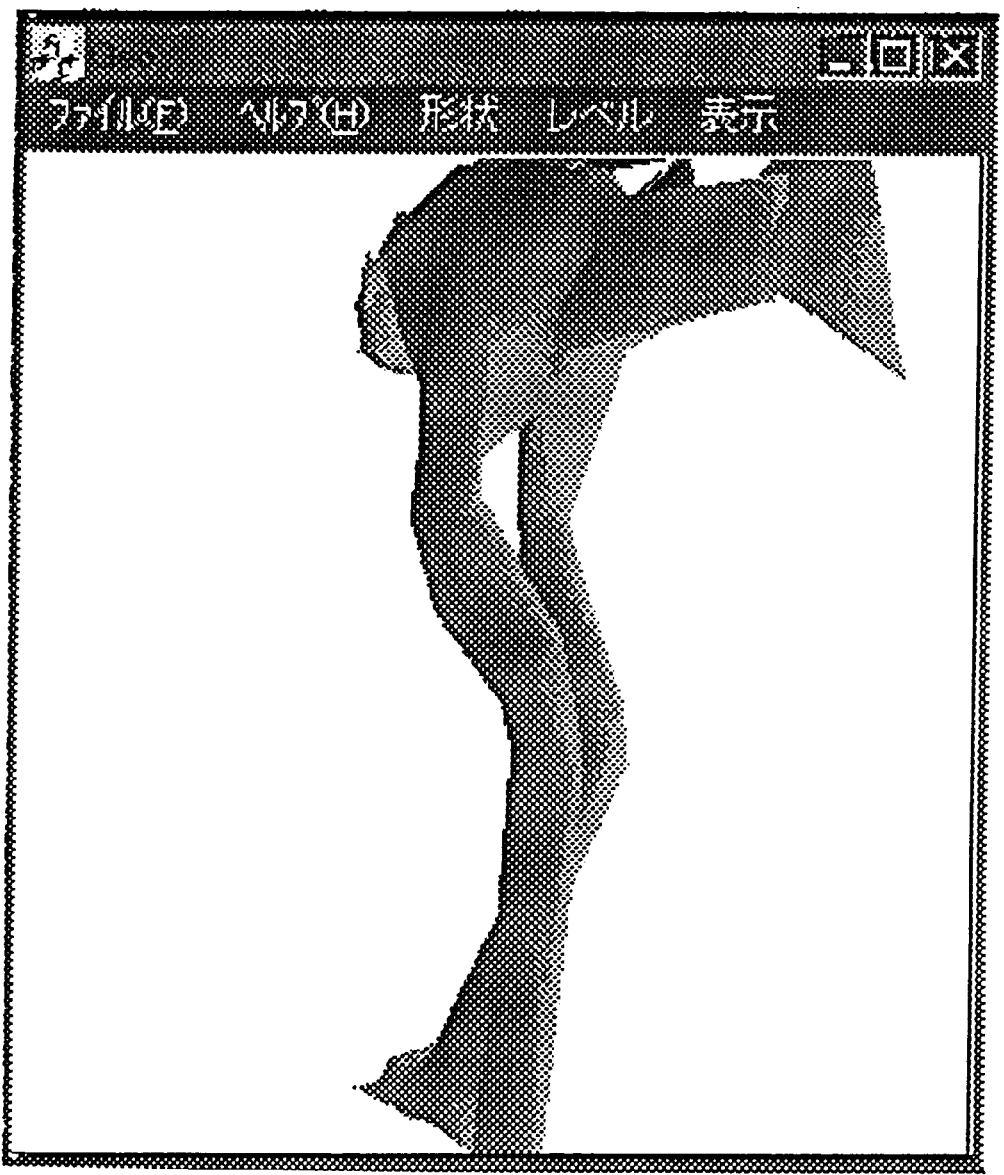
FIG. 23 is a view when the object in FIG. 21 is rendered with 400 polygons.
Figure 24:
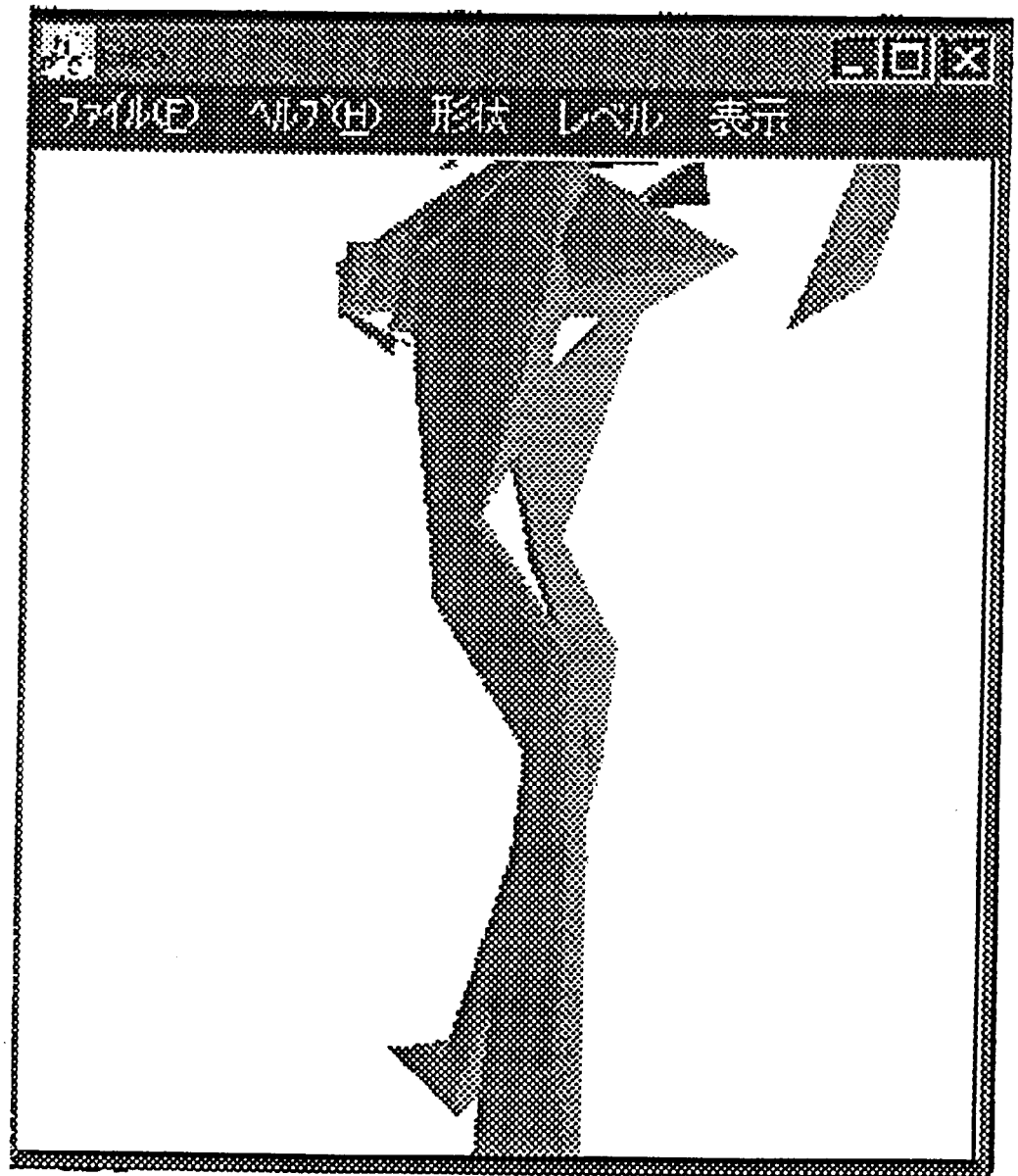
FIG. 24 is a view when the object in FIG. 21 is rendered with 220 polygons.
Figure 25:
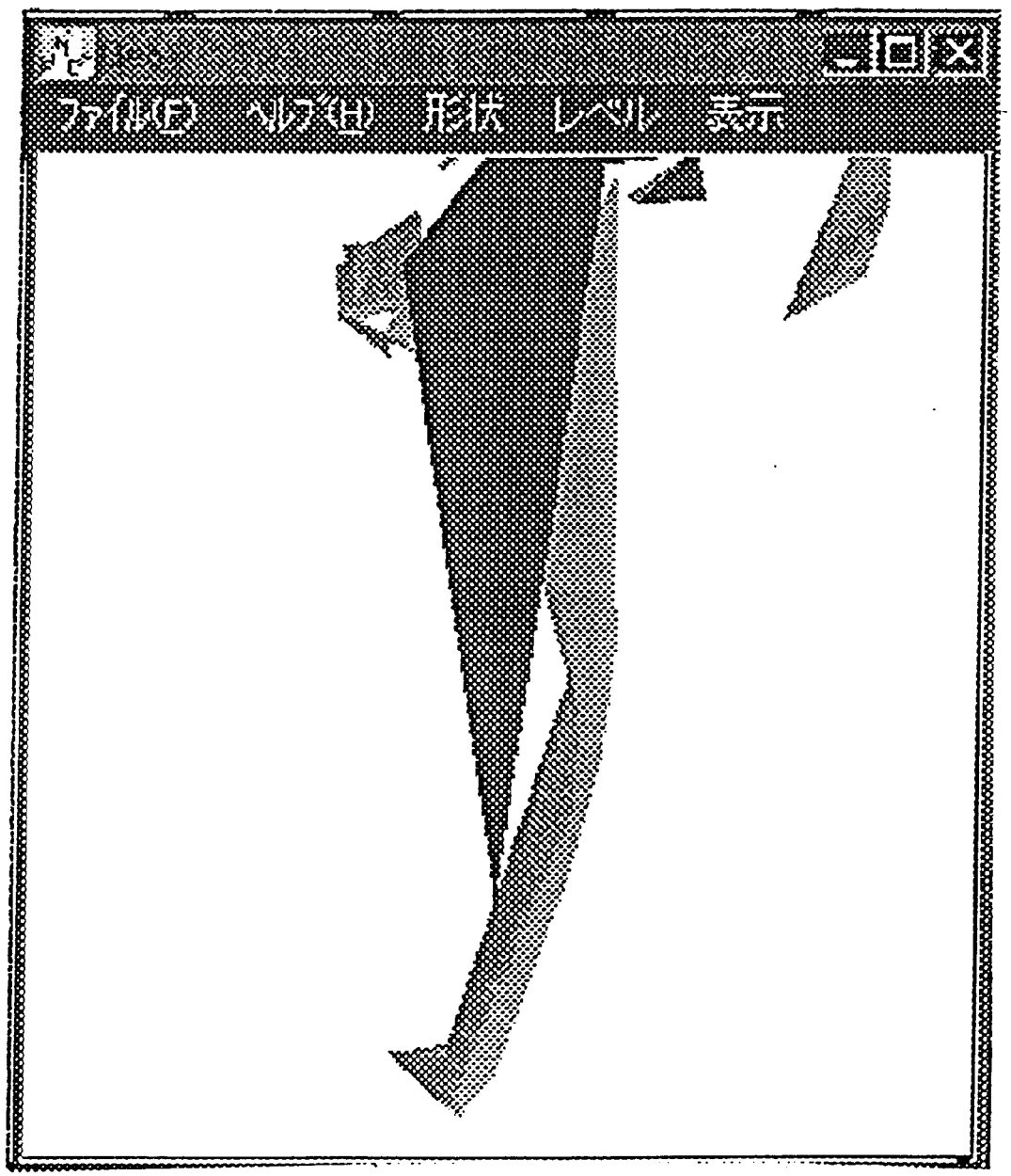
FIG. 25 is a view when the object in FIG. 21 is rendered with 200 polygons.
Figure 26:
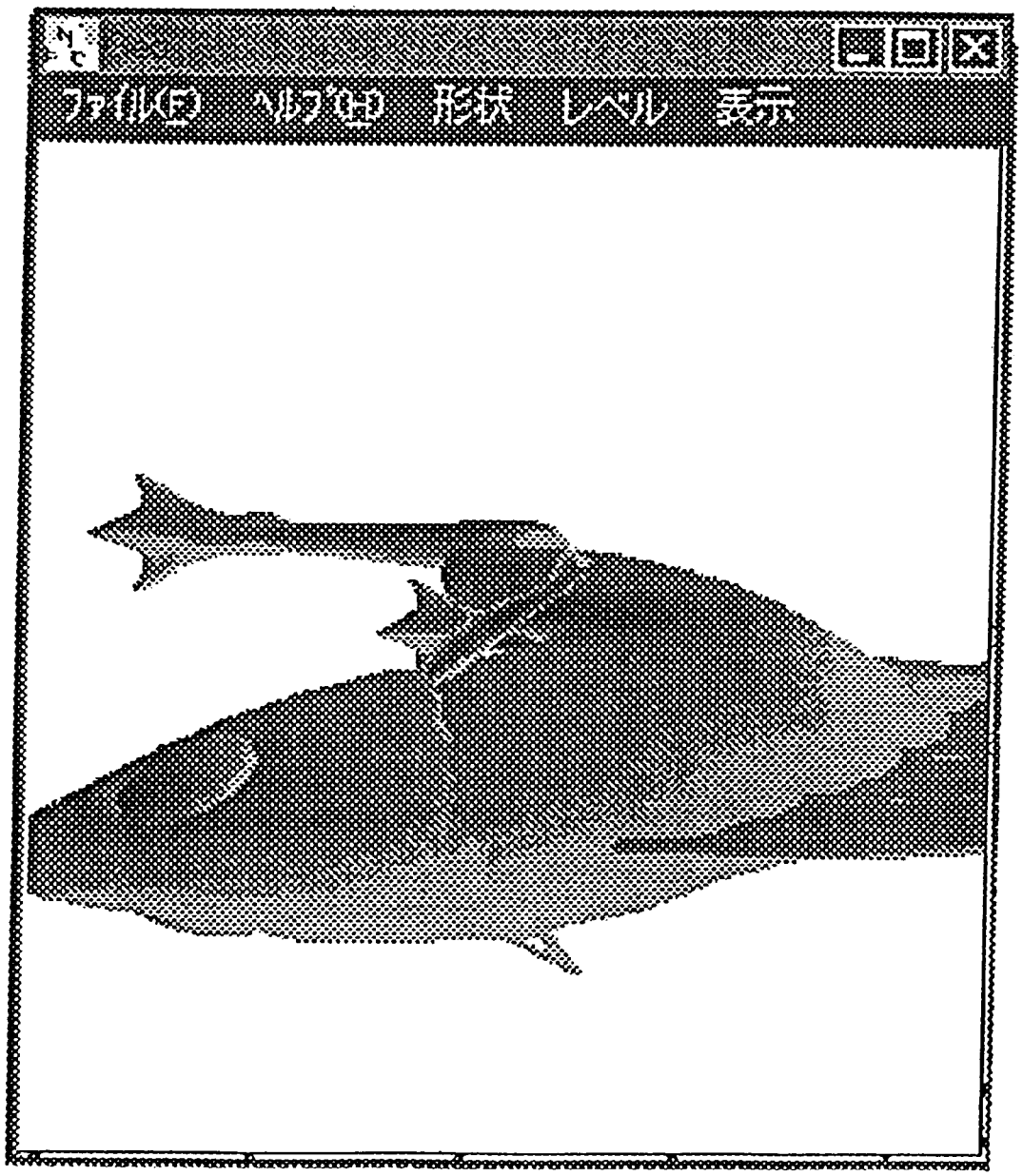
FIG. 26 is a view when the object in FIG. 21 is viewed from above.
Figure 27:
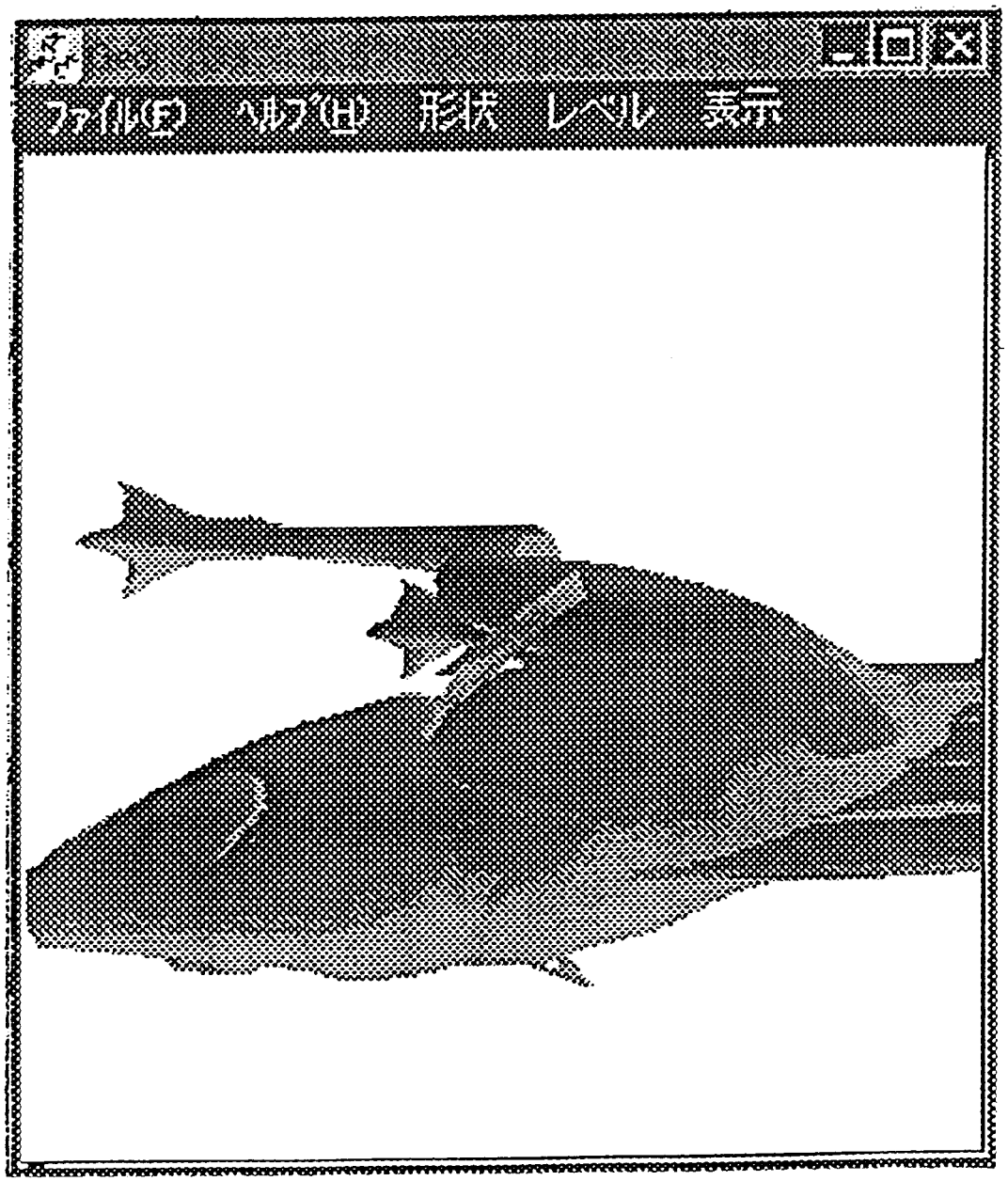
FIG. 27 is a view when the object in FIG. 22 is viewed from above.
Figure 28:
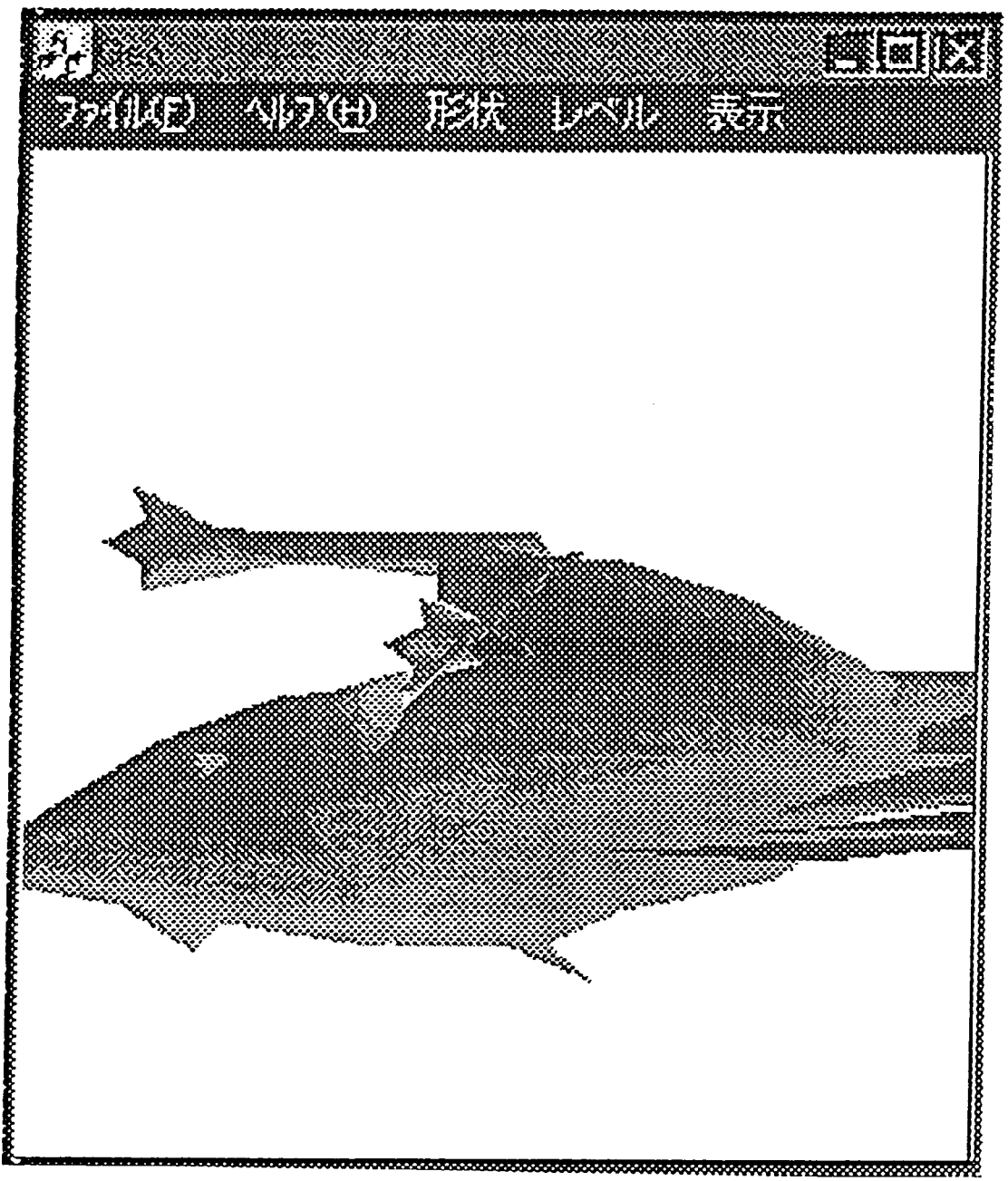
FIG. 28 is a view when the object in FIG. 23 is viewed from above.
Figure 29:
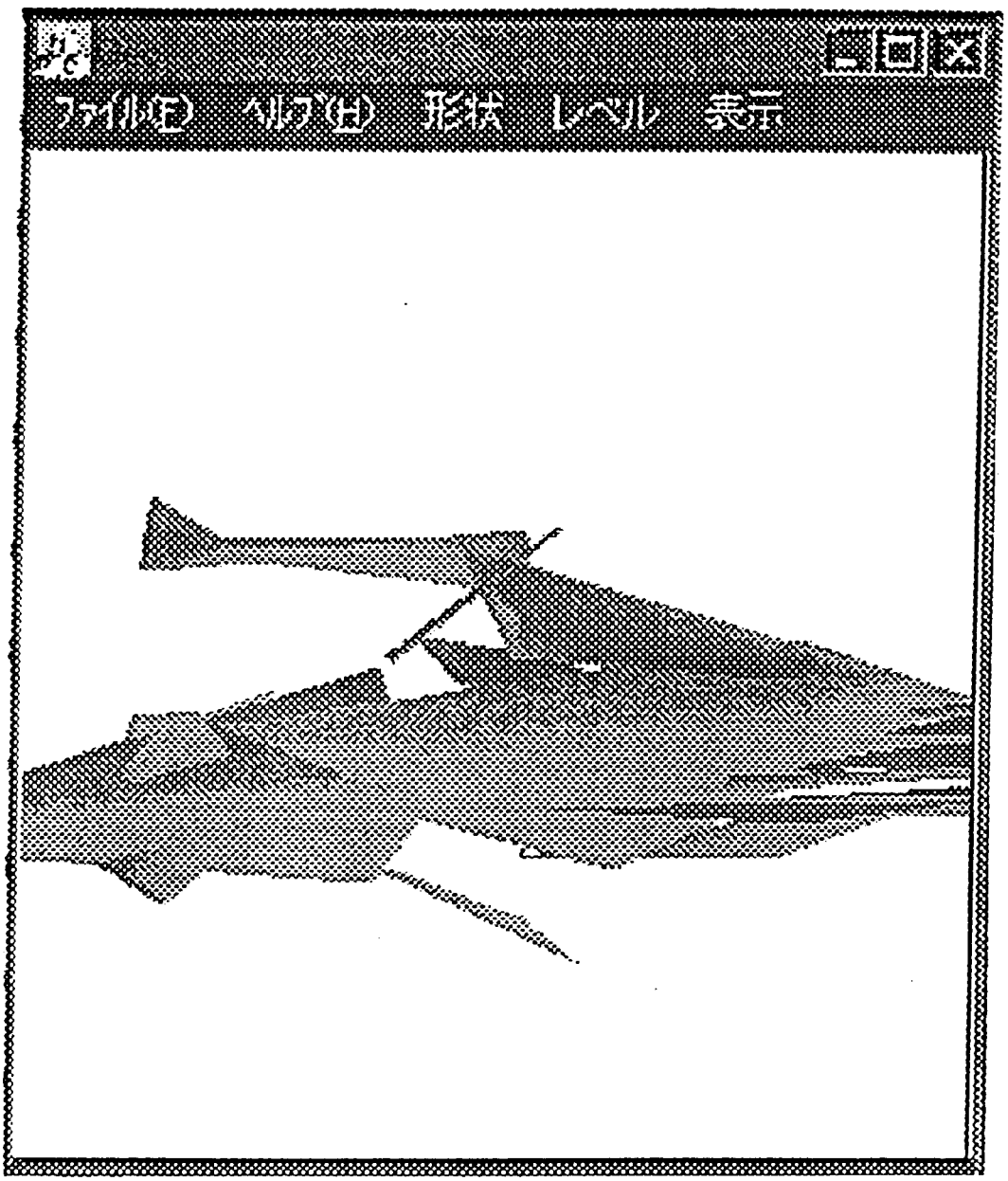
FIG. 29 is a view when the object in FIG. 24 is viewed from above.
Figure 30:
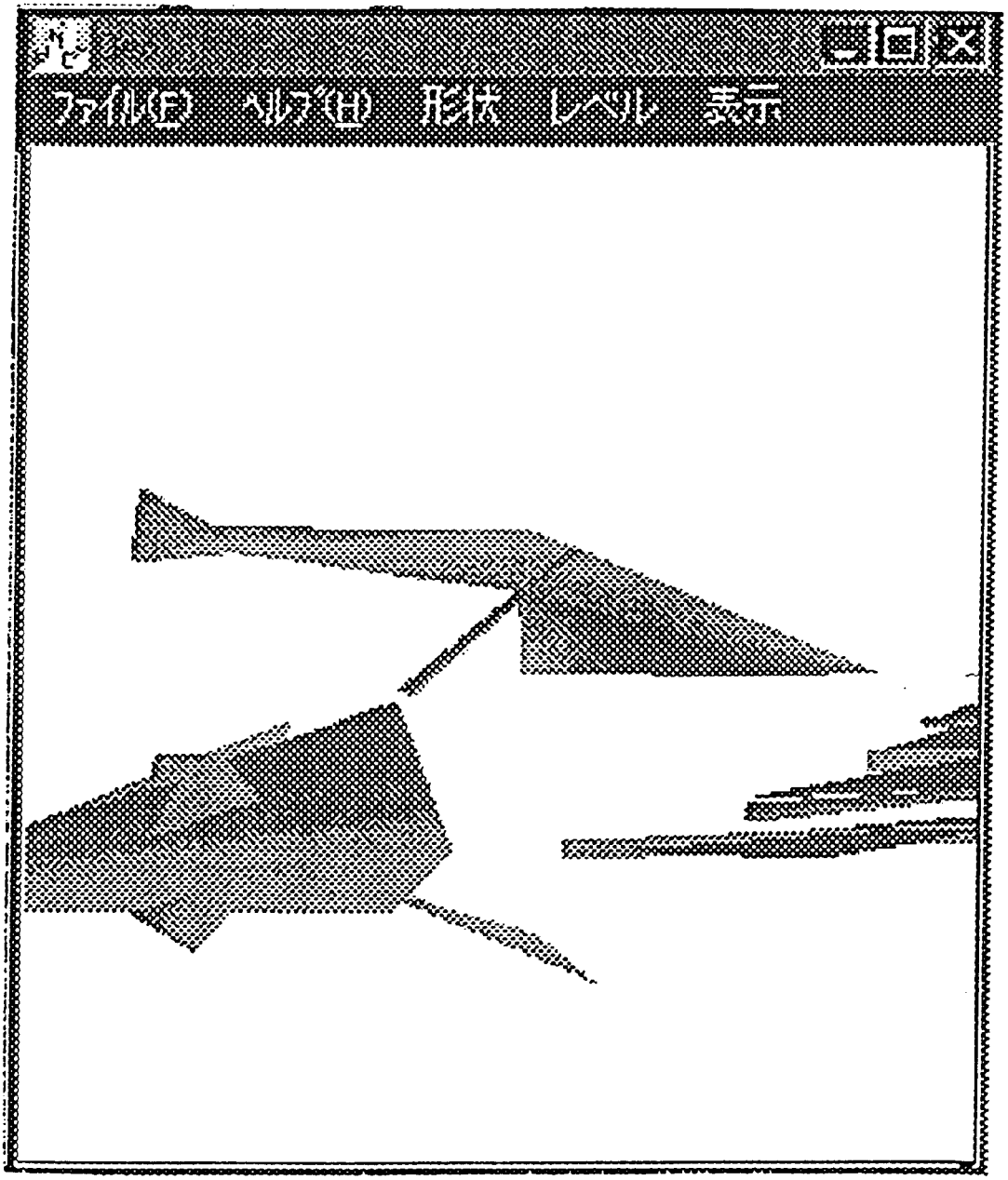
FIG. 30 is a view when the object in FIG. 25 is viewed from above.

FIG. 20 is a flow chart showing the process procedure of the controller 102 when calculating the number of polygons for rendering in the 3D real-time graphics generator in this embodiment. This process is performed by the rendering polygon number calculating part 1025, based on the progressive polygon data or the like.

As shown in FIG. 20, in the 3D real-time graphics generator in this embodiment, the number of polygons for an object to be rendered is managed based on the performance of the machine, the distance from the user to the object in the virtual world displayed on the screen (hereinafter, referred to as "Z value") and the speed of the movement of the object.

The concept of the management of the number of polygons in the 3D real-time graphics generator of the present invention will be described before discussing FIG. 20 in detail.

First, the management of the number of polygons by the Z value will be described.

When an object is close to the user on the screen, the shape of the polygon is recognized distinctly unless the object is rendered with a large number of polygons. On the other hand, when the position of an object is far from the viewpoint, the rendered object is small, so that the detail shape of the polygon cannot be recognized by the user, even if the object is rendered with a small number of polygons. In order words, the number of polygons for rendering an object is changed dynamically depending on the Z value of the object, by using the progressive polygon data as described above. Thus, the procedures of the CPU and the board can be minimized.

FIGS. 21 to 25 show objects rendered with a variety of numbers of polygons, i.e., 10,000 polygons, 2,000 polygons, 400 polygons, 220 polygons, and 200 polygons, respectively. As shown in FIGS. 21 to 25, as the number of polygons becomes smaller, the shape of the polygon can be recognized distinctly. FIGS. 26 to 30 show the same object as FIGS. 21 to 25 when viewed from above.

FIGS. 31A to 31E show downscaled rendering of the object according to the Z value (the Z value of the object in FIG. 31A is the largest). The rendered object of a large Z value looks natural, even though it is rendered with a small number of polygons.

Since the 3D real-time graphics generator of the present invention produces polygon data progressively, polygon data that cannot be seen from the direction of the camera (viewpoint) can be calculated. Generally, in a 3D graphics generator, a process of preventing polygons that cannot be seen from the camera from being rendered is performed. In the 3D real-time graphics generator of the present invention, therefore, it is possible to determine at the time of the recursive evaluation of polygon data whether or not the process should be performed.

Furthermore, generally, when the number of polygons is small, the edge of the object is conspicuous. However, the edge is rendered with a large number of polygons and the front of the object is rendered with a small number of polygons by referring to the relation between the direction of the camera and the normal line of the object, so that graphics with high quality can be rendered with a small number of polygons.

Next, the management of the number of polygons based on the speed of the object will be described.

Figure 32:
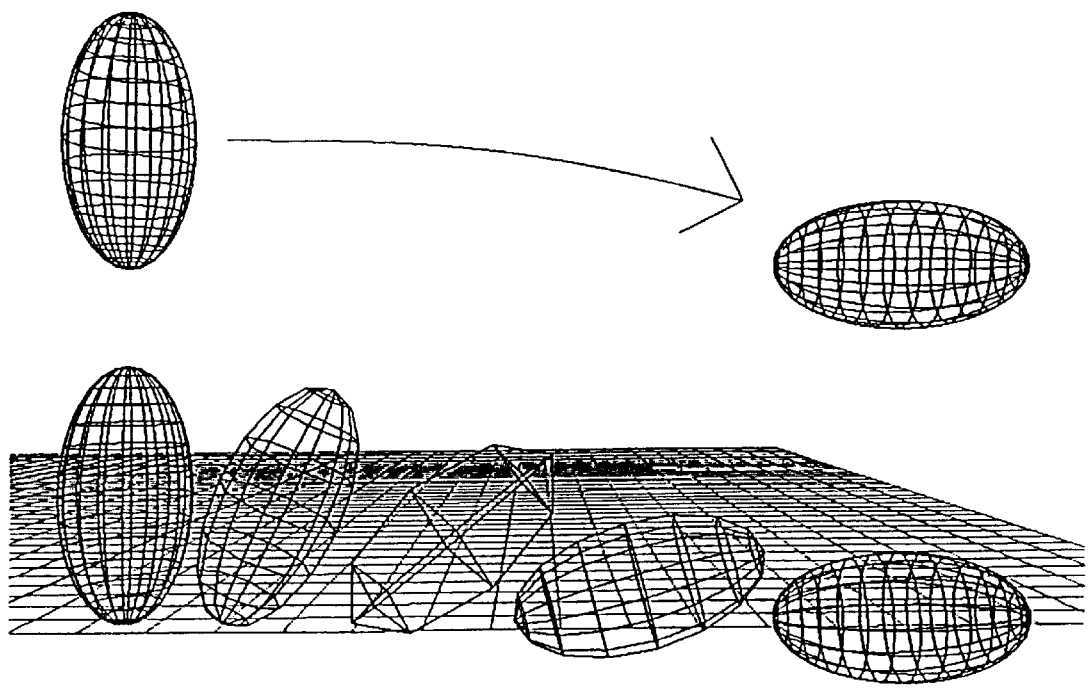
FIG. 32 is a view illustrating the management of the number of polygons for rendering, depending on the rendering speed.

When the action of the object is dynamic, the object can be rendered naturally with a small number of polygons. For example, in the case shown in FIG. 32 where an object moves at high speed, the object on the way of the movement can be rendered with a smaller number of polygons without giving any visual problem to the user.

Therefore, when animation is rendered, the position of the object for every frame is managed and the speed of the movement of the object is calculated, so that the number of polygons can be reduced. The position of the object can be managed with respect to the entire object or part of the object. For example, in the case where only an arm of a human moves at high speed, the speed vector of the arm is managed separately, so that the number of polygons of the arm alone can be reduced.

Finally, the management of the number of polygons based on the performance of the computer, the function or the like will be described. For example, in a computer with a high-performance board, an object can be rendered in real-time with 10,000 polygons, whereas the object has to be rendered with 500 polygons in a computer with a poor-performance board. For the determination of the maximum number of polygons that are allowed to be used for rendering, the capacity of memory should be considered.

The rendering polygon number calculating process based on the above-described concept will be detailed below. Referring back to the flow-chart of FIG. 20, the procedures of the controller 102 in this embodiment will be described.

The controller 102 first acquires machine data (S2001). "Machine data" refers to information concerning the function, performance, etc. of the computer. It is not necessary to change this value even when objects are changed, and it suffices to acquire the value only once at the beginning.

The machine data can be acquired by various methods. For example, the machine data can be assigned by the user as a parameter.

Thereafter, a Z value is acquired for every object (S2002), and position information of a centroid of the object for every frame stored in the progressive polygon data storage 106 is acquired (S2003). The distance of the movement of the object for every frame, i.e., the speed of the movement of the object, is calculated (S2004). Based on these, the number of polygons is determined (S2005). The number of polygons is sent to the merging part 1026 in the form of the step number in the progressive polygon data, as described above. Therefore, the rendering polygon number calculating part 1025 in this embodiment stores a table indicating the correspondence between a specific number of polygons that are allowed to be used and the step number. However, such a table is not always necessary. For example, the number of polygons can be sent to the merging part 1026 in the form of a ratio to the maximum number. The steps S2002 to S2005 are performed for every object and when all the objects have been subjected to the process of this embodiment, the whole process is complete (S2006).

As described above, the use of the 3D real-time graphics generator makes it possible to render an object with a number of polygons suitable for the system resources for rendering.

(Embodiment 4)

Next, a fourth embodiment of the present invention will be described with reference to the accompanying drawings.

In this embodiment, a method for rendering an object that transforms dynamically with progressive polygon data will be described.

First, the concept of rendering an object that transforms dynamically with progressive polygon data will be described. As described in Embodiments 1 and 2, the progressive polygon data generated according to the present invention includes the basic polygon data 1061 representing an object with the smallest number of polygons and the detailed polygon data 1062 representing vertices of polyhedrons that are sequentially computed starting from the basic polygon data 1061. The detailed polygon data 1062 is used to approximate the shape of the object represented by the basic polygon data 1061 to the shape of the object represented by the original polygon data.

The detailed polygon data 1062 is represented by relative coordinates, as described above. Therefore, for example, the basic polygon data 1061 is changed via the basic polygon data editing part 1024 so as to transform an object, and then the detailed polygon data is sequentially computed from the changed basic polygon data representing the transformed object, so that the entire object can be transformed.

Figure 33:
FIG. 33 is a view illustrating translation (parallel movement) of an object.
Figure 34:
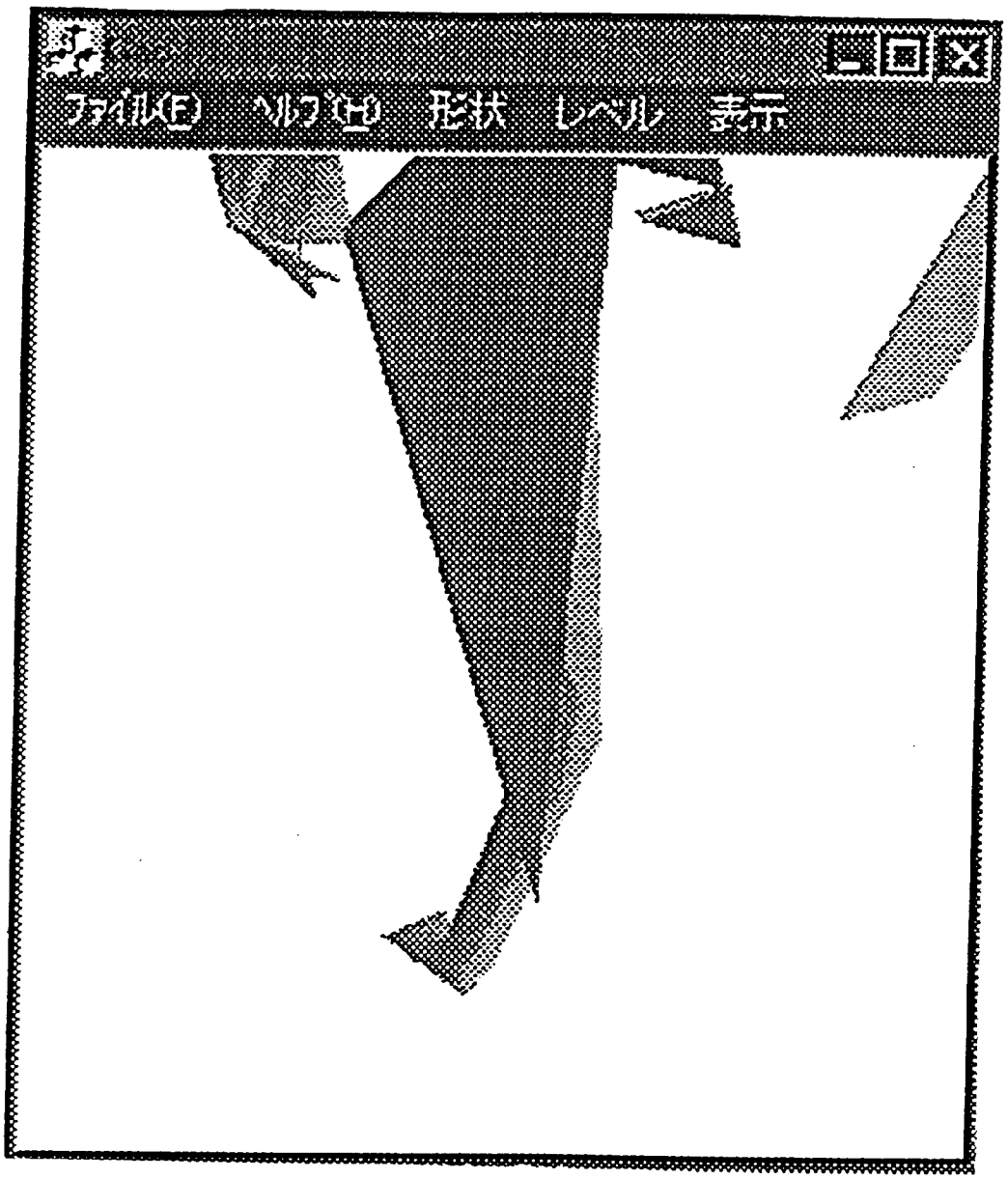
FIG. 34 is a view illustrating translation of the object.

First, in this embodiment, translation (parallel movement) of an object will be described. FIG. 33 shows an example of a object whose progressive polygon data has been obtained according to the method for generating progressive polygon data of the present invention. When this object is rendered with only the basic polygon data 1061, the representation is coarse, as seen in FIG. 34 where the left leg is formed as a triangle.

Figure 35:
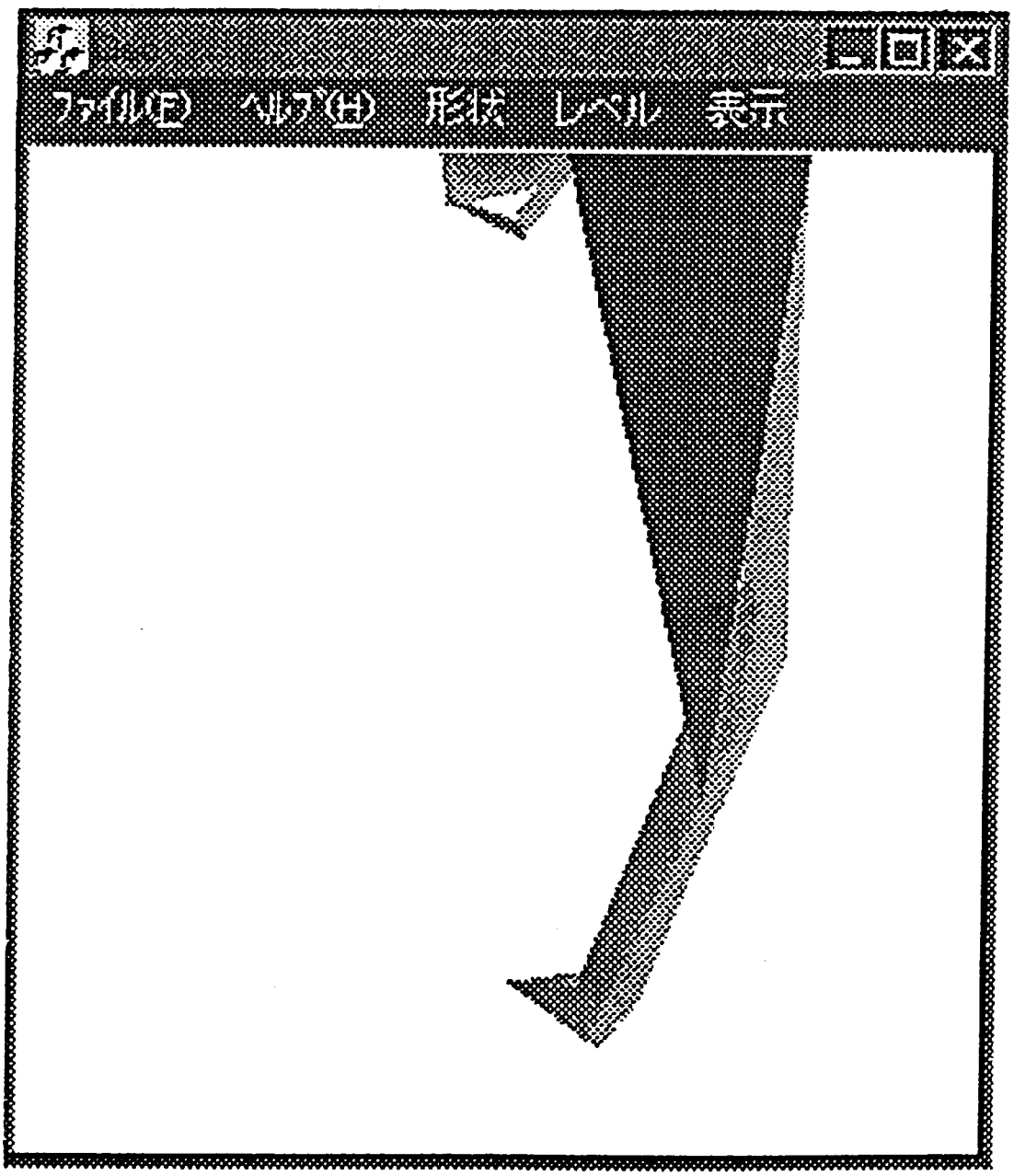
FIG. 35 is a view illustrating translation of the object.
Figure 36:
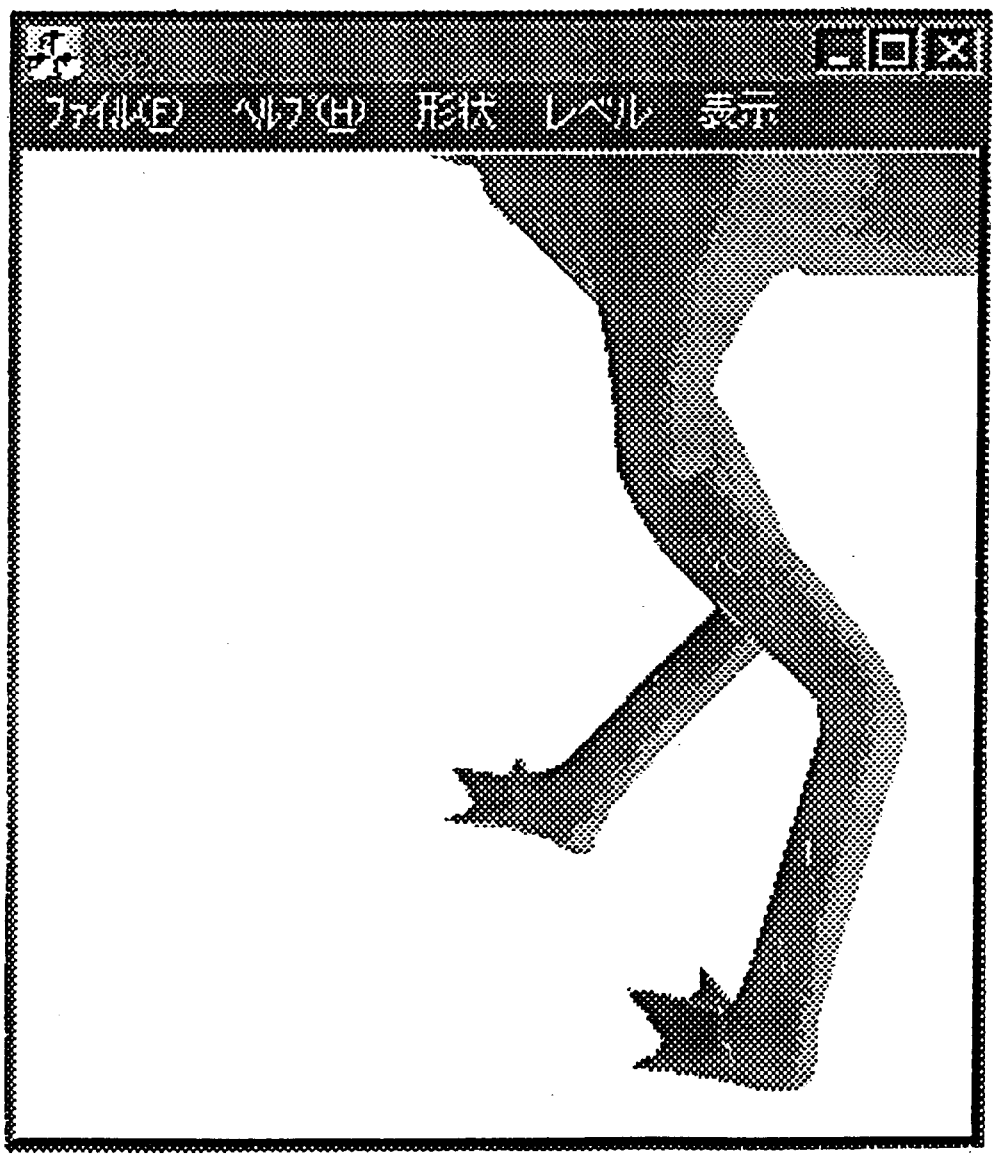
FIG. 36 is a view illustrating translation of the object.
Figure 37:
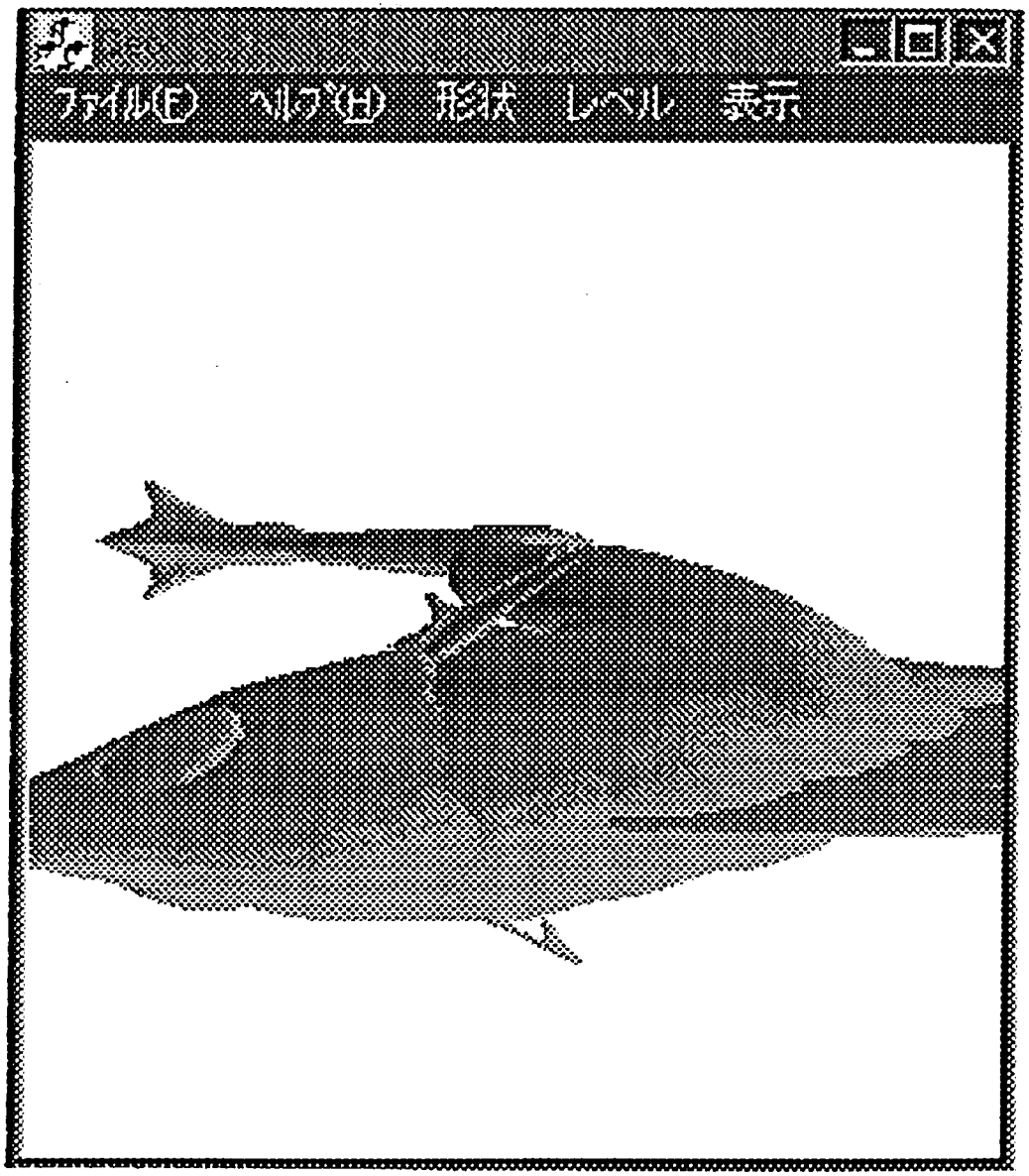
FIG. 37 is a view illustrating translation of the object.
Figure 38:
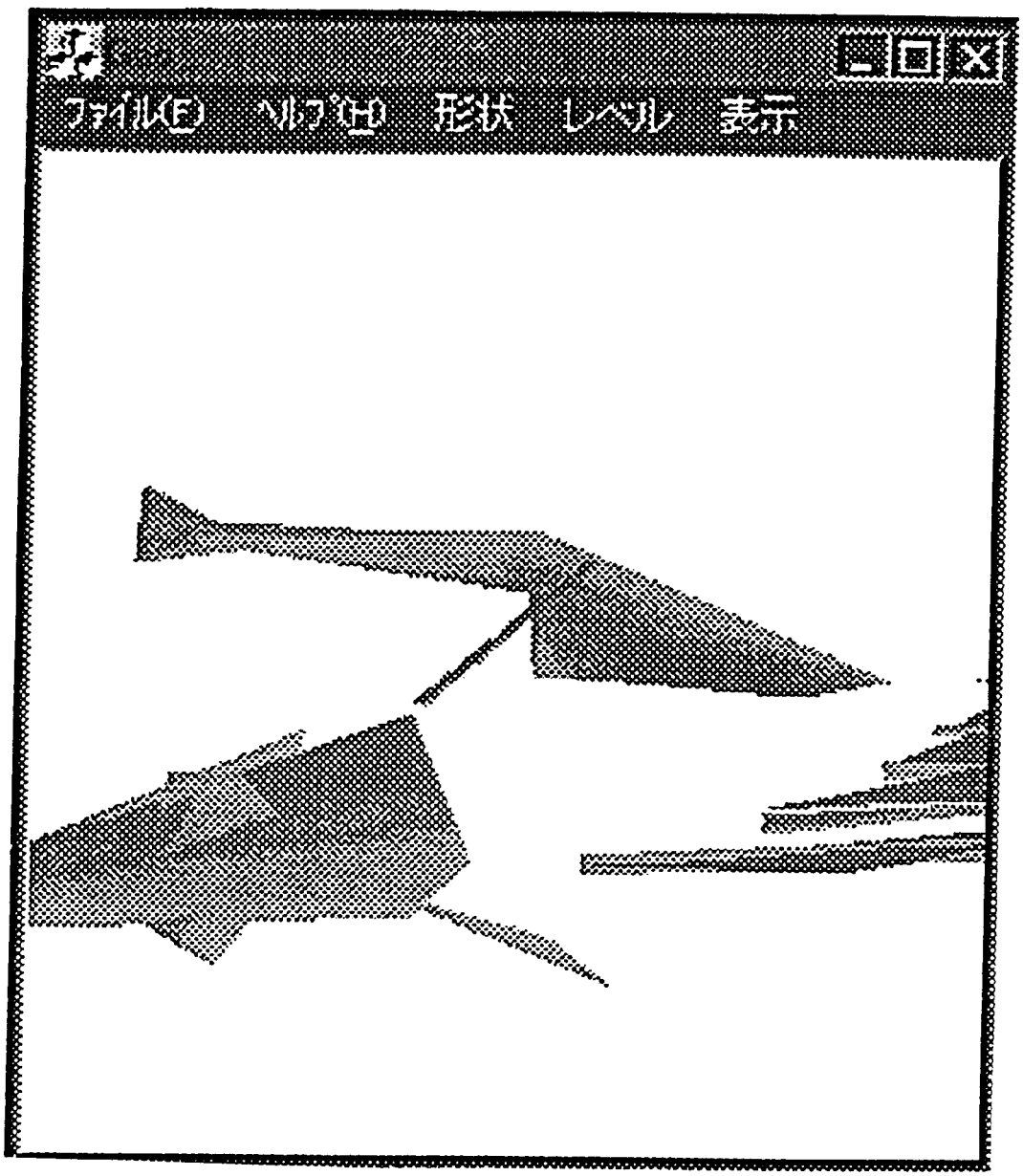
FIG. 38 is a view illustrating translation of the object.
Figure 39:
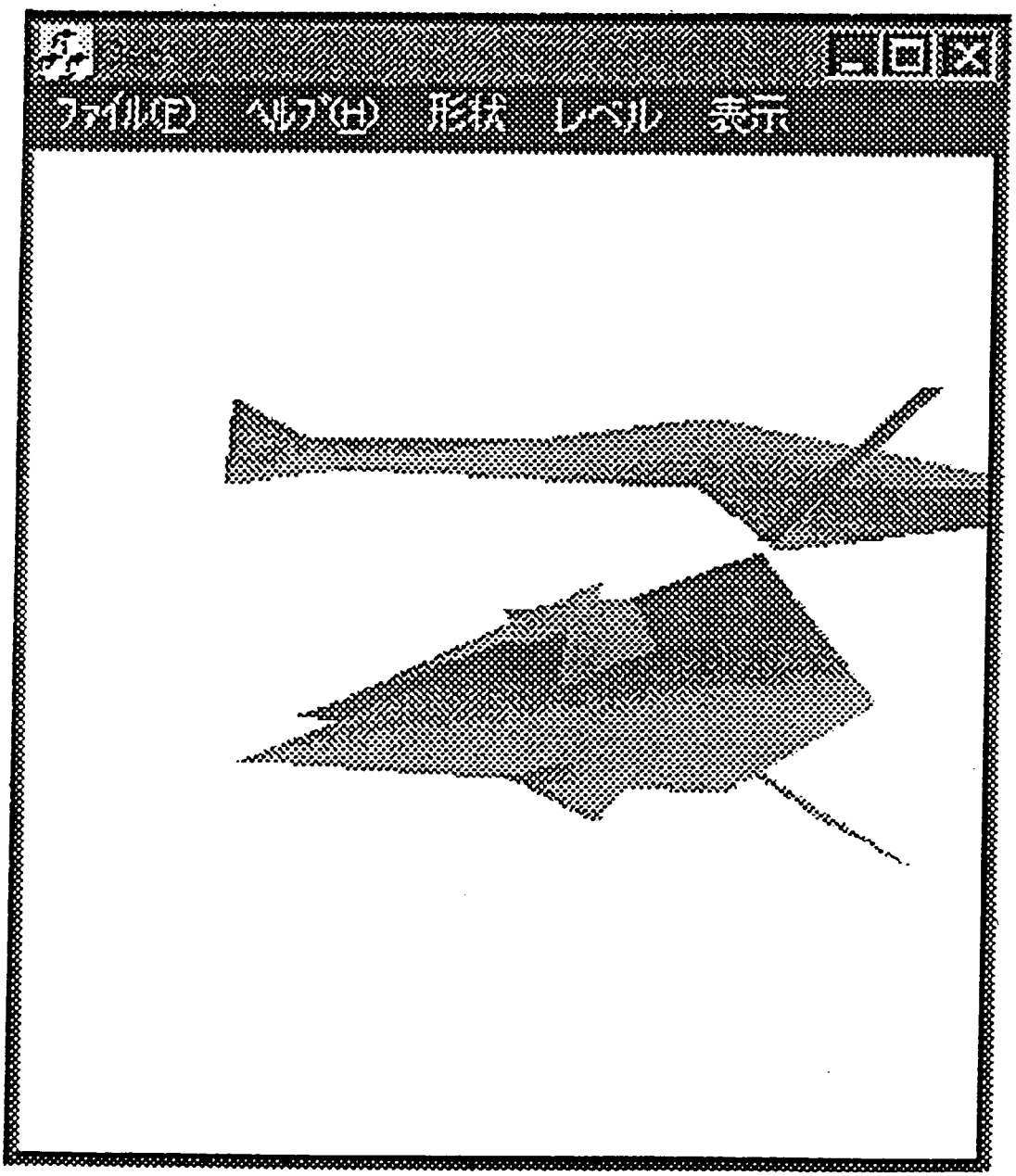
FIG. 39 is a view illustrating translation of the object.
Figure 40:
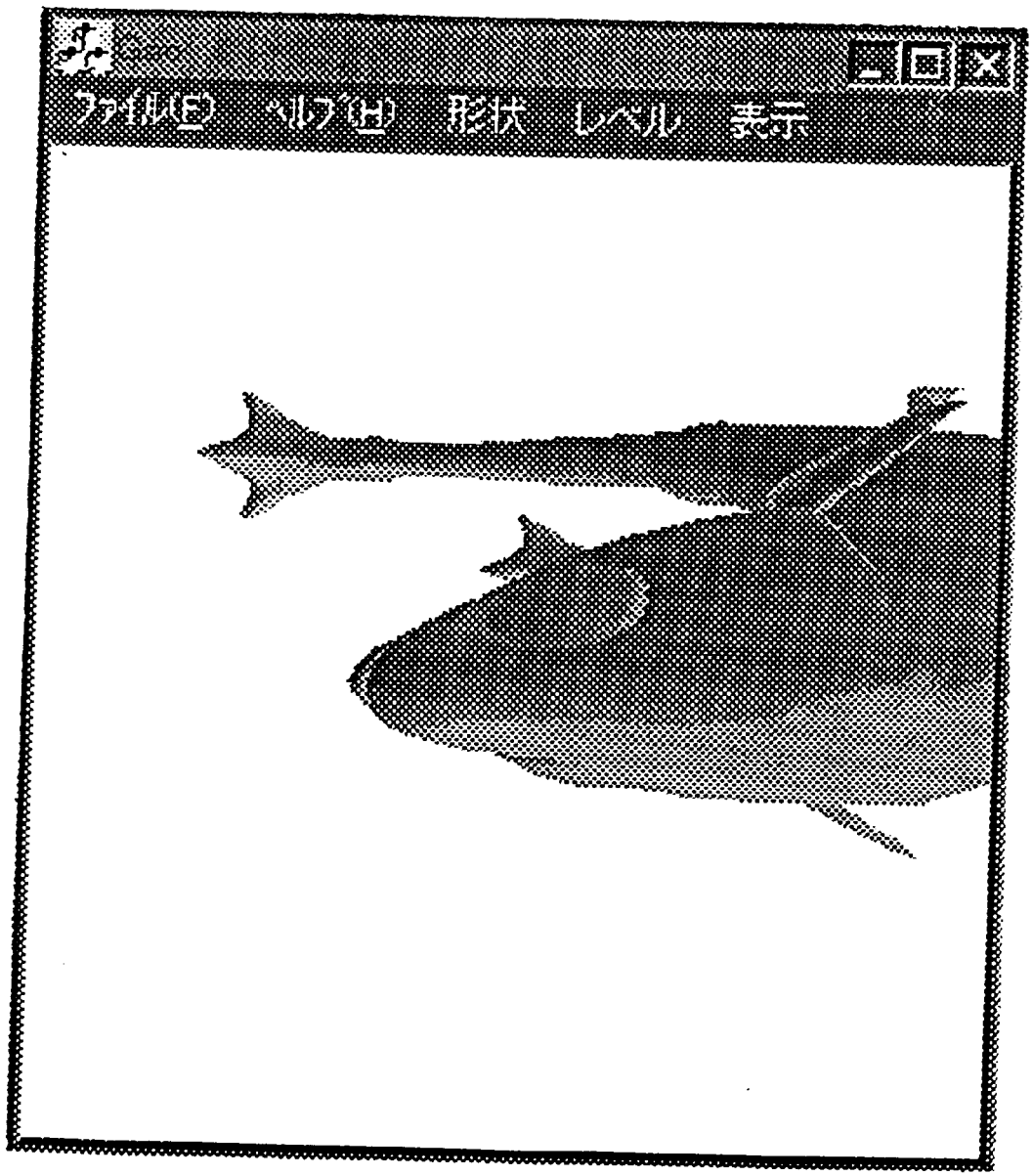
FIG. 40 is a view illustrating translation of the object.

Thereafter, the coarse object is translated, e.g., moved in parallel to right or left, with an input device such as a mouse provided as the input part 101. FIG. 35 is a view showing the entire object that has moved to right. In this example, the object has been moved to right by 10% of the horizontal axis. The basic polygon data of the edited object is stored in the form of absolute coordinates in the progressive polygon data storage 106 separately from the basic polygon data before editing. Thereafter, the merging part 1026 sequentially computes the detailed polygon data 1062 starting from the basic polygon data. In this manner, the entire object can be translated, as shown in FIG. 36. FIGS. 37 to 40 are views showing the object shown in FIGS. 33 to 36 that is subjected to the same process when viewed from above.

In this embodiment, the object has been translated directly from one position to another. However, an object positioned between the two positions shown in the example of this embodiment can be produced and can be rendered at every predetermined time, so that animation where the object is moving gradually can be produced. More specifically, information about timing at which objects are rendered is added to the progressive polygon data representing animation via the basic polygon data editing part 1024, so that the merging part 1026 and the 3D information rendering part 1027 perform the process to render the object at the timing specified by the information. Thus, animation can be rendered.

As described above, the use of the 3D real-time graphics generator of this embodiment facilitates editing of an object. Thus, it is possible to reduce the amount of work of an animator, for example, in the production of animation where a plurality of graphics on which an object is gradually changing are generated and rendered continuously by a predetermined time. Furthermore, the use of the progressive polygon data of the present invention makes it possible for a computer to perform the process at high speed, because the computer has only to compute the amount of data of order (n) in the sequential computation for the detailed polygon data. That is, even if the complexity of a problem increases by n times, the amount of data for the computation increases only by n times.

(Embodiment 5)

Next, a fifth embodiment of the present invention will be described with reference to the accompanying drawings.

In this embodiment, the case where the object is partially transformed will be described.

Figure 41:
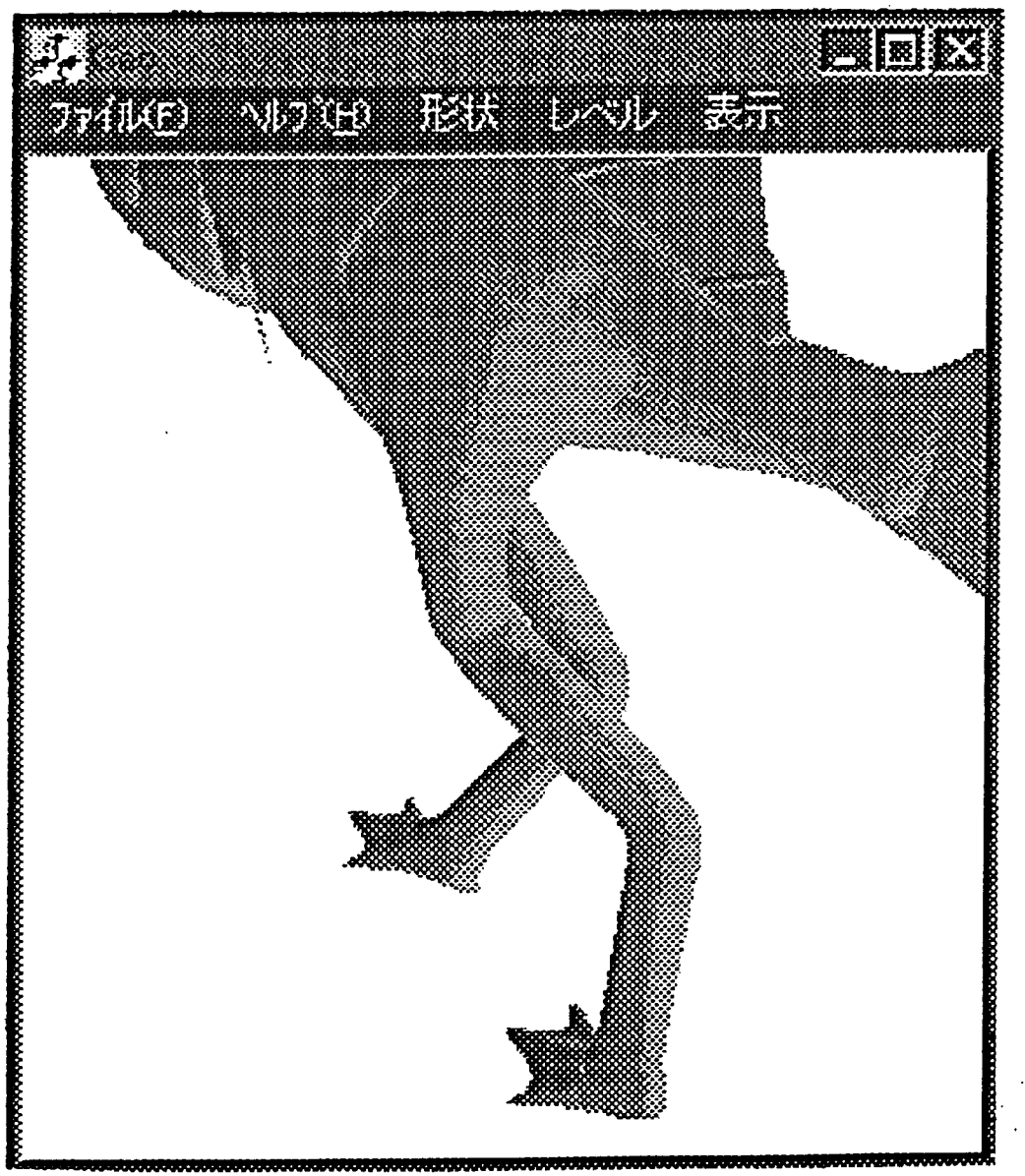
FIG. 41 is a view illustrating partial transformation of the object.
Figure 42:
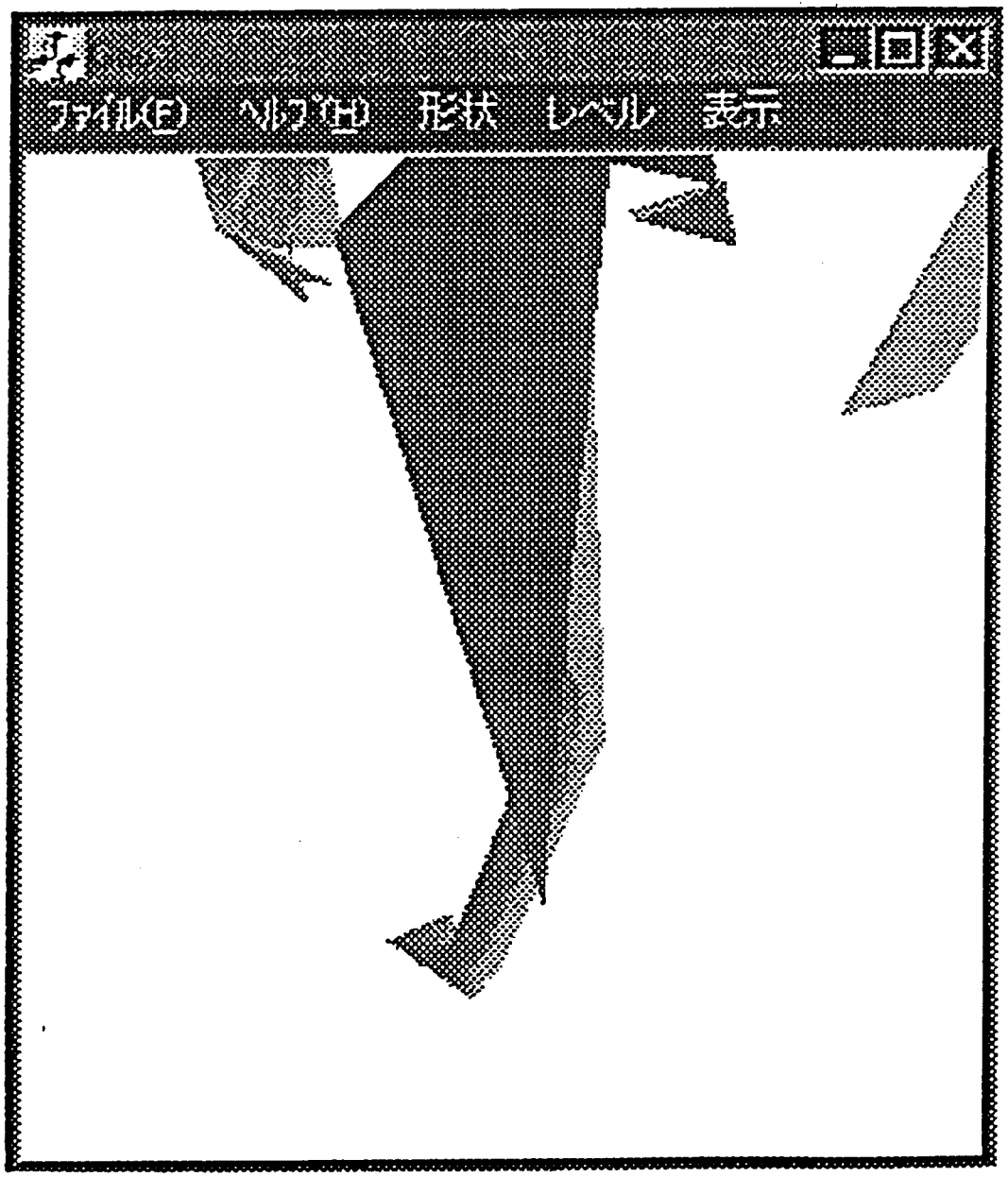
FIG. 42 is a view illustrating partial transformation of the object.

FIG. 41 shows an example of a object whose progressive polygon data has been obtained according to the method for generating progressive polygon data of the present invention. When this object is rendered with only the basic polygon data 1061, the representation is coarse, as seen in FIG. 42 where the left leg is formed as a triangle.

Figure 43:
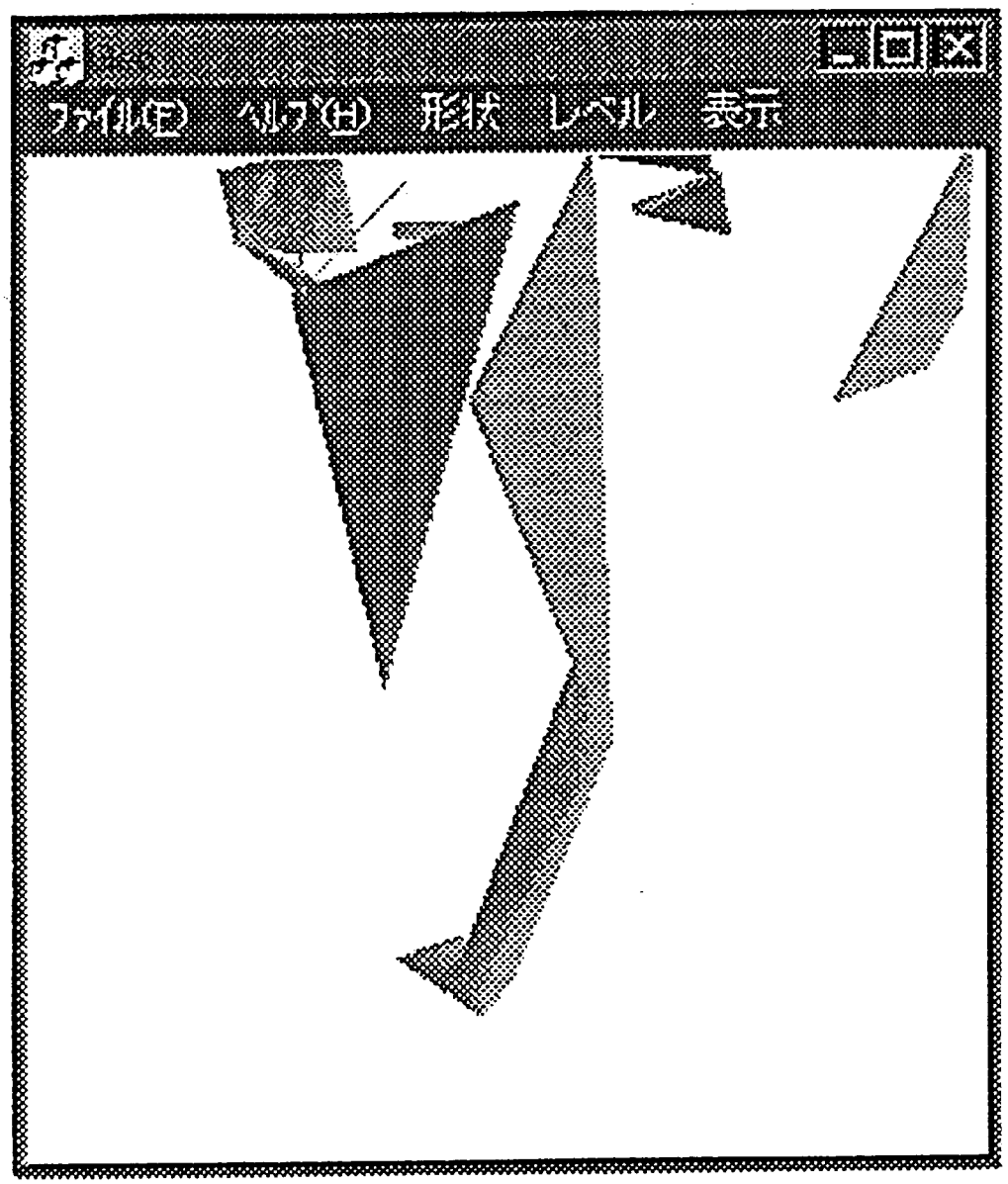
FIG. 43 is a view illustrating partial transformation of the object.

Next, the positions of the vertices of polygons representing the left leg of this object are changed in the same manner as Embodiment 4. FIG. 43 is a view showing the shape of the polygon mesh that has been transformed due to the change.

Figure 44:
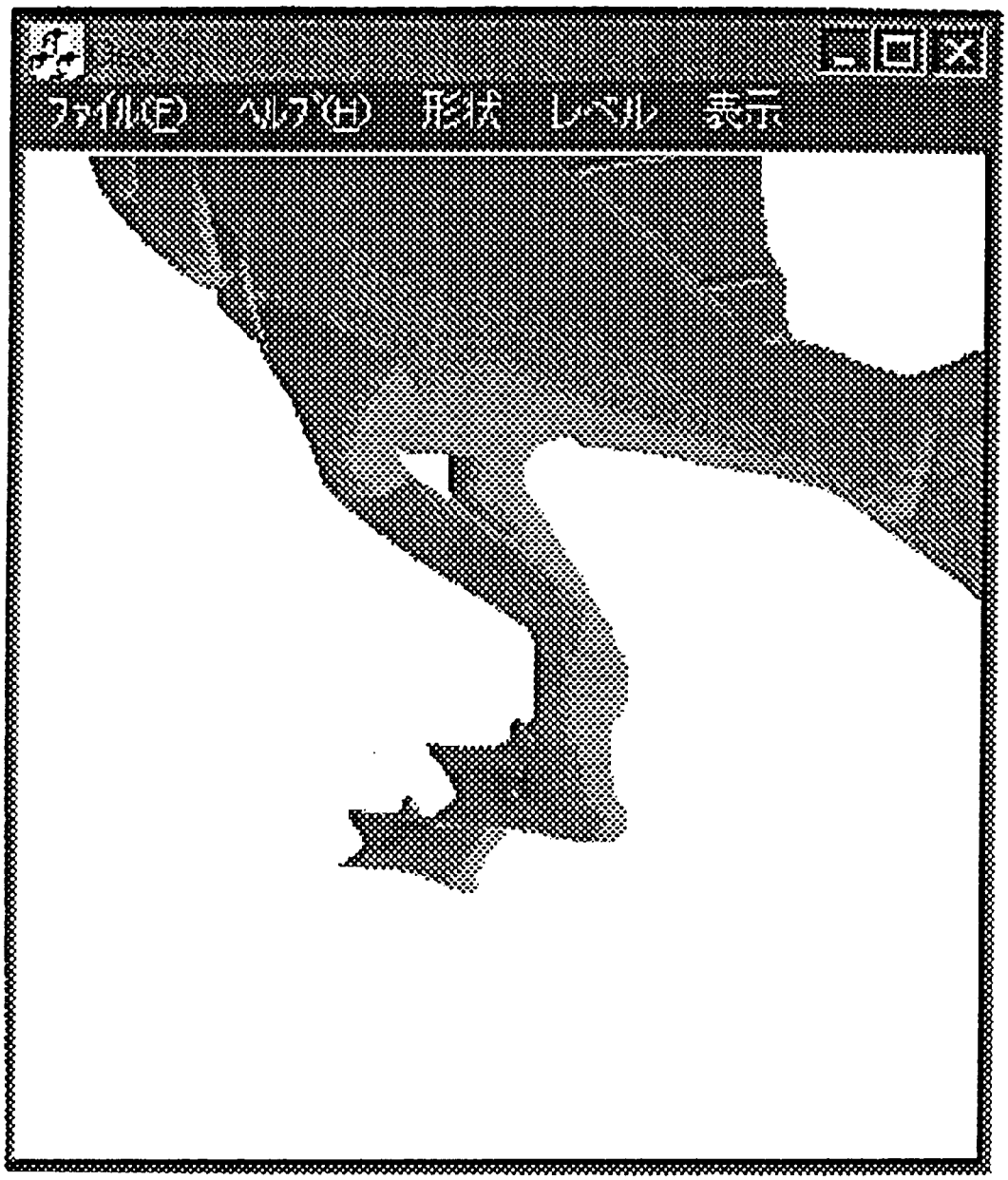
FIG. 44 is a view illustrating partial transformation of the object.
Figure 45:
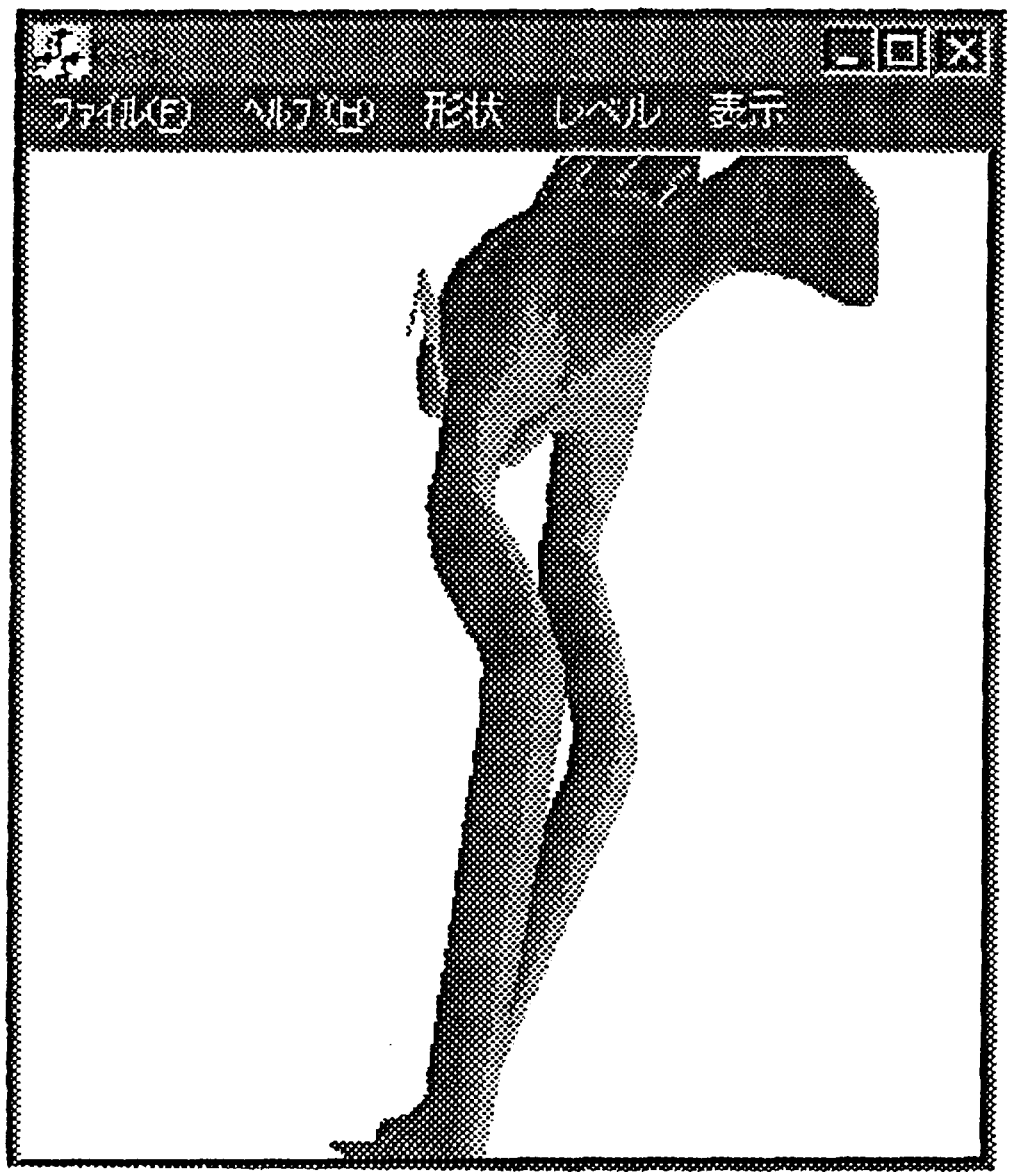
FIG. 45 is a view illustrating partial transformation of the object.
Figure 46:
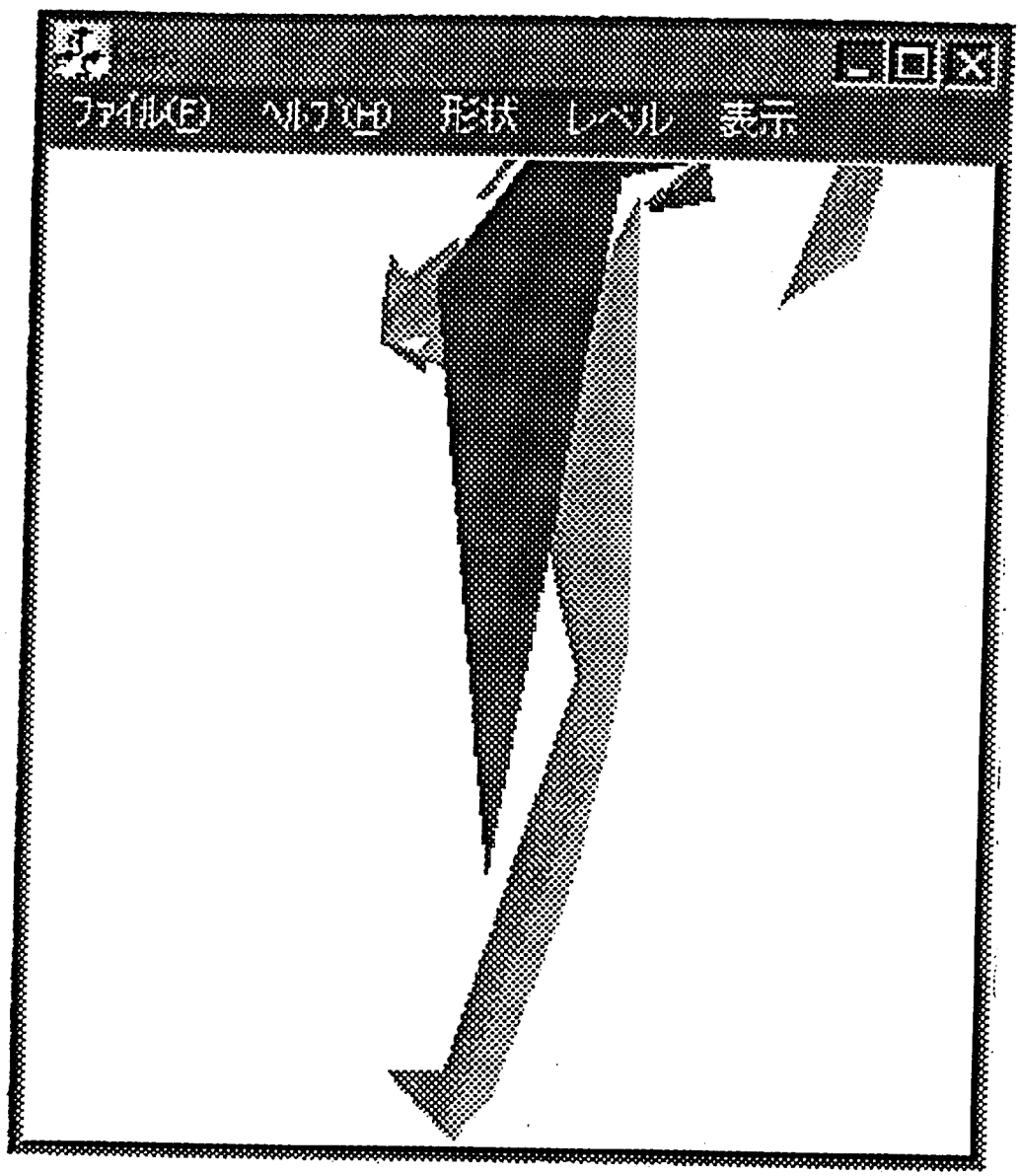
FIG. 46 is a view illustrating partial transformation of the object.
Figure 47:
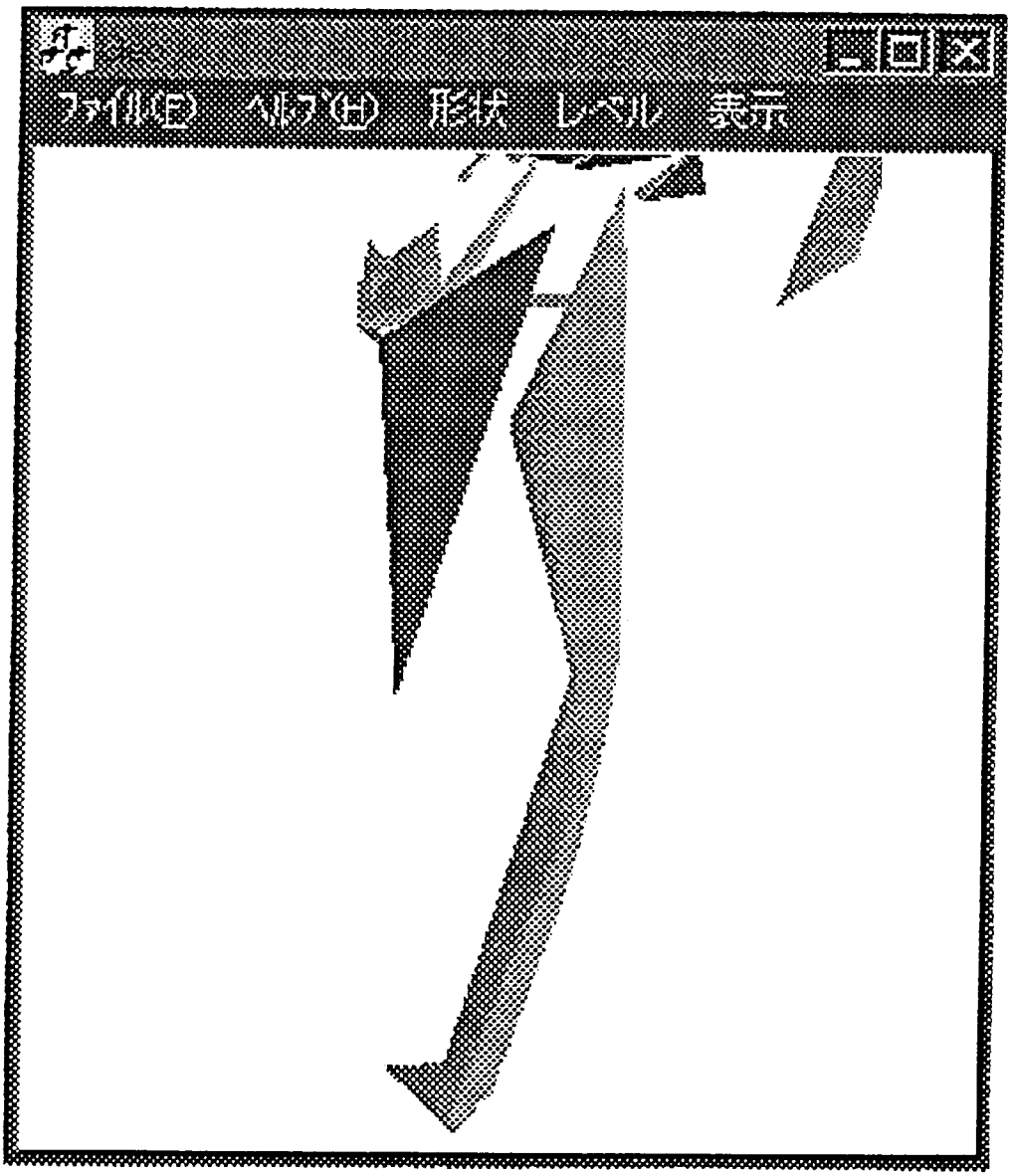
FIG. 47 is a view illustrating partial transformation of the object.
Figure 48:
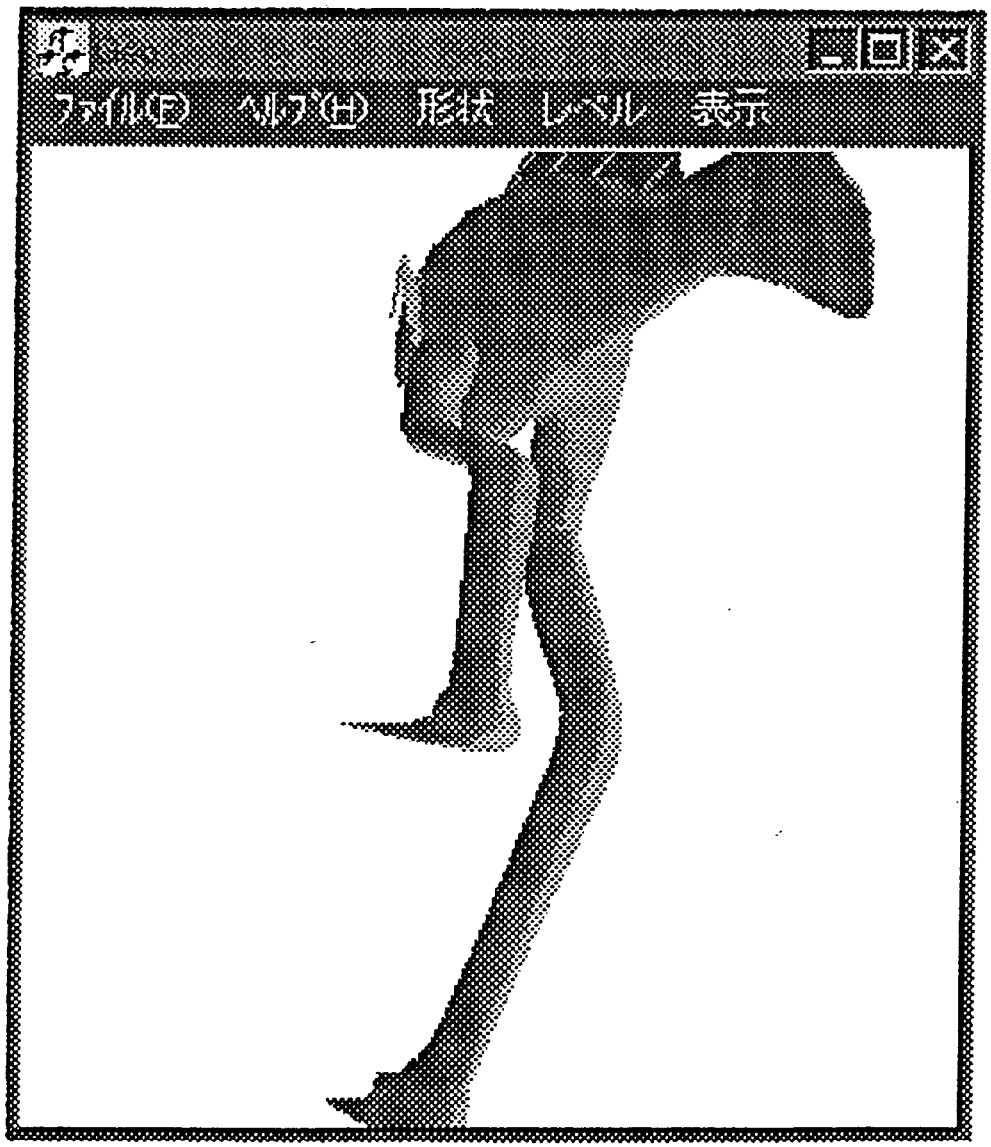
FIG. 48 is a view illustrating partial transformation of the object.

Thereafter, the merging part 1026 sequentially computes the detailed polygon data 1062, so that the lifting of the left leg of the object is rendered as shown in FIG. 44. According to the method of the present invention, neither cracks nor distortion can be seen in the whole shape formed by polygons, as in FIG. 44. FIGS. 45 to 48 are views showing the objects that are subjected to the same process as FIGS. 41 to 44 when viewed from below on the left side.

In this embodiment, the object has changed directly from one shape to another shape. However, objects with shapes on the way of the change between the two shapes shown in the example of this embodiment can be produced and can be rendered at every predetermined time, so that animation where the object is gradually lifting its left leg can be produced, as in the case of Embodiment 4.

As described above, the use of the 3D real-time graphics generator of this embodiment facilitates editing of an object. Thus, it is possible to reduce the amount of work of an animator, for example in production of animation where a plurality of graphics on which an object is gradually changing are generated and rendered continuously by a predetermined time. Furthermore, the use of the progressive polygon data of the present invention makes it possible for a computer to perform the process at high speed, because the computer has only to compute the amount of data of order (n) in the sequential computation for the detailed polygon data. That is, even if the complexity of a problem increases by n times, the amount of data for the computation increases only by n times.

(Embodiment 6)

Next, a sixth embodiment of the present invention will be described with reference to the accompanying drawings.

In this embodiment, the case where the entire object is transformed will be described.

Figure 49:
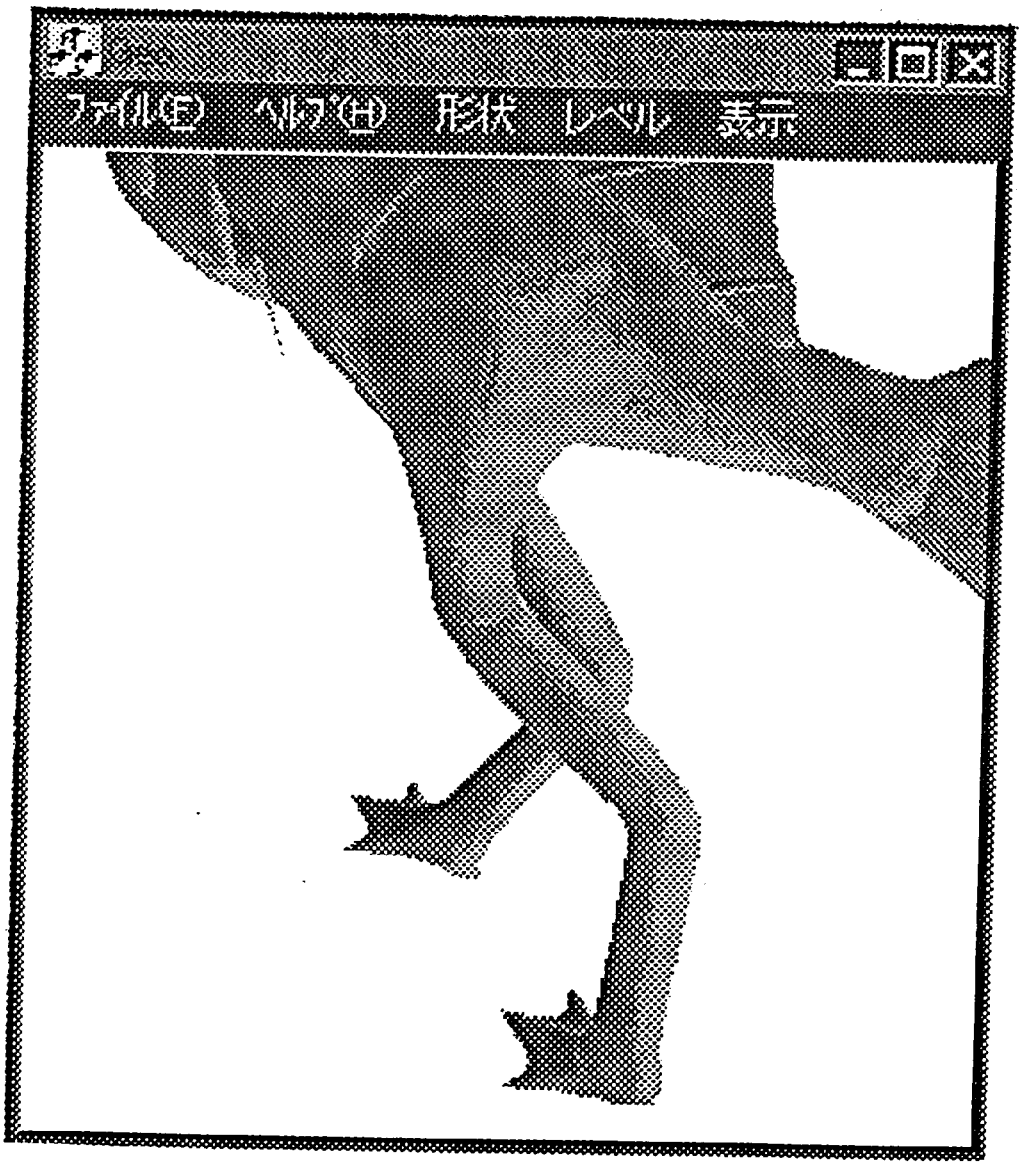
FIG. 49 is a view illustrating entire transformation of the object.
Figure 50:
FIG. 50 is a view illustrating entire transformation of the object.

FIG. 49 shows an example of a object whose progressive polygon data has been obtained according to the method for generating progressive polygon data of the present invention. When this object is rendered with only the basic polygon data 1061, the representation is coarse, as seen in FIG. 50 where the left leg is formed as a triangle.

Figure 51:
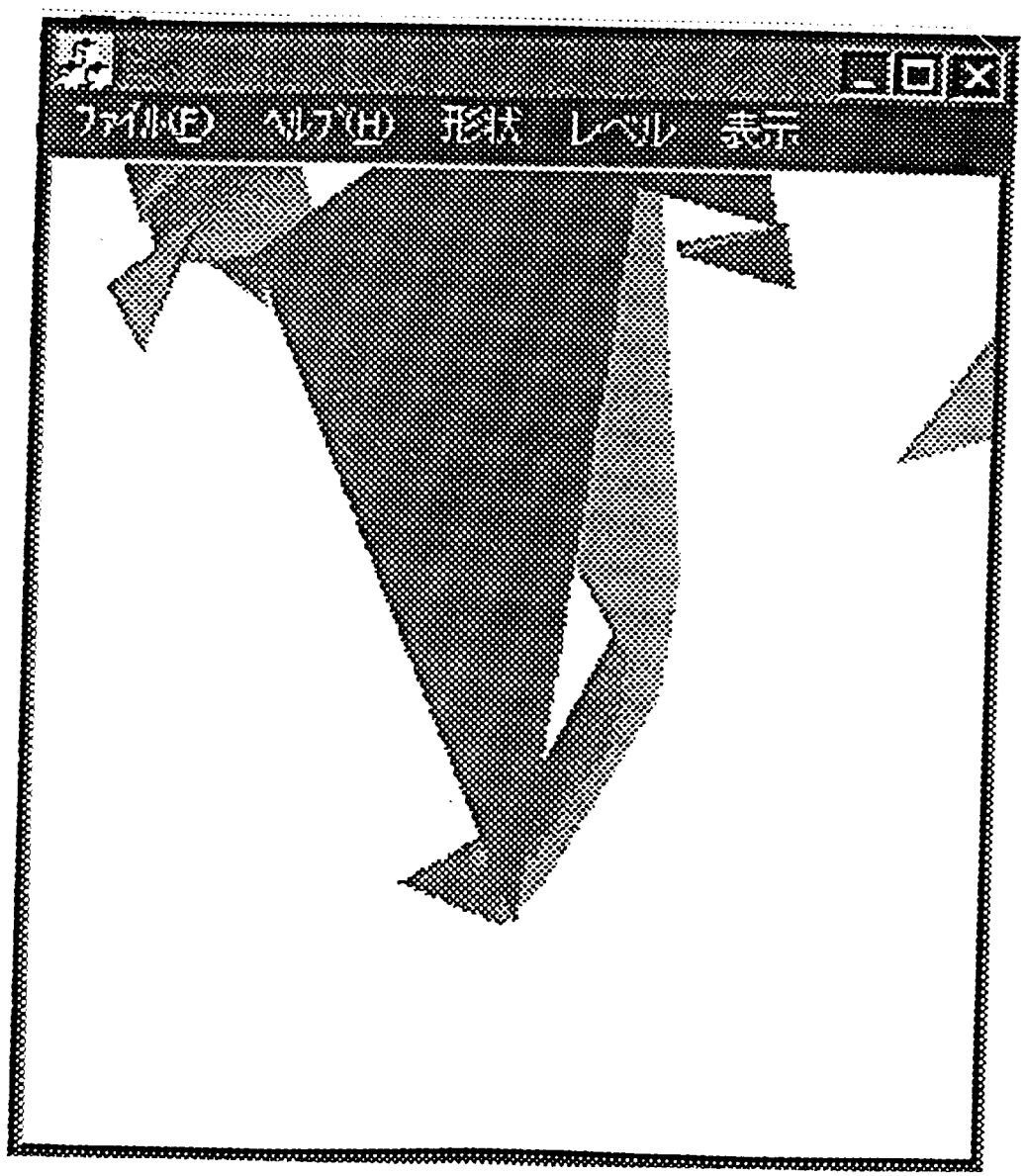
FIG. 51 is a view illustrating entire transformation of the object.

Next, the positions of the vertices of polygons representing the left leg of this object are changed via the basic polygon data editing part 1024. FIG. 51 is a view showing the shape of the polygon mesh that has been transformed due to the change.

Figure 52:
FIG. 52 is a view illustrating entire transformation of the object.
Figure 53:
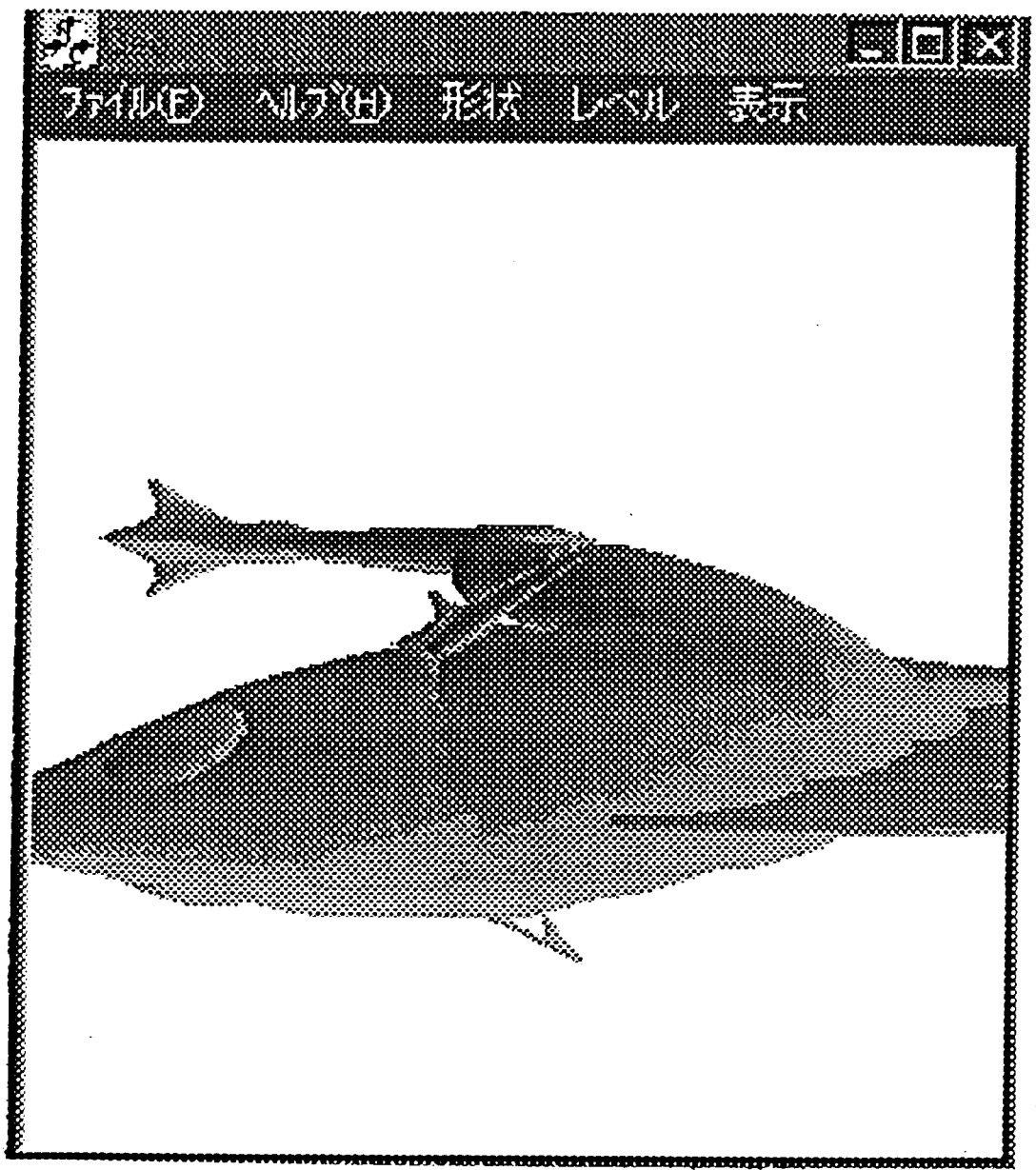
FIG. 53 is a view illustrating entire transformation of the object.
Figure 54:
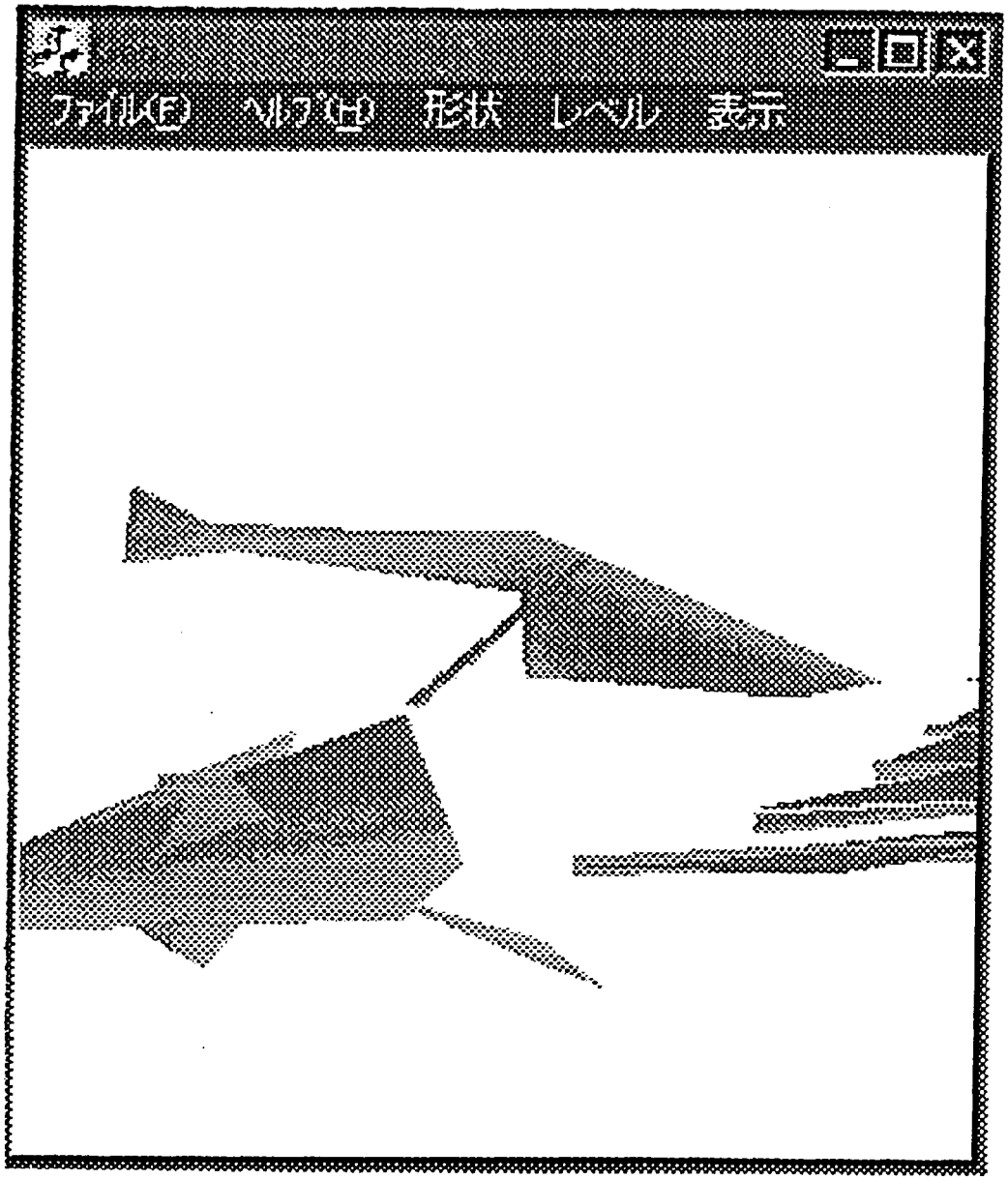
FIG. 54 is a view illustrating entire transformation of the object.
Figure 55:
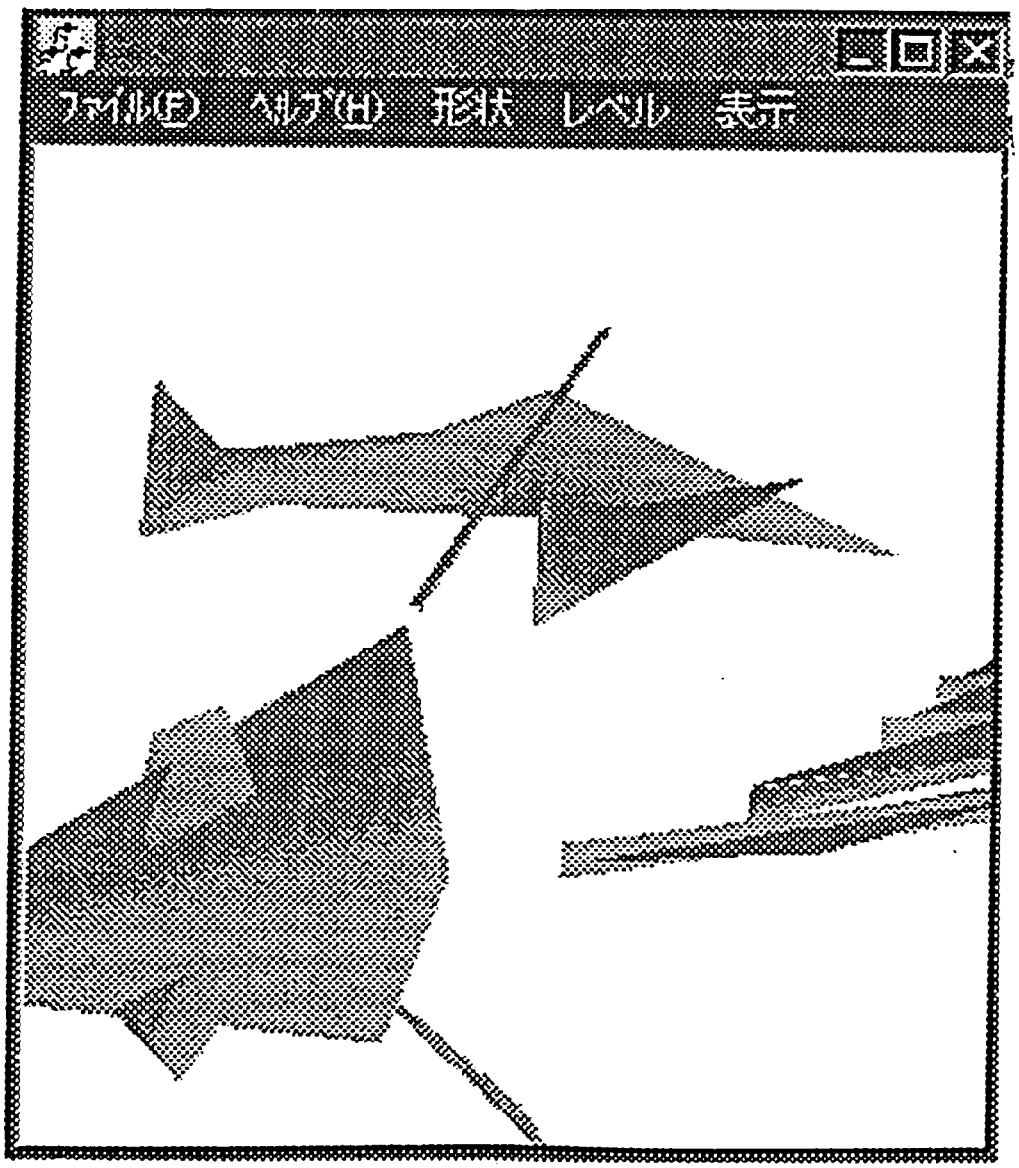
FIG. 55 is a view illustrating entire transformation of the object.
Figure 56:
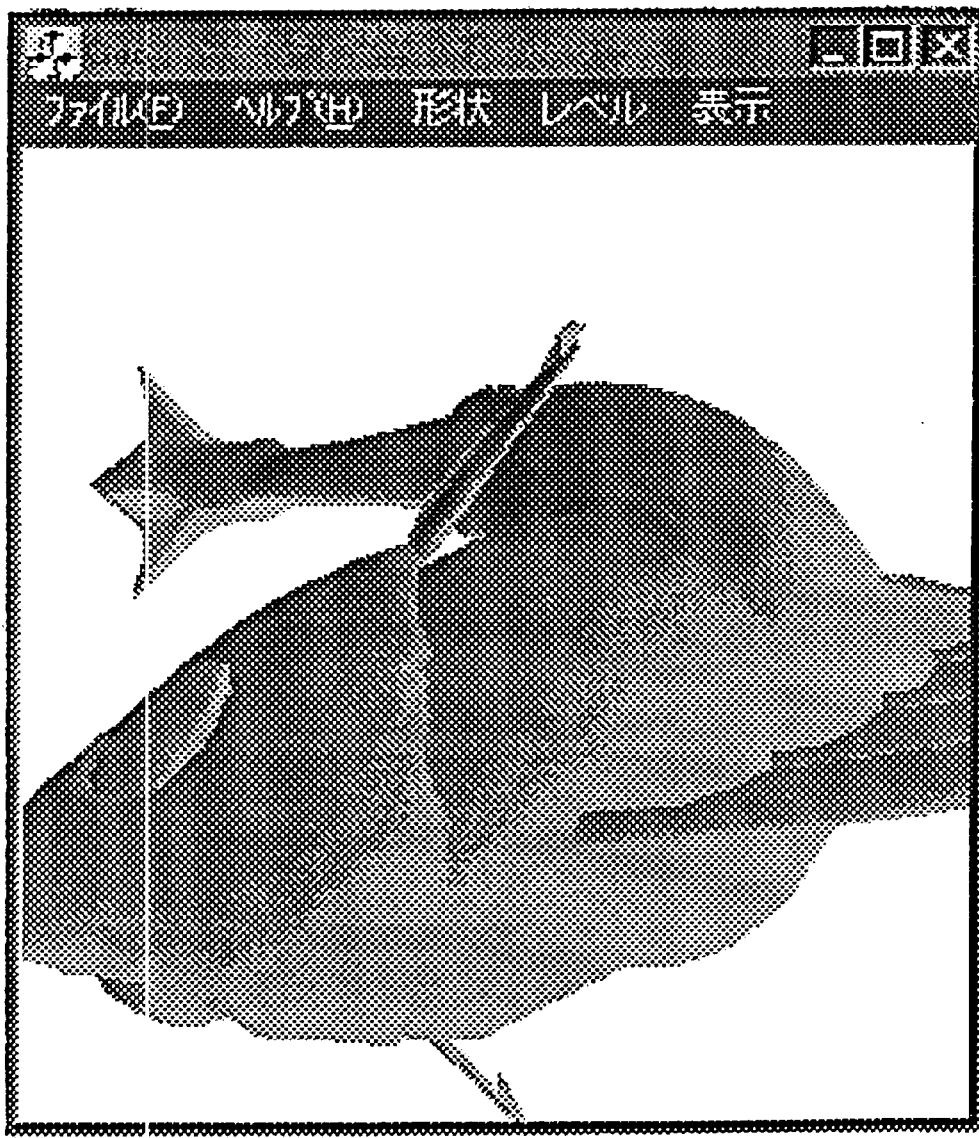
FIG. 56 is a view illustrating entire transformation of the object.

Thereafter, the same process as in Embodiment 4 is performed so that the swelling of the left leg of the object is rendered, as shown in FIG. 52. FIGS. 53 to 56 are views showing the objects that are subjected to the same process as FIGS. 49 to 52 when viewed from above.

In this embodiment, the object has changed directly from one shape to another shape. However, a plurality of objects with shapes on the way of the change between the two shapes shown in the example of this embodiment can be produced and can be rendered at every predetermined time, so that animation where the left leg is gradually swollen can be produced, as in the case of Embodiment 4.

As described above, the use of the 3D real-time graphics generator of this embodiment facilitates editing of an object. Thus, it is possible to reduce the amount of work of an animator, for example in production of animation where a plurality of graphics on which an object is gradually changing are generated and rendered continuously by a predetermined time. Furthermore, the use of the progressive polygon data of the present invention makes it possible for a computer to perform the process at high speed, because the computer has only to compute the amount of data of order (n) in the sequential computation for the detailed polygon data. That is, even if the complexity of a problem increases by n times, the amount of data for the computation increases only by n times.

In the above-described embodiments, as the method for generating progressive polygon data, the method of virtually bisecting a 3D object and the method of approximating a tetrahedron to the shape of the object progressively have been described. The effect of the present invention can be obtained when progressively detailed vertices are obtained and information about the positions of the obtained detailed vertices are stored in the form of relative coordinates. Methods for realizing the effect of the present invention are not limited to the methods that have been described above.

A recording medium in which programs for realizing the progressive polygon data generator and the 3D real-time graphics generator of the present invention are recorded can be not only a transportable recording medium 572 such as a CD-ROM 572-1, or a floppy disk 572-2, but also a remote accessible storage apparatus 571 or an equipped storage medium such as a hard disk and a RAM of a computer. The program 574 is loaded into the main memory of a data processing apparatus, and executed.

Furthermore, a recording medium storing the progressive polygon data generated according to the apparatus or the method for generating the progressive polygon data of the present invention can be not only a transportable recording medium 572 such as a CD-ROM 572-1, or a floppy disk 572-2, but also a remote storage apparatus 571 or an equipped storage medium such as a hard disk and a RAM of a computer. For example, the recording medium can be read by a computer when the 3D real-time graphics generator of the present invention is utilized.

As described above, the use of the apparatus and method for generating the progressive polygon data of the present invention makes it possible to deal with any number of rendering polygons, so that 3D polygon data that can be utilized for general purposes by machines with various performances can be generated. Moreover, since the detailed polygon data is generated progressively, it is possible to reduce a storage area for 3D polygon data.

Furthermore, the use of the progressive polygon data generated according to the present invention makes it possible to reduce the amount of data processed by the computer so that the computer can process data at high speed.

Furthermore, the use of the apparatus and method for generating the 3D real-time graphics facilitates editing of objects so that the amount of work of an animator can be reduced.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A progressive polygon data generator, comprising:
   a basic vertex determinator for determining vertices of a basic polyhedron approximate to a shape of a 3D object;

a detailed vertex determinator for determining vertices of a detailed polyhedron in a level of approximation to the 3D object that is higher than the approximation of the basic polyhedron progressively based on the level of approximation;

a detailed vertex coordinate calculator for progressively calculating relative position coordinates of the vertices of the detailed polyhedron determined by said detailed vertex determinator in a relative coordinate system based on a plurality of predetermined vertices in a level of approximation that is lower than the detailed polyhedron;

a basic polygon data generator for generating basic polygon data representing the basic polyhedron based on the vertices of the basic polyhedron determined by said basic vertex determinator;

a detailed polygon data generator for generating detailed polygon data for representing each progressive detailed polyhedron in a corresponding level of approximation to the 3D object based on the vertices of each detailed polyhedron determined by said detailed vertex determinator, which information is described in relative position coordinates in the relative coordinate system; and a polygon progressing part for combining the basic polygon data and the detailed polygon data and progressively generating polygon data for rendering respective models in each progressive level in corresponding levels of approximation to the 3D object.

2. The progressive polygon data generator according to claim 1, wherein said basic vertex determinator determines vertices of the basic polyhedron by selection of an operator.

3. The progressive polygon data generator according to claim 1, wherein said detailed vertex determinator comprises:

an approximation level calculator for calculating a difference between an area of each face of the basic polyhedron and an area on a surface of the 3D object defined by line segments connecting vertices of each face of the basic polyhedron;

a comparator for comparing the difference calculated by the approximation level calculator with a predetermined value; and a progressive vertex determinator for determining a new vertex closer to the surface of the 3D object than a corresponding face when the comparator determines that the difference is the predetermined value or more, and not determining a new vertex when the difference is determined to be smaller than the predetermined value, wherein when a new vertex is determined by said progressive vertex determinator, the approximation level calculator calculates a difference in area with respect to a polyhedron defined by the corresponding face and the new vertex, and the progressive vertex determinator determines a vertex of a polygon in a higher level of approximation recursively, until the progressive vertex determinator no longer determines a new vertex.

4. The progressive polygon data generator according to claim 3, wherein the progressive vertex determinator determines, as the new vertex, a point at which a normal line from a centroid of the corresponding face of the detailed polyhedron intersects a face represented by original polygon data obtained by geometric modeling of the 3D object.

5. A 3D real-time graphics generator, comprising:

a rendering polygon number determinator for determining a number of polygons for rendering 3D polygon data;

a 3D polygon data producer for producing 3D polygon data based on progressive polygon data in accordance with the number of polygons determined by the rendering polygon number determinator;

a progressive polygon data generator generating the progressive polygon data, comprising:

a basic vertex determinator determining vertices of a basic polyhedron approximate to a shape of a 3D object;

a detailed vertex determinator determining vertices of a detailed polyhedron in a level of approximation to the 3D object that is higher than the approximation of the basic polyhedron progressively based on the level of approximation;

a detailed vertex coordinate calculator progressively calculating relative position coordinates of the vertices of the detailed polyhedron determined by said detailed vertex determinator in a relative coordinate system based on a plurality of predetermined vertices in a level of approximation that is lower than the detailed polyhedron;

a basic polygon data generator generating basic polygon data representing the basic polyhedron based on the vertices of the basic polyhedron determined by said basic vertex determinator;

a detailed polygon data generator generating detailed polygon data for representing each progressive detailed polyhedron in a corresponding level of approximation to the 3D object based on the vertices of each detailed polyhedron determined by said detailed vertex determinator, which information is described in relative position coordinates in the relative coordinate system;

a polygon progressing part combining the basic polygon data and the detailed polygon data and progressively generating polygon data for rendering respective models in each progressive level in corresponding levels of approximation to the 3D object;

an outputting unit outputting the generated progressive polygon data, wherein said basic vertex determinator determines vertices of the basic polyhedron by selection of an operator, wherein said detailed vertex determinator comprises:

an approximation level calculator calculating a difference between an area of each face of the basic polyhedron and an area on a surface of the 3D object defined by line segments connecting vertices of each face of the basic polyhedron;

a comparator comparing the difference calculated by the approximation level calculator with a predetermined value; and a progressive vertex determinator determining a new vertex closer to the surface of the 3D object than a corresponding face when the comparator determines that the difference is the predetermined value or more, and not determining a new vertex when the difference is determined to be smaller than the predetermined value, wherein when a new vertex is determined by said progressive vertex determinator, the approximation level calculator calculates a difference in area with respect to a polyhedron defined by the corresponding face and the new vertex, and the progressive vertex determinator determines a vertex of a polygon in a higher level of approximation recursively, until the progressive vertex determinator no longer determines a new vertex.

6. The 3D real-time graphics generator according to claim 5, wherein the 3D polygon data producer produces 3D polygon data by determining vertices constituting 3D polygon data for rendering an object in accordance with the number of polygons determined by the rendering polygon number determinator.

7. The 3D real-time graphics generator according to claim 6, further comprising a basic vertex changer for changing positions of vertices of the basic polyhedron, wherein when positions of vertices of the basic polyhedron are changed by the basic vertex changer, the 3D polygon data producer calculates absolute coordinates of detailed vertices whose positions are represented by coordinates in a coordinate system determined based on the vertices, based on changed positions of the vertices.

8. The 3D real-time graphics generator according to claim 5, further comprising:

an animation data storage for storing a plurality of progressive polygon data added with information about rendering timing; and an animation rendering controller for rendering 3D polygon data produced by the 3D polygon data producer from the progressive polygon data stored in the animation data storage in accordance with the information about rendering timing.

9. The 3D real-time graphics generator according to claim 8, wherein the rendering polygon number determinator comprises a moving speed calculator for calculating a moving speed of an object when 3D polygon data is rendered sequentially, based on the plurality of progressive polygon data and the information about rendering timing stored in the animation data storage, and the rendering polygon number determinator determines the number of polygons based on the moving speed calculated by the moving speed calculator.

10. The 3D real-time graphics generator according to claim 8, wherein the rendering polygon number determinator comprises a Z value obtainer for obtaining a Z value representing a distance from a viewpoint to a position of a rendered object from the progressive polygon data; and the rendering polygon number determinator determines the number of polygons based on the distance obtained by the Z value obtainer.

11. The 3D real-time graphics generator according to claim 8, wherein the rendering polygon number determinator determines the number of polygons based on information about system resources on which the object is rendered.

12. A method for generating 3D real-time graphics, comprising:

a rendering polygon number determining operation determining the number of polygons for rendering 3D polygon data; and a 3D polygon data producing operation producing 3D polygon data based on progressive polygon data, based on the number of polygons determined by the rendering polygon number determining operation;

using a progressive polygon data generator to generate the progressive polygon data by performing:

a basic vertex operation determining vertices of a basic polyhedron approximate to a shape of a 3D object;

a detailed vertex operation determining vertices of a detailed polyhedron in a level of approximation to the 3D object that is higher than the approximation of the basic polyhedron progressively based on the level of approximation;

a detailed vertex coordinate operation progressively calculating relative position coordinates of the vertices of the detailed polyhedron determined by said detailed vertex operation in a relative coordinate system based on a plurality of predetermined vertices in a level of approximation that is lower than the detailed polyhedron;

a basic polygon data operation generating basic polygon data representing the basic polyhedron based on the vertices of the basic polyhedron determined by said basic vertex operation;

a detailed polygon data operation generating detailed polygon data for representing each progressive detailed polyhedron in a corresponding level of approximation to the 3D object based on the vertices of each detailed polyhedron determined by said detailed vertex operation, which information is described in relative position coordinates in the relative coordinate system;

a polygon progressing operation combining the basic polygon data and the detailed polygon data and progressively generating polygon data for rendering respective models in each progressive level in corresponding levels of approximation to the 3D object;

an outputting operation outputting the progressively generated polygon data, wherein said basic vertex operation determines vertices of the basic polyhedron by selection of an operator, wherein said detailed vertex operation comprises:

an approximation level operation calculating a difference between an area of each face of the basic polyhedron and an area on a surface of the 3D object defined by line segments connecting vertices of each face of the basic polyhedron;

a comparator operation comparing the difference calculated by the approximation level operation with a predetermined value; and a progressive vertex operation determining a new vertex closer to the surface of the 3D object than a corresponding face when the comparator operation determines that the difference is the predetermined value or more, and not determining a new vertex when the difference is determined to be smaller than the predetermined value, wherein when a new vertex is determined by said progressive vertex operation, the approximation level operation calculates a difference in area with respect to a polyhedron defined by the corresponding face and the new vertex, and the progressive vertex operation determines a vertex of a polygon in a higher level of approximation recursively, until the progressive vertex operation no longer determines a new vertex.

13. A computer-readable recording medium storing a program executing a process comprising:

a rendering polygon number determining operation determining the number of polygons for rendering 3D polygon data;

a 3D polygon data producing operation producing 3D polygon data based on the progressive polygon data, based on the number of polygons determined in the rendering polygon number determining operation, wherein in the 3D polygon data producing operation, the 3D polygon data is produced by determining vertices constituting the 3D polygon data for rendering an object, based on the number of polygons determined in the rendering polygon number determining operation, using a progressive polygon data generator to generate the progressive polygon data, by performing:

a basic vertex operation determining vertices of a basic polyhedron approximate to a shape of a 3D object;

a detailed vertex operation determining vertices of a detailed polyhedron in a level of approximation to the 3D object that is higher than the approximation of the basic polyhedron progressively based on the level of approximation;

a detailed vertex coordinate operation progressively calculating relative position coordinates of the vertices of the detailed polyhedron determined by said detailed vertex operation in a relative coordinate system based on a plurality of predetermined vertices in a level of approximation that is lower than the detailed polyhedron;

a basic polygon data operation generating basic polygon data representing the basic polyhedron based on the vertices of the basic polyhedron determined by said basic vertex operation;

a detailed polygon data operation generating detailed polygon data for representing each progressive detailed polyhedron in a corresponding level of approximation to the 3D object based on the vertices of each detailed polyhedron determined by said detailed vertex operation, which information is described in relative position coordinates in the relative coordinate system;

a polygon progressing operation combining the basic polygon data and the detailed polygon data and progressively generating polygon data for rendering respective models in each progressive level in corresponding levels of approximation to the 3D object, wherein, said basic vertex determinator determines vertices of the basic polyhedron by selection of an operator, wherein said detailed vertex operation comprises:

an approximation level operation calculating a difference between an area of each face of the basic polyhedron and an area on a surface of the 3D object defined by line segments connecting vertices of each face of the basic polyhedron;

a comparator operation comparing the difference calculated by the approximation level operation with a predetermined value;

a progressive vertex operation determining a new vertex closer to the surface of the 3D object than a corresponding face when the comparator operation determines that the difference is the predetermined value or more, and not determining a new vertex when the difference is determined to be smaller than the predetermined value; and an outputting operation outputting the generated progressive polygon data, wherein when a new vertex is determined by said progressive vertex operation, the approximation level operation calculates a difference in area with respect to a polyhedron defined by the corresponding face and the new vertex, and the progressive vertex operation determines a vertex of a polygon in a higher level of approximation recursively, until the progressive vertex operation no longer determines a new vertex.

14. A 3D real-time graphics generator comprising:

a rendering polygon number determinator for determining the number of polygons for rendering 3D polygon data; and a 3D polygon data producer for producing 3D polygon data based on progressive polygon data generated by the progressive polygon data generator in accordance with the number of polygons determined by the rendering polygon number determinator, wherein the progressive polygon data is generated by a progressive polygon generator comprising:

a basic vertex determinator determining vertices of a basic polyhedron approximate to a shape of a 3D object;

a detailed vertex determinator determining vertices of a detailed polyhedron in a level of approximation to the 3D object that is higher than the approximation of the basic polyhedron progressively based on the level of approximation;

a detailed vertex coordinate calculator progressively calculating relative position coordinates of the vertices of the detailed polyhedron determined by said detailed vertex determinator in a relative coordinate system based on a plurality of predetermined vertices in a level of approximation that is lower than the detailed polyhedron;

a basic polygon data generator generating basic polygon data representing the basic polyhedron based on the vertices of the basic polyhedron determined by said basic vertex determinator;

a detailed polygon data generator generating detailed polygon data for representing each progressive detailed polyhedron in a corresponding level of approximation to the 3D object based on the vertices of each detailed polyhedron determined by said detailed vertex determinator, which information is described in relative position coordinates in the relative coordinate system;

a polygon progressing part combining the basic polygon data and the detailed polygon data and progressively generating polygon data for rendering respective models in each progressive level in corresponding levels of approximation to the 3D object; and an outputting unit outputting the generated progressive polygon data.

15. The 3D real-time graphics generator according to claim 14, wherein the 3D polygon data producer produces 3D polygon data by determining vertices constituting 3D polygon data for rendering an object in accordance with the number of polygons determined by the rendering polygon number determinator.

16. The 3D real-time graphics generator according to claim 15, further comprising a basic vertex changer for changing positions of vertices of the basic polyhedron, wherein when positions of vertices of the basic polyhedron are changed by the basic vertex changer, the 3D polygon data producer calculates absolute coordinates of detailed vertices whose positions are represented by coordinates in a coordinate system determined based on the vertices, based on changed positions of the vertices.

17. The 3D real-time graphics generator according to claim 14, further comprising:

an animation data storage for storing a plurality of progressive polygon data added with information about rendering timing; and an animation rendering controller for rendering 3D polygon data produced by the 3D polygon data producer from the progressive polygon data stored in the animation data storage in accordance with the information about rendering timing.

18. The 3D real-time graphics generator according to claim 17,
wherein the rendering polygon number determinator comprises a moving speed calculator for calculating a moving speed of an object when 3D polygon data is rendered sequentially, based on the plurality of progressive polygon data and the information about rendering timing stored in the animation data storage; and
the rendering polygon number determinator determines the number of polygons based on the moving speed calculated by the moving speed calculator.

19. The 3D real-time graphics generator according to claim 17,
wherein the rendering polygon number determinator comprises a Z value obtainer for obtaining a Z value representing a distance from a viewpoint to a position of a rendered object from the progressive polygon data; and
the rendering polygon number determinator determines the number of polygons based on the distance obtained by the Z value obtainer.

20. The 3D real-time graphics generator according to claim 17, wherein the rendering polygon number determinator determines the number of polygons based on information about system resources on which the object is rendered.

21. A method for generating 3D real-time graphics comprising;
a rendering polygon number determining operation determining the number of polygons for rendering 3D polygon data; and
a 3D polygon data producing operation producing 3D polygon data based on progressive polygon data, based on the number of polygons determined by the rendering polygon number determining operation;
using a progressive polygon data generator to generate the progressive polygon data by performing:
a basic vertex operation determining vertices of a basic polyhedron approximate to a shape of a 3D object;
a detailed vertex operation determining vertices of a detailed polyhedron in a level of approximation to the 3D object that is higher than the approximation of the basic polyhedron progressively based on the level of approximation;
a detailed vertex coordinate operation progressively calculating relative position coordinates of the vertices of the detailed polyhedron determined by said detailed vertex operation in a relative coordinate system based on a plurality of predetermined vertices in a level of approximation that is lower than the detailed polyhedron;
a basic polygon data operation generating basic polygon data representing the basic polyhedron based on the vertices of the basic polyhedron determined by said basic vertex operation;
a detailed polygon data operation generating detailed polygon data for representing each progressive detailed polyhedron in a corresponding level of approximation to the 3D object based on the vertices of each detailed polyhedron determined by said detailed vertex operation, which information is described in relative position coordinates in the relative coordinate system;
a polygon progressing operation combining the basic polygon data and the detailed polygon data and progressively generating polygon data for rendering respective models in each progressive level in corresponding levels of approximation to the 3D object; and
an outputting operation outputting the generated progressive polygon data.

22. A computer-readable recording medium storing a program executing a process comprising:
a rendering polygon number determining operation determining the number of polygons for rendering 3D polygon data; and
a 3D polygon data producing operation producing 3D polygon data based on progressive polygon data, based on the number of polygons determined in the rendering polygon number determining operation,
wherein in the 3D polygon data producing operation, the 3D polygon data is produced by determining vertices constituting the 3D polygon data for rendering an object, based on the number of polygons determined in the rendering polygon number determining operation;
using a progressive polygon data generator to generate the progressive polygon data by performing:
a basic vertex operation determining vertices of a basic polyhedron approximate to a shape of a 3D object;
a detailed vertex operation determining vertices of a detailed polyhedron in a level of approximation to the 3D object that is higher than the approximation of the basic polyhedron progressively based on the level of approximation;
a detailed vertex coordinate operation progressively calculating relative position coordinates of the vertices of the detailed polyhedron determined by said detailed vertex operation in a relative coordinate system based on a plurality of predetermined vertices in a level of approximation that is lower than the detailed polyhedron;
a basic polygon data operation generating basic polygon data representing the basic polyhedron based on the vertices of the basic polyhedron determined by said basic vertex operation;
a detailed polygon data operation generating detailed polygon data for representing each progressive detailed polyhedron in a corresponding level of approximation to the 3D object based on the vertices of each detailed polyhedron determined by said detailed vertex operation, which information is described in relative position coordinates in the relative coordinate system;
a polygon progressing operation combining the basic polygon data and the detailed polygon data and progressively generating polygon data for rendering respective models in each progressive level in corresponding levels of approximation to the 3D object; and
an outputting operation outputting the generated progressive polygon data.

23. A progressive polygon data generator, comprising:
a basic vertex determinator for determining vertices of polygons approximate to an outer edge shape of cross-sections virtually segmenting a 3D object such that the determined vertices are vertices of a basic polyhedron approximate to a shape of the 3D object;

a detailed vertex determinator for progressively determining vertices of a detailed polyhedron in a level of approximation to the 3D object that is higher than the basic polyhedron based on the level of approximation;

a detailed vertex coordinate calculator for progressively calculating relative position coordinates of the detailed polyhedron vertices determined by said detailed vertex determinator in a relative coordinate system based on a plurality of predetermined vertices of a polyhedron in a level of approximation that is lower than the detailed polyhedron;

a basic polygon data generator for generating basic polygon data for representing the basic polyhedron based on information on the vertices of the basic polyhedron determined by the basic vertex determinator;

a detailed polygon data generator for generating detailed polygon data for representing each progressive detailed polyhedron in a corresponding level of approximation to the 3D object based on the information on vertices of the detailed polyhedron determined by the detailed vertex determinator, which information is described in relative position coordinates in a relative coordinate system; and a polygon progressing part for combining the basic polygon data and the detailed polygon data and generating progressive polygon data for rendering respective models in each progressive level in a corresponding level of approximation to the 3D object.

24. The progressive polygon data generator according to claim 23, wherein the 3D object is a 3D object represented by the original polygon data obtained by geometric modeling of the 3D object, the polygon approximate to an outer edge shape of each cross-section determined by the basic vertex determinator is a quadrilateral which is defined by that points at which line segments represented by intersect a face virtually bisecting the 3D object are selected as control points so as to form a second polygonal shape by connecting the control points and the polygon approximate to each cross-section is a quadrilateral defined by four vertices that divide a total length of sides of the second polygonal shape into four equal lengths.

25. The progressive polygon data generator according to claim 24, wherein the detailed vertex determinator comprises:

an approximation level calculator for calculating a difference between a length of each side of the quadrilateral and a total length of sides of the second polygonal shape between both ends of each side of the quadrilateral;

a comparator for comparing the difference calculated by the approximation level calculator with a predetermined value;

a progressive vertex determinator for determining a point that divides into two equal lengths the total length of the sides of the second polygonal shape between both ends of the side of the quadrilateral as a vertex of a polygon in a higher level of approximation when the comparator determines that the difference is the predetermined value or more, and not determining a vertex of a polygon in a higher level of approximation when the difference is determined to be smaller than the predetermined value, and when a vertex of a polygon in a higher level of approximation is determined by the progressive vertex determinator, the approximation level calculator calculates the difference with respect to a newly produced side of the polygon whose vertex is determined, and the progressive vertex determinator determines a vertex of a polygon in a higher level of approximation recursively, until the progressive vertex determinator no longer determines a vertex of a polygon in a higher level of approximation.

26. The progressive polygon data generator according to claim 23, wherein the detailed vertex determinator progressively determines vertices of a polygon the number of which is increased so that the level of approximation to the outer edge shape of each cross-section is higher than the polygon approximate to the outer edge shape of each cross-section as detailed vertices, based on the increased number of vertices.

27. A 3D real-time graphics generator comprising:

a rendering polygon number determinator determining the number of polygons for rendering 3D polygon data;

a 3D polygon data producer for producing 3D polygon data based on progressive polygon data in accordance with the number of polygons determined by the rendering polygon number determinator, wherein the progressive polygon data is generated by a progressive polygon data generator, comprising:

a basic vertex determinator determining vertices of a basic polyhedron approximate to a shape of a 3D object;

a detailed vertex determinator determining vertices of a detailed polyhedron in a level of approximation to the 3D object that is higher than the approximation of the basic polyhedron progressively based on the level of approximation;

a detailed vertex coordinate calculator progressively calculating relative position coordinates of the vertices of the detailed polyhedron determined by said detailed vertex determinator in a relative coordinate system based on a plurality of predetermined vertices in a level of approximation that is lower than the detailed polyhedron;

a basic polygon data generator generating basic polygon data representing the basic polyhedron based on the vertices of the basic polyhedron determined by said basic vertex determinator;

a detailed polygon data generator generating detailed polygon data for representing each progressive detailed polyhedron in a corresponding level of approximation to the 3D object based on the vertices of each detailed polyhedron determined by said detailed vertex determinator, which information is described in relative position coordinates in the relative coordinate system;

a polygon progressing part combining the basic polygon data and the detailed polygon data and progressively generating polygon data for rendering respective models in each progressive level in corresponding levels of approximation to the 3D object;

an outputting unit outputting the generated progressive polygon data, wherein the 3D object is a 3D object represented by the original polygon data obtained by geometric modeling of the 3D object, the polygon approximate to an outer edge shape of each cross-section determined by the basic vertex determinator is a quadrilateral which is defined by control points at which line segments intersect a face virtually bisecting the 3D object so as to form a second polygonal shape by connecting the control points and the polygon approximate to each cross-section which is a quadrilateral defined by four vertices that divide a total length of sides of the second polygonal shape into four equal lengths,
wherein the detailed vertex determinator comprises:
an approximation level calculator calculating a difference between a length of each side of the quadrilateral and a total length of sides of the second polygonal shape between both ends of each side of the quadrilateral;
a comparator comparing the difference calculated by the approximation level calculator with a predetermined value; and
a progressive vertex determinator determining a point that divides into two equal lengths the total length of the sides of the second polygonal shape between both ends of the side of the quadrilateral as a vertex of a polygon in a higher level of approximation when the comparator determines that the difference is the predetermined value or more, and not determining a vertex of a polygon in a higher level of approximation when the difference is determined to be smaller than the predetermined value,
when a vertex of a polygon in a higher level of approximation is determined by the progressive vertex determinator, the approximation level calculator calculates the difference with respect to a newly produced side of the polygon whose vertex is determined, and the progressive vertex determinator determines a vertex of a polygon in a higher level of approximation recursively, until the progressive vertex determinator no longer determines a vertex of a polygon in a higher level of approximation.

28. The 3D real-time graphics generator according to claim 27, wherein the 3D polygon data producer produces 3D polygon data by determining vertices constituting 3D polygon data for rendering an object in accordance with the number of polygons determined by the rendering polygon number determinator.

29. The 3D real-time graphics generator according to claim 28, further comprising a basic vertex changer for changing positions of vertices of the 30 basic polyhedron, wherein
when positions of vertices of the basic polyhedron are changed by the basic vertex changer, the 3D polygon data producer calculates absolute coordinates of detailed vertices whose positions are represented by coordinates in a coordinate system determined based on the vertices, based on changed positions of the vertices.

30. The 3D real-time graphics generator according to claim 27, further comprising:
an animation data storage for storing a plurality of progressive polygon data added with information about rendering timing; and
an animation rendering controller for rendering 3D polygon data produced by the 3D polygon data producer from the progressive polygon data stored in the animation data storage in accordance with the information about rendering timing.

31. The 3D real-time graphics generator according to claim 30,
wherein the rendering polygon number determinator comprises a moving speed calculator for calculating a moving speed of an object when 3D polygon data is rendered sequentially, based on the plurality of progressive polygon data and the information about rendering timing stored in the animation data storage; and
the rendering polygon number determinator determines the number of polygons based on the moving speed calculated by the moving speed calculator.

32. The 3D real-time graphics generator according to claim 30,
wherein the rendering polygon number determinator comprises a Z value obtainer for obtaining a Z value representing a distance from a viewpoint to a position of a rendered object from the progressive polygon data; and
the rendering polygon number determinator determines the number of polygons based on the distance obtained by the Z value obtainer.

33. The 3D real-time graphics generator according to claim 30, wherein the rendering polygon number determinator determines the number of polygons based on information about the system resources on which the object is rendered.

34. A method for generating 3D real-time graphics using progressive polygon data, comprising:
a rendering polygon number determining operation determining a number of polygons for rendering 3D polygon data;
a 3D polygon data producing operation producing 3D polygon data based on progressive polygon data, based on the number of polygons determined by the rendering polygon number determining operation,
using a progressive polygon data generator to generate the progressive polygon data by performing:
a basic vertex operation determining vertices of polygons approximate to an outer edge shape of cross-sections virtually segmenting a 3D object such that the determined vertices are vertices of a basic polyhedron approximate to a shape of the 3D object;
a detailed vertex operation progressively determining vertices of a detailed polyhedron in a level of approximation to the 3D object that is higher than the basic polyhedron based on the level of approximation;
a detailed vertex coordinate operation progressively calculating relative position coordinates of the detailed polyhedron vertices determined by said detailed vertex operation in a relative coordinate system based on a plurality of predetermined vertices of a polyhedron in a level of approximation that is lower than the detailed polyhedron;
a basic polygon data generator operation generating basic polygon data for representing the basic polyhedron based on information on the vertices of the basic polyhedron determined by the basic vertex operation;
a detailed polygon data generator operation generating detailed polygon data for representing each progressive detailed polyhedron in a corresponding level of approximation to the 3D object based on the information on vertices of the detailed polyhedron determined by the detailed vertex operation, which information is described in relative position coordinates in a relative coordinate system;
a polygon progressing operation combining the basic polygon data and the detailed polygon data and generating progressive polygon data for rendering respective models in each progressive level in a corresponding level of approximation to the 3D object;

an outputting operation outputting the generated progressive polygon data, wherein the 3D object is a 3D object represented by the original polygon data obtained by geometric modeling of the 3D object, the polygon approximate to an outer edge shape of each cross-section determined by the basic vertex determinator is a quadrilateral which is defined by control points at which line segments intersect a face virtually bisecting the 3D object so as to form a second polygonal shape by connecting the control points and the polygon approximate to each cross-section which is a quadrilateral defined by four vertices that divide a total length of sides of the second polygonal shape into four equal lengths, wherein the detailed vertex operation comprises:

an approximation level operation calculating a difference between a length of each side of the quadrilateral and a total length of sides of the second polygonal shape between both ends of each side of the quadrilateral;

a comparator operation comparing the difference calculated by the approximation level calculator with a predetermined value; and a progressive vertex operation determining a point that divides into two equal lengths the total length of the sides of the second polygonal shape between both ends of the side of the quadrilateral as a vertex of a polygon in a higher level of approximation when the comparator operation determines that the difference is the predetermined value or more, and not determining a vertex of a polygon in a higher level of approximation when the difference is determined to be smaller than the predetermined value, when a vertex of a polygon in a higher level of approximation is determined by the progressive vertex operation, the approximation level calculator calculates the difference with respect to a newly produced side of the polygon whose vertex is determined, and the progressive vertex operation determines a vertex of a polygon in a higher level of approximation recursively, until the progressive vertex operation no longer determines a vertex of a polygon in a higher level of approximation.

35. A computer-readable recording medium storing a program executing a process comprising:

a rendering polygon number determining operation determining a number of polygons for rendering 3D polygon data;

a 3D polygon data producing operation producing 3D polygon data based on the progressive polygon data, based on the number of polygons determined in the rendering polygon number determining operation, wherein in the 3D polygon data producing operation, the 3D polygon data is produced by determining vertices constituting the 3D polygon data for rendering an object, based on the number of polygons determined in the rendering polygon number determining operation;

using a progressive polygon data generator to generator the progressive polygon data by performing:

a basic vertex operation determining vertices of polygons approximate to an outer edge shape of cross-sections virtually segmenting a 3D object such that the determined vertices are vertices of a basic polyhedron approximate to a shape of the 3D object;

a detailed vertex operation progressively determining vertices of a detailed polyhedron in a level of approximation to the 3D object that is higher than the basic polyhedron based on the level of approximation;

a detailed vertex coordinate operation progressively calculating relative position coordinates of the detailed polyhedron vertices determined by said detailed vertex operation in a relative coordinate system based on a plurality of predetermined vertices of a polyhedron in a level of approximation that is lower than the detailed polyhedron;

a basic polygon data generator operation generating basic polygon data for representing the basic polyhedron based on information on the vertices of the basic polyhedron determined by the basic vertex operation;

a detailed polygon data generator operation generating detailed polygon data for representing each progressive detailed polyhedron in a corresponding level of approximation to the 3D object based on the information on vertices of the detailed polyhedron determined by the detailed vertex operation, which information is described in relative position coordinates in a relative coordinate system;

a polygon progressing operation combining the basic polygon data and the detailed polygon data and generating progressive polygon data for rendering respective models in each progressive level in a corresponding level of approximation to the 3D object;

an outputting operation outputting the generated progressive polygon data, wherein the 3D object is a 3D object represented by the original polygon data obtained by geometric modeling of the 3D object, the polygon approximate to an outer edge shape of each cross-section determined by the basic vertex determinator is a quadrilateral which is defined by control points at which line segments intersect a face virtually bisecting the 3D object so as to form a second polygonal shape by connecting the control points and the polygon approximate to each cross-section which is a quadrilateral defined by four vertices that divide a total length of sides of the second polygonal shape into four equal lengths, wherein the detailed vertex operation comprises:

an approximation level operation calculating a difference between a length of each side of the quadrilateral and a total length of sides of the second polygonal shape between both ends of each side of the quadrilateral;

a comparator operation comparing the difference calculated by the approximation level calculator with a predetermined value; and a progressive vertex operation determining a point that divides into two equal lengths the total length of the sides of the second polygonal shape between both ends of the side of the quadrilateral as a vertex of a polygon in a higher level of approximation when the comparator operation determines that the difference is the predetermined value or more, and not determining a vertex of a polygon in a higher level of approximation when the difference is determined to be smaller than the predetermined value, when a vertex of a polygon in a higher level of approximation is determined by the progressive vertex operation, the approximation level calculator calculates the difference with respect to a newly produced side of the polygon whose vertex is determined, and the progressive vertex operation determines a vertex of a polygon in a higher level of approximation recursively, until the progressive vertex operation no longer determines a vertex of a polygon in a higher level of approximation.

36. A 3D real-time graphics generator comprising:
a rendering polygon number determinator determining the number of polygons for rendering 3D polygon data;
a 3D polygon data producer producing 3D polygon data based on the progressive polygon data in accordance with the number of polygons determined by the rendering polygon number determinator,
wherein the progressive polygon data is generated by a progressive polygon data generator comprising:
   a basic vertex determinator determining vertices of a basic polyhedron approximate to a shape of a 3D object;
   a detailed vertex determinator determining vertices of a detailed polyhedron in a level of approximation to the 3D object that is higher than the approximation of the basic polyhedron progressively based on the level of approximation;
   a detailed vertex coordinate calculator progressively calculating relative position coordinates of the vertices of the detailed polyhedron determined by said detailed vertex determinator in a relative coordinate system based on a plurality of predetermined vertices in a level of approximation that is lower than the detailed polyhedron;
   a basic polygon data generator generating basic polygon data representing the basic polyhedron based on the vertices of the basic polyhedron determined by said basic vertex determinator;
   a detailed polygon data generator generating detailed polygon data for representing each progressive detailed polyhedron in a corresponding level of approximation to the 3D object based on the vertices of each detailed polyhedron determined by said detailed vertex determinator, which information is described in relative position coordinates in the relative coordinate system; and
   a polygon progressing part combining the basic polygon data and the detailed polygon data and progressively generating polygon data for rendering respective models in each progressive level in corresponding levels of approximation to the 3D object; and
   an outputting unit outputting the generated progressive polygon data.

37. The 3D real-time graphics generator according to claim 36, wherein the 3D polygon data producer produces 3D polygon data by determining vertices constituting 3D polygon data for rendering an object in accordance with the number of polygons determined by the rendering polygon number determinator.

38. The 3D real-time graphics generator according to claim 37, further comprising a basic vertex changer for changing positions of vertices of the basic polyhedron, wherein
when positions of vertices of the basic polyhedron are changed by the basic vertex changer, the 3D polygon data producer calculates absolute coordinates of detailed vertices whose positions are represented by coordinates in a coordinate system determined based on the vertices, based on changed positions of the vertices.

39. The 3D real-time graphics generator according to claim 36, further comprising:
an animation data storage for storing a plurality of progressive polygon data added with information about rendering timing; and
an animation rendering controller for rendering 3D polygon data produced by the 3D polygon data producer from the progressive polygon data stored in the animation data storage in accordance with the information about rendering timing.

40. The 3D real-time graphics generator according to claim 39,
wherein the rendering polygon number determinator comprises a moving speed calculator for calculating a moving speed of an object when 3D polygon data is rendered sequentially, based on the plurality of progressive polygon data and the information about rendering timing stored in the animation data storage; and
the rendering polygon number determinator determines the number of polygons based on the moving speed calculated by the moving speed calculator.

41. The 3D real-time graphics generator according to claim 39,
wherein the rendering polygon number determinator comprises a Z value obtainer for obtaining a Z value representing a distance from a viewpoint to a position of a rendered object from the progressive polygon data; and
the rendering polygon number determinator determines the number of polygons based on the distance obtained by the Z value obtainer.

42. The 3D real-time graphics generator according to claim 39, wherein the rendering polygon number determinator determines the number of polygons based on information about system resources on which the object is rendered.

43. A method for generating 3D real-time graphics comprising:
a rendering polygon number determining operation determining a number of polygons for rendering 3D polygon data;
a 3D polygon data producing operation producing 3D polygon data based on progressive polygon data, based on the number of polygons determined a by the rendering polygon number determining operation;
using a progressive polygon data generator to generate the progressive polygon data by performing:
   a basic vertex operation determining vertices of polygons approximate to an outer edge shape of cross-sections virtually segmenting a 3D object such that the determined vertices are vertices of a basic polyhedron approximate to a shape of the 3D object;
   a detailed vertex operation progressively determining vertices of a detailed polyhedron in a level of approximation to the 3D object that is higher than the basic polyhedron based on the level of approximation;
   a detailed vertex coordinate operation for progressively calculating relative position coordinates of the detailed polyhedron vertices determined by said detailed vertex operation in a relative coordinate system based on a plurality of predetermined vertices of a polyhedron in a level of approximation that is lower than the detailed polyhedron;

a basic polygon data operation generating basic polygon data for representing the basic polyhedron based on information on the vertices of the basic polyhedron determined by the basic vertex operation;

a detailed polygon data operation generating detailed polygon data for representing each progressive detailed polyhedron in a corresponding level of approximation to the 3D object based on the information on vertices of the detailed polyhedron determined by the detailed vertex operation, which information is described in relative position coordinates in a relative coordinate system;

a polygon progressing operation combining the basic polygon data and the detailed polygon data and generating progressive polygon data for rendering respective models in each progressive level in a corresponding level of approximation to the 3D object; and an outputting operation outputting the generated progressive polygon data.

44. A computer-readable recording medium storing a program executing a process comprising:

a rendering polygon number determining operation determining a number of polygons for rendering 3D polygon data;

a 3D polygon data producing operation producing 3D polygon data based on progressive polygon data, based on the number of polygons determined in the rendering polygon number determining operation, wherein in the 3D polygon data producing operation, the 3D polygon data is produced by determining vertices constituting the 3D polygon data for rendering an object, based on the number of polygons determined in the rendering polygon number determining operation;

using a progressive polygon data generator to generate the progressive polygon data by performing:

a basic vertex operation determining vertices of polygons approximate to an outer edge shape of cross-sections virtually segmenting a 3D object such that the determined vertices are vertices of a basic polyhedron approximate to a shape of the 3D object;

a detailed vertex operation progressively determining vertices of a detailed polyhedron in a level of approximation to the 3D object that is higher than the basic polyhedron based on the level of approximation;

a detailed vertex coordinate operation for progressively calculating relative position coordinates of the detailed polyhedron vertices determined by said detailed vertex operation in a relative coordinate system based on a plurality of predetermined vertices of a polyhedron in a level of approximation that is lower than the detailed polyhedron;

a basic polygon data operation generating basic polygon data for representing the basic polyhedron based on information on the vertices of the basic polyhedron determined by the basic vertex operation;

a detailed polygon data operation generating detailed polygon data for representing each progressive detailed polyhedron in a corresponding level of approximation to the 3D object based on the information on vertices of the detailed polyhedron determined by the detailed vertex operation, which information is described in relative position coordinates in a relative coordinate system;

a polygon progressing operation combining the basic polygon data and the detailed polygon data and generating progressive polygon data for rendering respective models in each progressive level in a corresponding level of approximation to the 3D object; and an outputting operation outputting the generated progressive polygon data.

45. A method for generating progressive polygon data comprising:

a basic vertex determining operation of determining vertices of a basic polyhedron approximate to a shape of a 3D object;

a detailed vertex determining operation of determining vertices of a polyhedron in a level of approximation to the 3D object that is higher than the basic polyhedron progressively based on the level of approximation;

a detailed vertex coordinate calculating operation of calculating relative position coordinates of vertices of a progressively determined polyhedron in a relative coordinate system based on a plurality of predetermined vertices of a polyhedron in a level of approximation that is lower than the polyhedron, a basic polygon data generating operation of generating basic polygon data for representing basic polyhedron based on the information on vertices of a basic polyhedron determined by the basic vertex determining operation;

a detailed polygon data generating operation of generating detailed polygon data for representing each progressive detailed polyhedron in a corresponding level of approximation to the 3D object based on the information on vertices of detailed polyhedron determined by the detailed vertex determining operation, which information is described in relative position coordinates in a relative coordinate system; and a polygon progressing operation of combining the basic polygon data and the detailed polygon data and generating progressive polygon data for rendering model in each progressive level in a corresponding level of approximation to the 3D object; and an outputting operation outputting the generated progressive polygon data, wherein the detailed vertex determining operation and the detailed vertex coordinate calculating operation are performed until the level of approximation reaches a predetermined level of approximation.

46. The method for generating progressive polygon data according to claim 45, wherein the level of approximation is determined by comparing a difference between an area of a face of a polyhedron defined by a vertex determined by the detailed vertex determining step and a plurality of predetermined vertices used for determining a coordinate system in the detailed vertex calculating step and an area of a potion corresponding to the face of the polyhedron represented by original polygon data obtained by geometric modeling of the object with a predetermined value.

47. A computer-readable recording medium storing a program, the program comprising:

a basic vertex determining operation of determining vertices of a basic polyhedron approximate to a shape of a 3D object;

a detailed vertex determining operation of determining vertices of a polyhedron in a level of approximation to the 3D object that is higher than the basic polyhedron progressively based on the level of approximation;

a detailed vertex coordinate calculating operation of calculating relative position coordinates of vertices of a progressively determined polyhedron in a relative coordinate system based on a plurality of predetermined vertices of a polyhedron in a level of approximation that is lower than the polyhedron, a basic polygon data generating operation of generating basic polygon data for representing basic polyhedron based on the information on vertices of a basic polyhedron determined by the basic vertex determining operation;

a detailed polygon data generating operation of generating detailed polygon data for representing each progressive detailed polyhedron in a corresponding level of approximation to the 3D object based on the information on vertices of detailed polyhedron determined by the detailed vertex determining operation, which information is described in relative position coordinates in a relative coordinate system;

a polygon progressing operation of combining the basic polygon data and the detailed polygon data and generating progressive polygon data for rendering model in each progressive level in a corresponding level of approximation to the 3D object; and an outputting operation outputting the generated progressive polygon data, wherein the detailed vertex determining operation and the detailed vertex coordinate calculating operation are performed until the level of approximation reaches a predetermined level of approximation.

48. A computer-readable recording medium storing progressive polygon data, wherein 3D polygon data representing an 3D object is produced based on the progressive polygon in accordance with a determined number of polygons;

the progressive polygon data comprises information about vertices of a basic polyhedron approximate to a shape of the 3D object and information about a plurality of detailed vertices obtained by sequentially computing vertices from the vertices of the basic polyhedron in accordance with the determined number of polygons so that a polyhedron in a higher level of approximation to the 3D object is generated;

the information of the detailed vertices is represented in the form of relative position coordinates in a relative coordinate system determined based on a plurality of predetermined vertices of a polyhedron not including the detailed vertices; and the progressive polygon data is outputted.

* * * * *